US012572145B2

(12) United States Patent
Bachrach et al.

(10) Patent No.: US 12,572,145 B2
(45) Date of Patent: *Mar. 10, 2026

(54) FITNESS AND SPORTS APPLICATIONS FOR AN AUTONOMOUS UNMANNED AERIAL VEHICLE

(71) Applicant: Skydio, Inc., San Mateo, CA (US)

(72) Inventors: Abraham Galton Bachrach, Emerald Hills, CA (US); Adam Parker Bry, Redwood City, CA (US); Matthew Joseph Donahoe, Redwood City, CA (US); Hayk Martirosyan, San Francisco, CA (US); Tom Moss, Los Altos, CA (US)

(73) Assignee: Skydio, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/352,395

(22) Filed: Jul. 14, 2023

(65) Prior Publication Data

US 2024/0053750 A1 Feb. 15, 2024

Related U.S. Application Data

(63) Continuation of application No. 16/439,504, filed on Jun. 12, 2019, now Pat. No. 11,740,630.

(Continued)

(51) Int. Cl.
*G05D 1/00* (2024.01)
*B64U 20/87* (2023.01)
(Continued)

(52) U.S. Cl.
CPC ........... *G05D 1/0094* (2013.01); *B64U 20/87* (2023.01); *G05D 1/0088* (2013.01); *G06T 7/20* (2013.01);
(Continued)

(58) Field of Classification Search
None
See application file for complete search history.

(56) References Cited

U.S. PATENT DOCUMENTS 7,887,459 B2 2/2011 Ungari et al.
9,513,629 B1 12/2016 Thorn
(Continued)

FOREIGN PATENT DOCUMENTS

WO 2017221078 A2 12/2017

OTHER PUBLICATIONS

Al-Zayer, Majed et al., "Exploring The Use Of A Drone To Guide Blind Runners," Assets '16: Proceedings of the 18th International ACM SIGACCESS Conference on Computers and Accessiblity, 2 pages, Oct. 23-26, 2016.

(Continued)

*Primary Examiner* — Jelani A Smith
*Assistant Examiner* — Davin Seol

(57) ABSTRACT

Sports and fitness applications for an autonomous unmanned aerial vehicle (UAV) are described. In an example embodiment, a UAV can be configured to track a human subject using perception inputs from one or more onboard sensors. The perception inputs can be utilized to generate values for various performance metrics associated with the activity of the human subject. In some embodiments, the perception inputs can be utilized to autonomously maneuver the UAV to lead the human subject to satisfy a performance goal. The UAV can also be configured to autonomously capture images of a sporting event and/or make rule determinations while officiating a sporting event.

22 Claims, 32 Drawing Sheets

Related U.S. Application Data

(60) Provisional application No. 62/683,982, filed on Jun. 12, 2018.

(51) Int. Cl.

| | |
|---|---|
| *G06T 7/20* | (2017.01) |
| *G06V 20/13* | (2022.01) |
| *G06V 20/17* | (2022.01) |
| *G06V 40/20* | (2022.01) |
| *B64U 10/14* | (2023.01) |
| *B64U 10/25* | (2023.01) |
| *B64U 101/30* | (2023.01) |

(52) U.S. Cl.
CPC .............. *G06V 20/13* (2022.01); *G06V 20/17* (2022.01); *G06V 40/23* (2022.01); *B64U 10/14* (2023.01); *B64U 10/25* (2023.01); *B64U 2101/30* (2023.01); *B64U 2201/10* (2023.01); *G06T 2207/30224* (2013.01); *G06T 2207/30228* (2013.01)

(56) References Cited

U.S. PATENT DOCUMENTS

| | | | |
|---|---|---|---|
| 9,737,784 | B1 | 8/2017 | Kliebhan et al. |
| 10,722,775 | B2 | 7/2020 | Black et al. |
| 2009/0232353 | A1 | 9/2009 | Sundaresan et al. |
| 2010/0319005 | A1 | 12/2010 | Erignac |
| 2011/0029235 | A1 | 2/2011 | Berry |
| 2015/0081209 | A1 | 3/2015 | Yeh et al. |
| 2015/0370250 | A1 | 12/2015 | Bachrach et al. |
| 2015/0370251 | A1 | 12/2015 | Siegel et al. |
| 2017/0161561 | A1 | 6/2017 | Marty et al. |
| 2017/0213087 | A1 | 7/2017 | Chen et al. |
| 2017/0243346 | A1 | 8/2017 | Hall et al. |
| 2017/0244937 | A1 | 8/2017 | Meier et al. |
| 2017/0280199 | A1 | 9/2017 | Davies et al. |
| 2017/0301109 | A1 | 10/2017 | Chan et al. |
| 2017/0329324 | A1 | 11/2017 | Bachrach et al. |
| 2018/0085654 | A1* | 3/2018 | Black .................... G05D 1/244 |
| 2018/0096455 | A1 | 4/2018 | Taylor et al. |
| 2018/0189971 | A1 | 7/2018 | Hildreth |
| 2018/0241936 | A1 | 8/2018 | Li et al. |
| 2018/0322749 | A1 | 11/2018 | Kempel et al. |
| 2019/0080266 | A1* | 3/2019 | Zhu .................... G05D 1/0223 |
| 2019/0176043 | A1 | 6/2019 | Gosine et al. |
| 2019/0304334 | A1* | 10/2019 | Jiang ................. A61B 5/14532 |
| 2020/0054930 | A1 | 2/2020 | Simón Vilar |
| 2020/0104598 | A1 | 4/2020 | Qian et al. |
| 2020/0108914 | A1 | 4/2020 | Yoo et al. |
| 2020/0130830 | A1 | 4/2020 | Dong |
| 2020/0134319 | A1 | 4/2020 | Ranjan et al. |
| 2020/0305767 | A1 | 10/2020 | Nagarajan |
| 2020/0358940 | A1 | 11/2020 | Chen et al. |
| 2020/0365149 | A1 | 11/2020 | Wu |

OTHER PUBLICATIONS

Exertion Games Lab, "Joggobot," https://exertiongameslab.org/projects/joggobot, 5 pages, Apr. 23, 2018.

Mueller, Florian 'Floyd' et al., "Jogging With A Quadcopter," CHI '15: Proceedings of the 33rd Annual ACM Conference on Human Factors in Computing Systems, 10 pages, Apr. 18-23, 2015.

Van de Molengraft, Rene et al., "Drone Referee," Module 2—MSD PDEng, TU/e, 8 pages, 2017/2018.

* cited by examiner

Objective 532

Target 534

Dead-zone 536

Weighting 538

Other Parameters 540

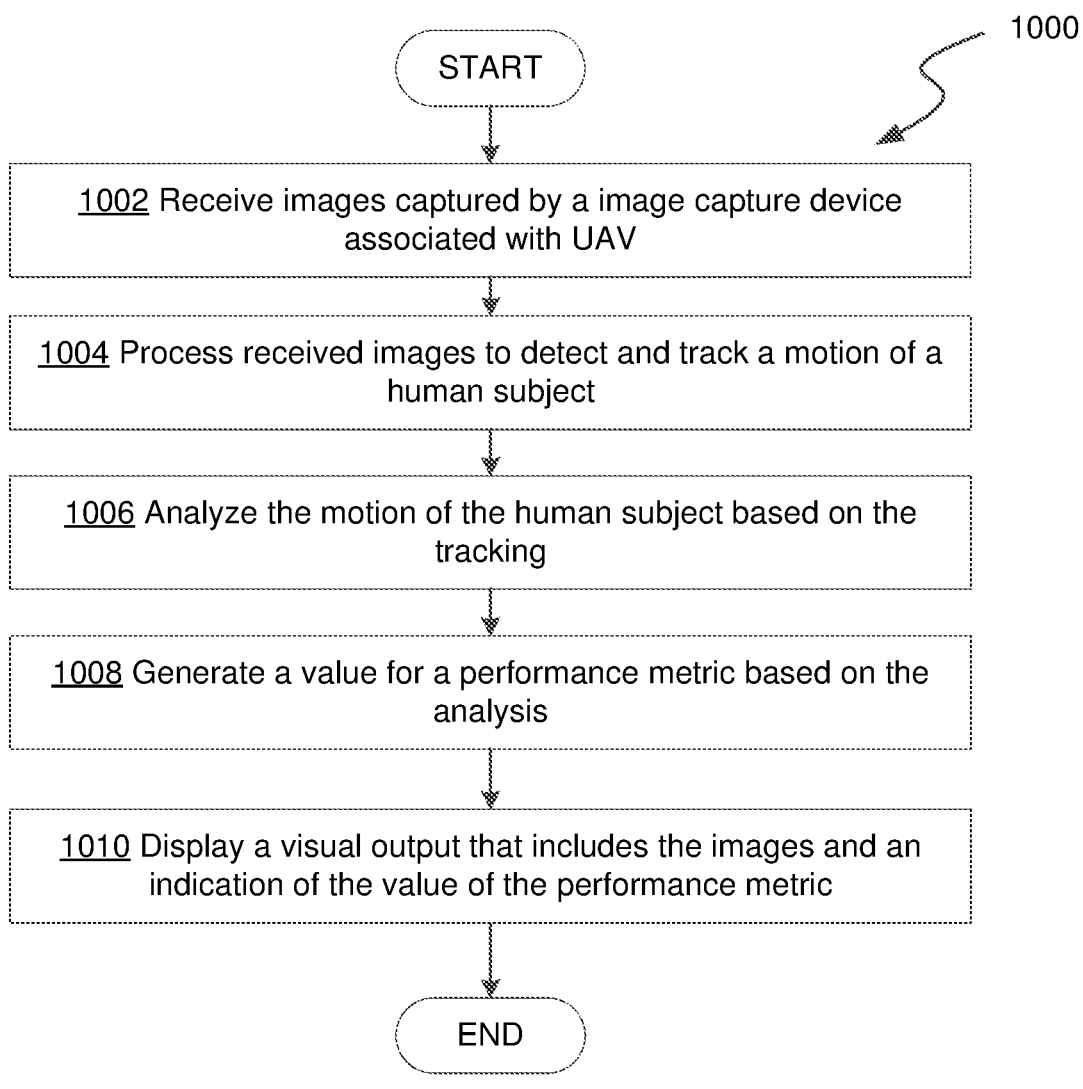

1000

START

1002 Receive images captured by a image capture device associated with UAV

1004 Process received images to detect and track a motion of a human subject

1006 Analyze the motion of the human subject based on the tracking

1008 Generate a value for a performance metric based on the analysis

1010 Display a visual output that includes the images and an indication of the value of the performance metric

END

START

1402 Receive a behavioral objective input based on a performance goal

1404 Receive perception inputs generated by sensors associated with UAV

1406 Generate a planned trajectory based on the behavioral objective input and the perceptions inputs 1406 Causing the UAV to autonomously maneuver along the planned trajectory

END

1900

START

1902 Receive perception inputs generated by sensors associated with UAV

1904 Process received perception inputs to detect an activity occurring during a sporting event 1906 Access a rule associated with the sporting event 1908 Apply the accessed rule to the detected activity to generate a rule determination 1910 Generate output based on rule detemiantion

END

102

2520

2512c

2512b

2512a

2510

100

FITNESS AND SPORTS APPLICATIONS FOR AN AUTONOMOUS UNMANNED AERIAL VEHICLE

CROSS-REFERENCE TO RELATED APPLICATION(S)

This application is a continuation of U.S. patent application Ser. No. 16/439,504 titled "FITNESS AND SPORTS APPLICATIONS FOR AN AUTONOMOUS UNMANNED AERIAL VEHICLE," filed Jun. 12, 2019; which is entitled to the benefit and/or right of priority of U.S. Provisional Patent Application No. 62/683,982 titled "AUTONOMOUS BEHAVIOR BY AN UNMANNED AERIAL VEHICLE," filed Jun. 12, 2018, the contents of each of which are hereby incorporated by reference in their entirety for all purposes. This application is therefore entitled to a priority date of Jun. 12, 2018.

TECHNICAL FIELD

The present disclosure relates to autonomous aerial vehicle technology.

BACKGROUND

Vehicles can be configured to autonomously navigate a physical environment. For example, an autonomous vehicle with various onboard sensors can be configured to generate perception inputs based on the surrounding physical environment that are then used to estimate a position and/or orientation of the autonomous vehicle within the physical environment. In some cases, the perception inputs may include images of the surrounding physical environment captured by cameras on board the vehicle. An autonomous navigation system can then utilize these position and/or orientation estimates to guide the autonomous vehicle through the physical environment.

BRIEF DESCRIPTION OF THE DRAWINGS

FIG. 10 shows a flow diagram of an example process for facilitating fitness training of a human subject by displaying a visual output that includes data regarding the activity of a human subject.

DETAILED DESCRIPTION

Example Aerial Vehicle

Figure 1A:
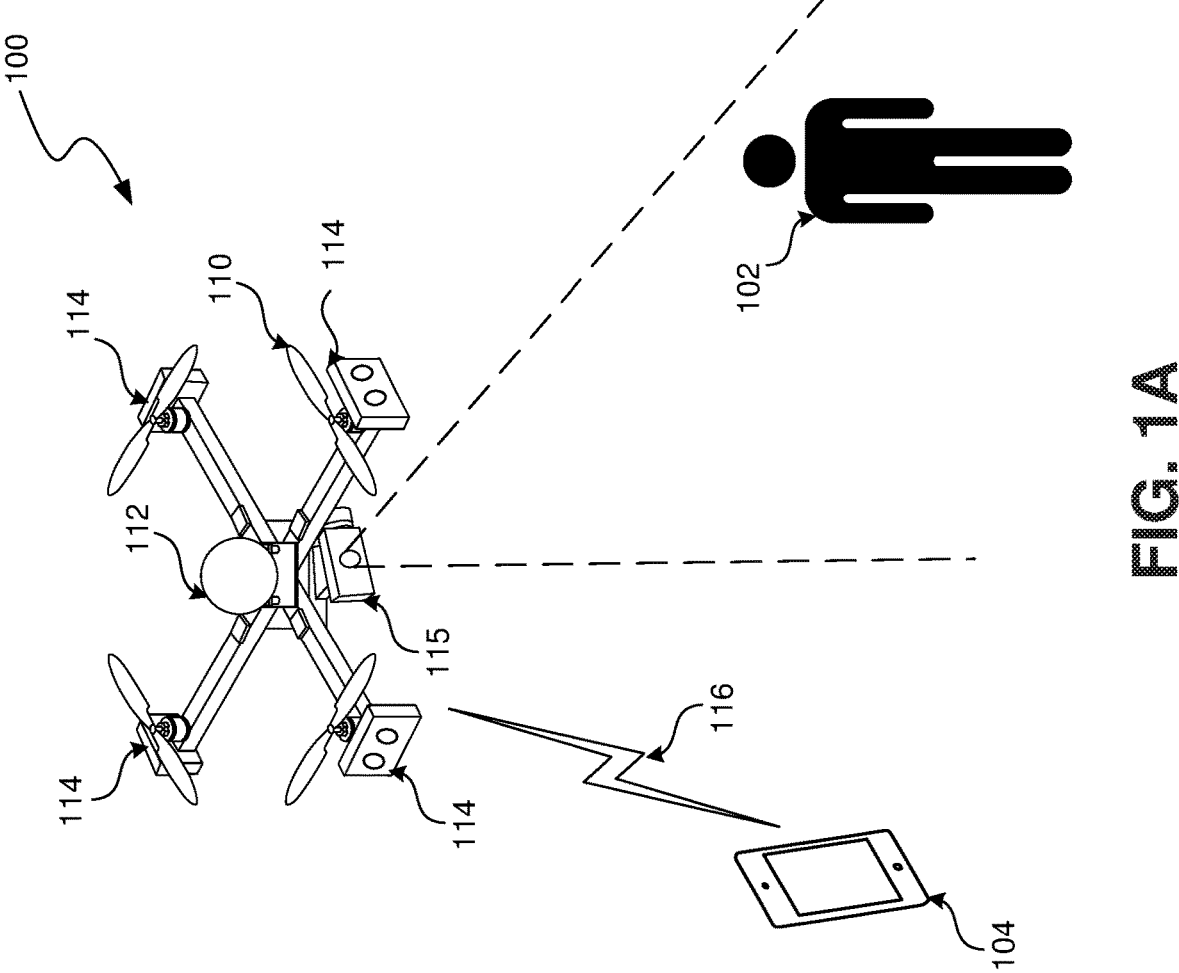
FIG. 1A shows a first example autonomous unmanned aerial vehicle (UAV).
Figure 1B:
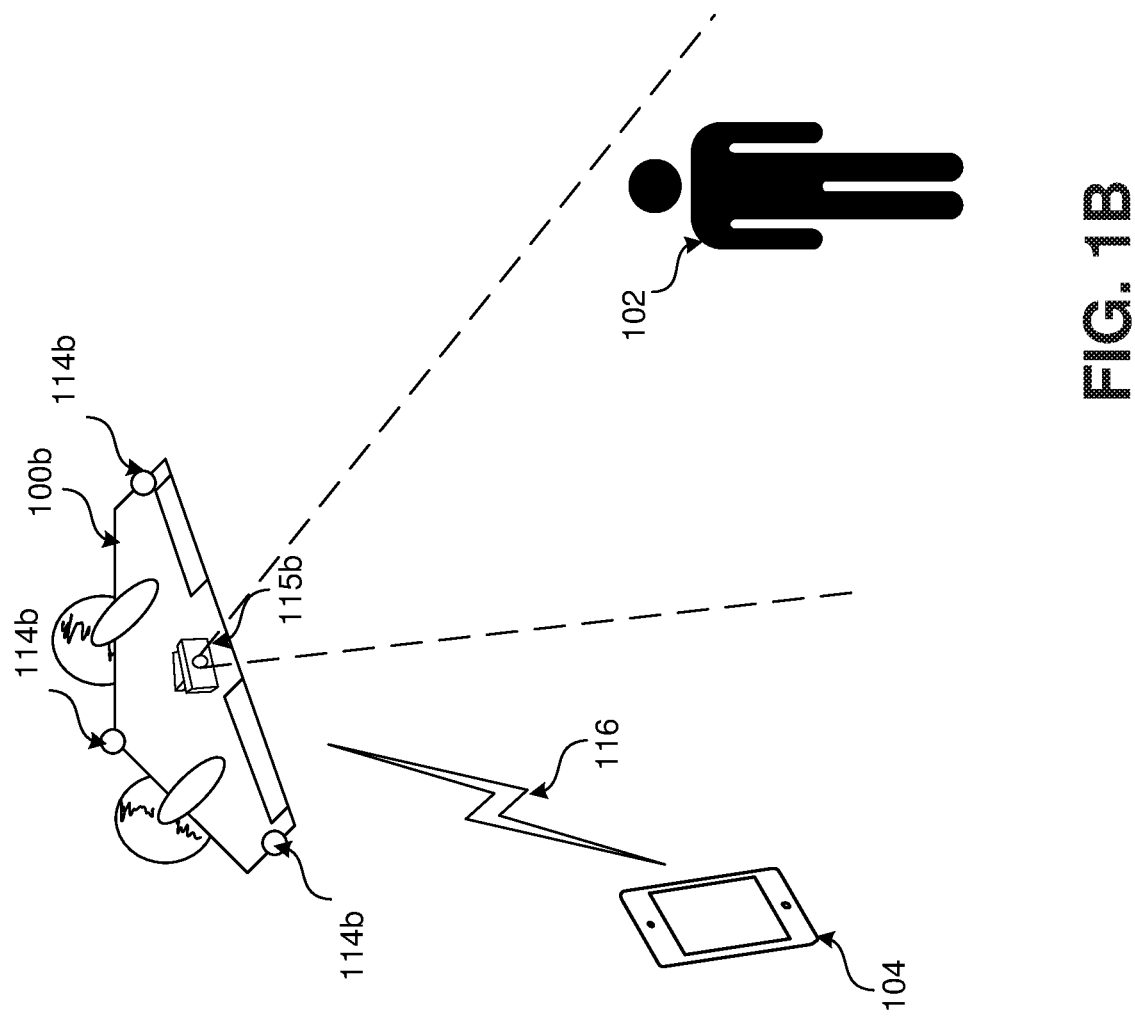
FIG. 1B shows a second example autonomous UAV.

FIGS. 1A and 1B shows example aerial vehicles within which certain techniques described herein may be applied. Specifically, FIG. 1A shows an example unmanned aerial vehicle (UAV) 100 in the form of a rotor-based aircraft (e.g., a "quadcopter"), although the other introduced technique can similarly be applied in other types of aerial vehicles such as fixed-wing aircraft as depicted in FIG. 1B. The example UAV 100 includes control actuators 110 for maintaining controlled flight. The control actuators 110 may comprise or be associated with a propulsion system (e.g., rotors) and/or one or more control surfaces (e.g., flaps, ailerons, rudder, etc.) depending on the configuration of the UAV. The example UAV 100 depicted in FIG. 1A includes control actuators 110 in the form of electronic rotors that comprise a propulsion system of the UAV 100. The UAV 100 also includes various sensors for automated navigation and flight control 112, and one or more image capture devices 114 and 115 for capturing images of the surrounding physical environment while in flight. "Images," in this context, include both still images and captured video. Although not shown in FIG. 1A, UAV 100 may also include other sensors (e.g., for capturing audio) and systems for communicating with other devices, such as a mobile device 104, via a wireless communication channel 116.

In the example depicted in FIG. 1A, the image capture devices 114 and/or 115 are depicted capturing an object 102 in the physical environment that happens to be a person. In some cases, the image capture devices may be configured to capture images for display to users (e.g., as an aerial video platform) and/or, as described above, may also be configured for capturing images for use in autonomous navigation. In other words, the UAV 100 may autonomously (i.e., without direct human control) navigate the physical environment, for example, by processing images captured by any one or more image capture devices. While in flight, UAV 100 can also capture images using any one or more image capture devices that can be displayed in real-time and or recorded for later display at other devices (e.g., mobile device 104).

FIG. 1A shows an example configuration of a UAV 100 with multiple image capture devices configured for different purposes. In the example configuration shown in FIG. 1A, the UAV 100 includes multiple image capture devices 114 arranged about a perimeter of the UAV 100. The image capture device 114 may be configured to capture images for use by a visual navigation system in guiding autonomous flight by the UAV 100 and/or a tracking system for tracking other objects in the physical environment (e.g., as described with respect to FIG. 2). Specifically, the example configuration of UAV 100 depicted in FIG. 1A includes an array of multiple stereoscopic image capture devices 114, for example placed around a perimeter of the UAV 100, so as to provide stereoscopic image capture up to a full 360 degrees around the UAV 100.

In addition to the array of image capture devices 114, the UAV 100 depicted in FIG. 1A also includes another image capture device 115 configured to capture images that are to be displayed, but not necessarily used, for navigation. In some embodiments, the image capture device 115 may be similar to the image capture devices 114, except in how captured images are utilized. However, in other embodiments, the image capture devices 115 and 114 may be configured differently to suit their respective roles.

In many cases, it is generally preferable to capture images that are intended to be viewed at as high a resolution as possible given certain hardware and software constraints. On the other hand, if used for visual navigation and/or object tracking, lower resolution images may be preferable in certain contexts to reduce processing load and provide more robust motion planning capabilities. Accordingly, in some embodiments, the image capture device 115 may be configured to capture relatively high resolution (e.g., 3840×2160 or higher) color images, while the image capture devices 114 may be configured to capture relatively low resolution (e.g., 320×240 or lower) grayscale images.

The UAV 100 can be configured to track one or more objects such as a human subject 102 through the physical environment based on images received via the image capture devices 114 and/or 115. Further, the UAV 100 can be configured to track image capture of such objects, for example, for filming purposes. In some embodiments, the image capture device 115 is coupled to the body of the UAV 100 via an adjustable mechanism that allows for one or more degrees of freedom of motion relative to a body of the UAV 100. The UAV 100 may be configured to automatically adjust an orientation of the image capture device 115 so as to track image capture of an object (e.g., human subject 102) as both the UAV 100 and object are in motion through the physical environment. In some embodiments, this adjustable mechanism may include a mechanical gimbal mechanism that rotates an attached image capture device about one or more axes. In some embodiments, the gimbal mechanism may be configured as a hybrid mechanical-digital gimbal system coupling the image capture device 115 to the body of the UAV 100. In a hybrid mechanical-digital gimbal system, orientation of the image capture device 115 about one or more axes may be adjusted by mechanical means, while orientation about other axes may be adjusted by digital means. For example, a mechanical gimbal mechanism may handle adjustments in the pitch of the image capture device 115, while adjustments in the roll and yaw are accomplished digitally by transforming (e.g., rotating, panning, etc.) the captured images so as to effectively provide at least three degrees of freedom in the motion of the image capture device 115 relative to the UAV 100.

In some embodiments, an aerial vehicle may instead be configured as a fixed-wing aircraft, for example, as depicted in FIG. 1B. Similar to the UAV 100 described with respect to FIG. 1A, the fixed-wing UAV 100*b* shown in FIG. 1B may include multiple image capture devices 114*b* arranged around the UAV 100*b* that are configured to capture images for use by a visual navigation system in guiding autonomous flight by the UAV 100*b*. The example fixed-wing UAV 100*b* may also include a subject image capture device 115*b* configured to capture images (e.g., of subject 102) that are to be displayed but not necessarily used for navigation. For simplicity, certain embodiments of the introduced technique may be described herein with reference to the UAV 100 of FIG. 1A; however, a person having ordinary skill in the art will recognize that such descriptions can be similarly applied in the context of the fixed-wing UAV 100*b* of FIG. 1B.

Mobile device 104 may include any type of mobile device such as a laptop computer, a table computer (e.g., Apple iPad™), a cellular telephone, a smart phone (e.g., Apple iPhone™), a handled gaming device (e.g., Nintendo Switch™), a single-function remote control device, or any other type of device capable of receiving user inputs, transmitting signals for delivery to the UAV 100 (e.g., based on the user inputs), and/or presenting information to the user (e.g., based on sensor data gathered by the UAV 100). In some embodiments, the mobile device 104 may include a touch screen display and an associated graphical user interface (GUI) for receiving user inputs and presenting information. In some embodiments, the mobile device 104 may include various sensors (e.g., an image capture device, accelerometer, gyroscope, GPS receiver, etc.) that can collect sensor data. In some embodiments, such sensor data can be communicated to the UAV 100, for example, for use by an onboard navigation system of the UAV 100.

Figure 2:
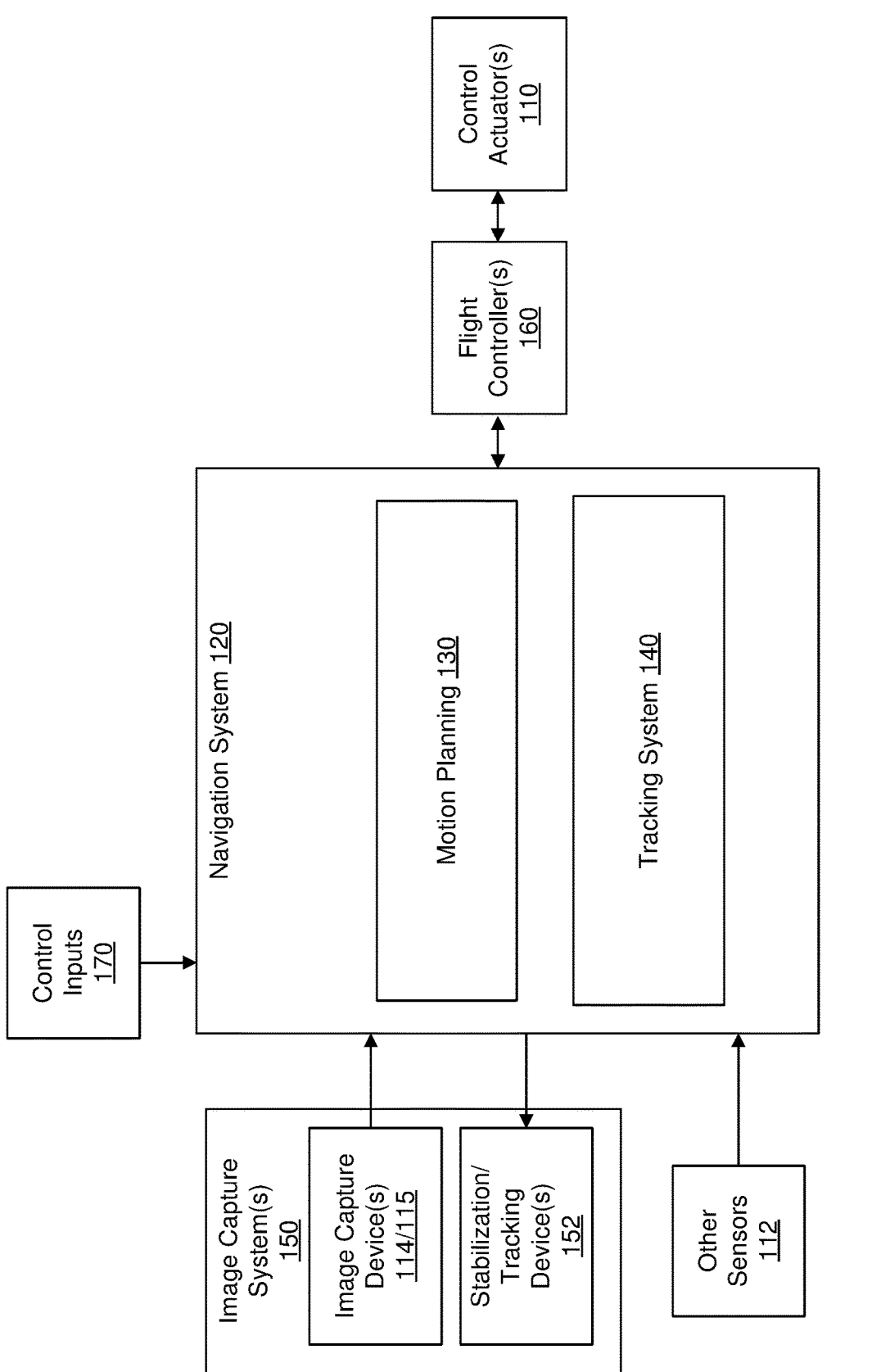
FIG. 2 shows a block diagram of an example navigation system for a UAV.

FIG. 2 is a block diagram that illustrates an example navigation system 120 that may be implemented as part of the example UAV 100. The navigation system 120 may include any combination of hardware and/or software. For example, in some embodiments, the navigation system 120 and associated subsystems may be implemented as instructions stored in memory and executable by one or more processors.

As shown in FIG. 2, the example navigation system 120 includes a motion planner 130 (also referred to herein as a "motion planning system") for autonomously maneuvering the UAV 100 through a physical environment and a tracking system 140 for tracking one or more objects in the physical environment. Note that the arrangement of systems shown in FIG. 2 is an example provided for illustrative purposes and is not to be construed as limiting. For example, in some embodiments, the tracking system 140 may be separate from the navigation system 120. Further, the subsystems making up the navigation system 120 may not be logically separated as shown in FIG. 2 and instead may effectively operate as a single integrated navigation system.

In some embodiments, the motion planner 130, operating separately or in conjunction with the tracking system 140, is configured to generate a planned trajectory through a three-dimensional (3D) space of a physical environment based, for example, on images received from image capture devices 114 and/or 115, data from other sensors 112 (e.g., an inertial measurement unit (IMU), a global positioning system (GPS) receiver, proximity sensors, etc.), and/or one or more control inputs 170. Control inputs 170 may be from external sources such as a mobile device operated by a user or may be from other systems on board the UAV 100.

In some embodiments, the navigation system 120 may generate control commands configured to cause the UAV 100 to maneuver along the planned trajectory generated by the motion planner 130. For example, the control commands may be configured to control one or more control actuators 110 (e.g., powered rotors and/or control surfaces) to cause the UAV 100 to maneuver along the planned 3D trajectory. Alternatively, a planned trajectory generated by the motion planner 130 may be output to a separate flight controller 160 that is configured to process trajectory information and generate appropriate control commands configured to control the one or more control actuators 110.

The tracking system 140, operating separately or in conjunction with the motion planner 130, may be configured to track one or more objects in the physical environment based, for example, on images received from image capture devices 114 and/or 115, data from other sensors 112 (e.g., IMU, GPS, proximity sensors, etc.), one or more control inputs 170 from external sources (e.g., from a remote user, navigation application, etc.), and/or one or more specified tracking objectives. Tracking objectives may include, for example, a designation by a user to track a particular detected object in the physical environment or a standing objective to track objects of a particular classification (e.g., people).

As alluded to above, the tracking system 140 may communicate with the motion planner 130, for example, to maneuver the UAV 100 based on measured, estimated, and/or predicted positions, orientations, and/or trajectories of the UAV 100 itself and of other objects in the physical environment. For example, the tracking system 140 may communicate a navigation objective to the motion planner 130 to maintain a particular separation distance to a tracked object that is in motion.

In some embodiments, the tracking system 140, operating separately or in conjunction with the motion planner 130, is further configured to generate control commands configured to cause one or more stabilization/tracking devices 152 to adjust an orientation and/or position of any image capture devices 114/115 relative to the body of the UAV 100 based on the motion of the UAV 100 and/or the tracking of one or more objects. Such stabilization/tracking devices 152 may include a mechanical gimbal or a hybrid digital-mechanical gimbal, as previously described. For example, while tracking an object in motion relative to the UAV 100, the tracking system 140 may generate control commands configured to adjust an orientation of an image capture device 115 so as to keep the tracked object centered in the field of view (FOV) of the image capture device 115 while the UAV 100 is in motion. Similarly, the tracking system 140 may generate commands or output data to a digital image processor (e.g., that is part of a hybrid digital-mechanical gimbal) to transform images captured by the image capture device 115 to keep the tracked object centered in the FOV of the image capture device 115 while the UAV 100 is in motion. The image capture devices 114/115 and associated stabilization/tracking devices 152 are collectively depicted in FIG. 2 as an image capture system 150.

The UAV 100 shown in FIG. 1A and the associated navigation system 120 shown in FIG. 2 are examples provided for illustrative purposes. An aerial vehicle, in accordance with the present teachings, may include more or fewer components than are shown. Further, the example UAV 100 and associated navigation system 120 depicted in FIG. 2 may include or be part of one or more of the components of the example UAV system 3000 described with respect to FIG. 30 and/or the example computer processing system 3100 described with respect to FIG. 31. For example, the aforementioned navigation system 120 and associated motion planner 130 and tracking system 140 may include or be part of the system 3000 and/or computer processing system 3100.

The example aerial vehicles and associated systems described herein are described in the context of an unmanned aerial vehicle such as the UAV 100 for illustrative simplicity; however, the introduced aerial vehicle configurations are not limited to unmanned vehicles. The introduced technique may similarly be applied to configure various types of manned aerial vehicles, such as a manned rotor craft (e.g., helicopters) or a manned fixed-wing aircraft (e.g., airplanes). For example, a manned aircraft may include an autonomous navigation system (similar to navigation systems 120) in addition to a manual control (direct or indirect) system. During flight, control of the craft may switch over from a manual control system in which an onboard pilot has direct or indirect control, to an automated control system to autonomously maneuver the craft without requiring any input from the onboard pilot or any other remote individual. Switchover from manual control to automated control may be executed in response to pilot input and/or automatically in response to a detected event such as a remote signal, environmental conditions, operational state of the aircraft, etc.

Objective-Based Autonomous Navigation

The complex processing by a navigation system 120 to affect the autonomous behavior of a UAV 100 can be abstracted into one or more behavioral objectives. A "behavioral objective" or "objective" in this context generally refers to any sort of defined goal or target configured to guide an autonomous response by the UAV 100. In some embodiments, a navigation system 120 (e.g., specifically a motion planning component 130) is configured to incorporate multiple objectives at any given time to generate an output such as a planned trajectory that can be used to guide the autonomous behavior of the UAV 100. For example, certain built-in objectives, such as obstacle avoidance and vehicle dynamic limits, can be combined with other input objectives (e.g., a tracking objective) as part of a trajectory generation process. In some embodiments, the trajectory generation process can include gradient-based optimization, gradient-free optimization, sampling, end-to-end learning, or any combination thereof. The output of this trajectory generation process can be a planned trajectory over some time horizon (e.g., 10 seconds) that is configured to be interpreted and utilized by a flight controller 160 to generate control commands (usable by control actuators 110) that cause the UAV 100 to maneuver according to the planned trajectory. A motion planner 130 may continually perform the trajectory generation process as new perception inputs (e.g., images or other sensor data) and objective inputs are received. Accordingly, the planned trajectory may be continually updated over some time horizon, thereby enabling the UAV 100 to dynamically and autonomously respond to changing conditions.

FIG. 3A shows a block diagram that illustrates an example system for objective-based motion planning. As shown in FIG. 3A, a motion planner 130 (e.g., as discussed with respect to FIG. 2) may generate and continually update a planned trajectory 320 based on a trajectory generation process involving one or more objectives (e.g., as previously described) and/or more perception inputs 306. The perception inputs 306 may include images received from one or more image capture devices 114/115, results of processing such images (e.g., disparity images, depth values, semantic data, etc.), sensor data from one or more other sensors 112 on board the UAV 100 or associated with other computing devices (e.g., mobile device 104) in communication with the UAV 100, and/or data generated by, or otherwise transmitted from, other systems on board the UAV 100. The one or more objectives 302 utilized in the motion planning process may include built-in objectives governing high-level behavior (e.g., avoiding collision with other objects, maneuvering within dynamic limitations, etc.), as well as objectives based on control inputs 308 (e.g., from users or other onboard systems). Each of the objectives 302 may be encoded as one or more equations for incorporation in one or more motion planning equations utilized by the motion planner 130 when generating a planned trajectory to satisfy the one or more objectives. The control inputs 308 may be in the form of control commands from a user or from other components of the navigation system 120 such as a tracking system 140.

In some embodiments, the underlying processes performed by a navigation system 120 for causing a UAV 100 to autonomously maneuver through an environment and/or perform image capture can be exposed through an application programming interface (API). Accordingly, in some embodiments, certain inputs to the navigation system may be received in the form of calls to an API.

Figure 3:
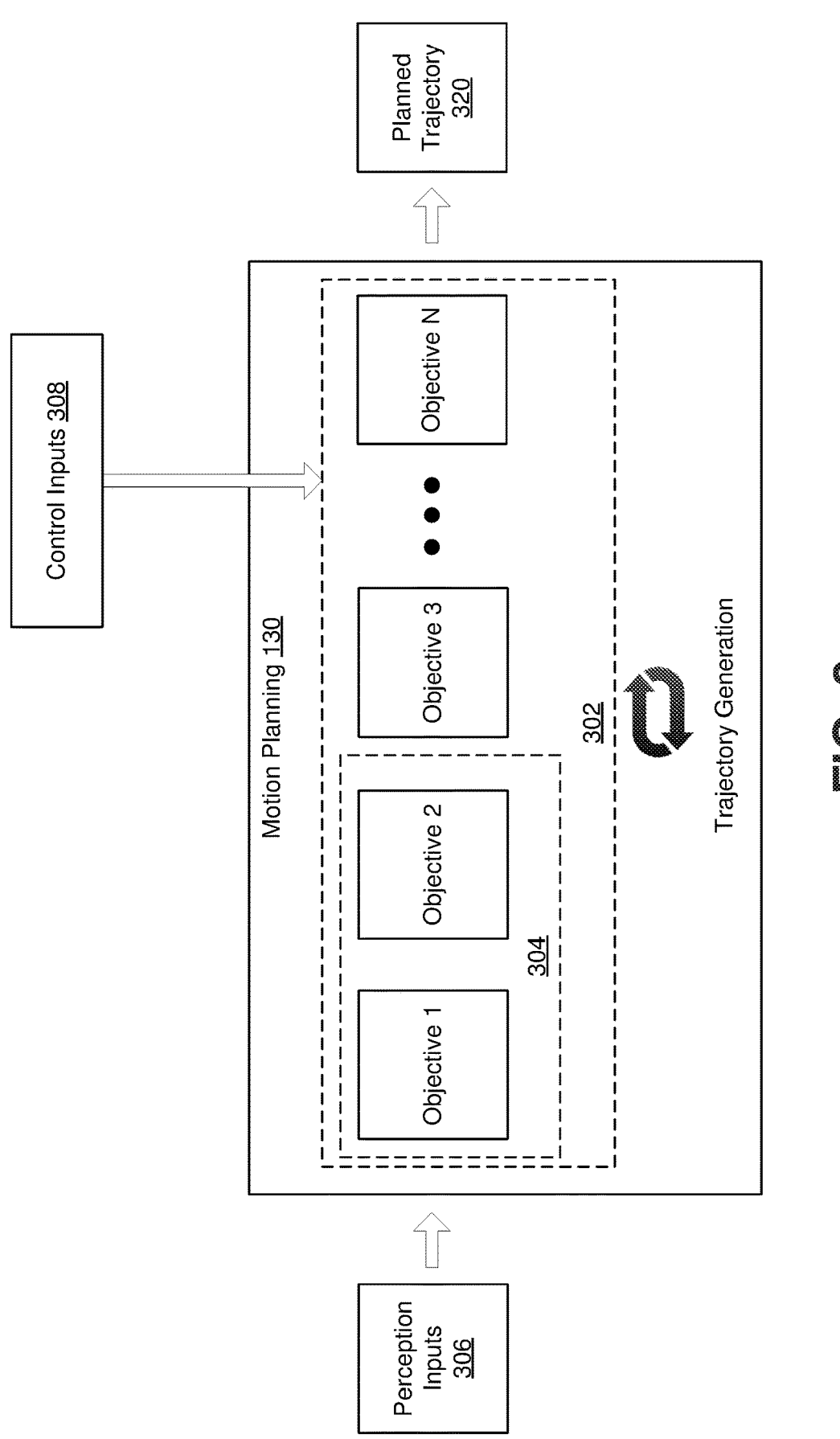
FIG. 3 shows a block diagram that illustrates objective-based motion planning by the navigation system of FIG. 2.
Figure 4:
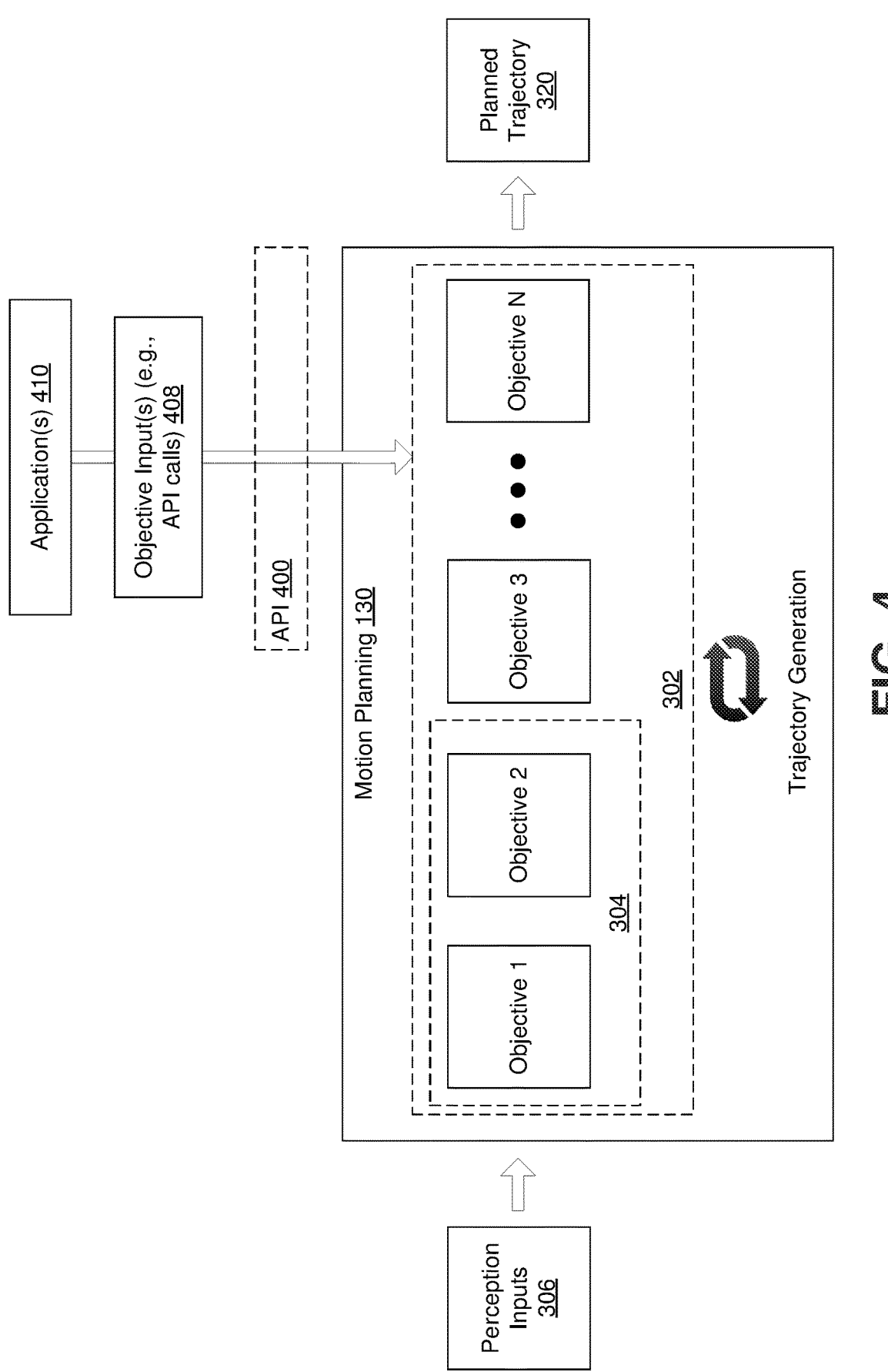
FIG. 4 shows a block diagram illustrating multi-objective optimization-based motion planning by the navigation system of FIG. 2 based on objective inputs received via an API.

FIG. 4 shows a block diagram that illustrates an example system for objective-based motion planning similar to the system depicted in FIG. 3, but configured to incorporate certain objective inputs 408 using an API 400. In some embodiments, the API 400 may be configured as a public facing API that may be utilized by a developer to create applications configured to enable certain user interactions with the UAV 100 without specific knowledge of the underlying processes of the navigation system 120 that enable autonomous behavior by the UAV 100. In some cases, the developer creating such applications may be a "second-party" or "third-party" developer, meaning that the developer may be an entity other than the original developer of the navigation system 120 (or one or more internal components of the navigation system 120).

The objective inputs 408 may be in the form of calls to an API 400 by one or more applications 410 associated with the UAV 100. An "application" in this context may include any set of instructions for performing a process to control or otherwise alter the behavior of the UAV 100 through an API 400. A developer (e.g., a third-party developer) can configure an application 410 to send a command to the UAV 100 while in flight over a network API to alter one or more of the objectives 302 utilized by the motion planning system 130 to alter the behavior of the UAV 100. As previously noted, the UAV 100 may be configured to maintain safe flight regardless of commands sent by an application. In other words, an application 410 may not have access via the API 400 to alter certain core built-in objectives 304 such as obstacle avoidance. The API 400 can therefore be used to implement applications such as a customized vehicle control interface, for example, implemented using a mobile device 104. Such applications 410 may be stored in a memory associated with the UAV 100 and/or stored in a memory of another computing device (e.g., mobile device 104) that is in communication (e.g., wireless communication) with the UAV 100.

Figure 5:
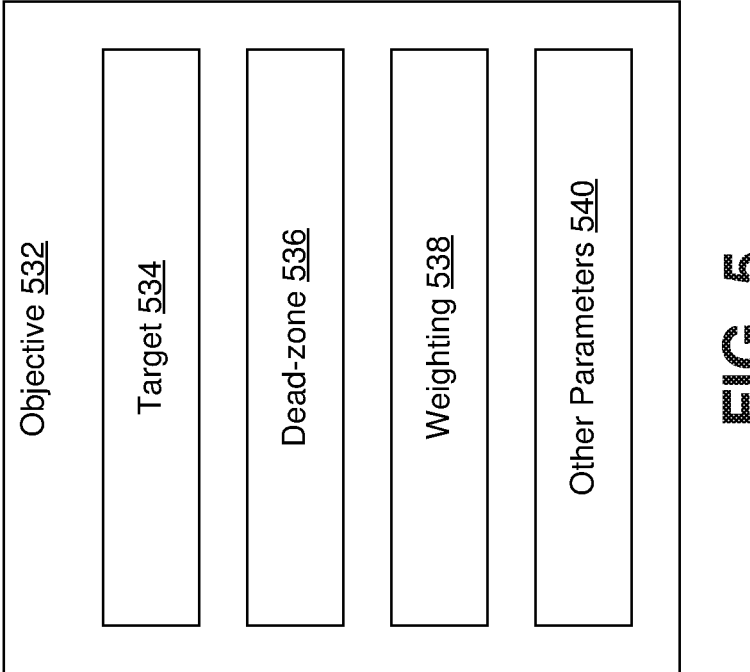
FIG. 5 shows a block diagram of an example objective that can be applied as part of the objective-based motion planning illustrated in FIG. 3 and/or FIG. 4.

Each objective of a given set of one or more objectives 302 utilized in the motion planning process may include one or more defined parameterizations. For example, FIG. 5 shows a block diagram that represents the various parameters associated with an example objective 532. As shown in FIG. 5, the example objective 532 include a target 534, a dead-zone 536, a weighting factor 538, and other parameters 540. The defined parameterizations can be utilized to define how an objective is utilized by a motion planning process to guide the autonomous behavior of a UAV 100. In some embodiments, the parameters of a given objective can be exposed through an API 400. For example, an application 410 (e.g., for sports or fitness application) may be configured to set certain parameter values of a particular objective through calls to API 400.

The target 544 defines the goal of the particular objective that the motion planner 130 will attempt to satisfy when generating a planned trajectory 320. For example, the target 534 of a given objective may be to maintain line of sight with one or more detected objects or to fly to a particular position in the physical environment.

The dead-zone defines a region around the target 534 in which the motion planner 130 may not take action to correct. This dead-zone 536 may be thought of as a tolerance level for satisfying a given target 534. For example, a target of an example image-relative objective may be to maintain image capture of a tracked object such that the tracked object appears at a particular position in the image space of a captured image (e.g., at the center). To avoid continuous adjustments based on slight deviations from this target, a dead-zone is defined to allow for some tolerance. For example, a dead-zone can be defined in a y-direction and x-direction surrounding a target location in the image space. In other words, as long as the tracked object appears within an area of the image bounded by the target and respective dead-zones, the objective is considered satisfied.

The weighting factor 536 (also referred to as an "aggressiveness" factor) defines a relative level of impact the particular objective 532 will have on the overall trajectory generation process performed by the motion planner 130.

Recall that a particular objective 532 may be one of several objectives 302 that may include competing targets. In an ideal scenario, the motion planner 130 will generate a planned trajectory 320 that perfectly satisfies all of the relevant objectives at any given moment. For example, the motion planner 130 may generate a planned trajectory that maneuvers the UAV 100 to a particular GPS coordinate while following a tracked object, capturing images of the tracked object, maintaining line of sight with the tracked object, and avoiding collisions with other objects. In practice, such an ideal scenario may be rare. Accordingly, the motion planner system 130 may need to favor one objective over another when the satisfaction of both is impossible or impractical (for any number of reasons). The weighting factors for each of the objectives 302 define how they will be considered by the motion planner 130.

In an example embodiment, the weighting factor 538 is a numerical value on a scale of 0.0 to 1.0. A value of 0.0 for a particular objective may indicate that the motion planner 130 can completely ignore the objective (if necessary), while a value of 1.0 may indicate that the motion planner 130 will make a maximum effort to satisfy the objective while maintaining safe flight. A value of 0.0 may similarly be associated with an inactive objective and may be set to zero, for example, in response to toggling the objective from an active state to an inactive state. Low weighting factor values (e.g., 0.0-0.4) may be set for certain objectives that are based around subjective or aesthetic targets such as maintaining visual saliency in the captured images. Conversely, high weighting factor values (e.g., 0.5-1.0) may be set for more critical objectives such as avoiding a collision with another object.

In some embodiments, the weighting factor values may remain static as a planned trajectory is continually updated while the UAV 100 is in flight. Alternatively, or in addition, weighting factors for certain objectives may dynamically change based on changing conditions, while the UAV 100 is in flight. For example, an objective to avoid an area associated with uncertain depth value calculations in captured images (e.g., due to low light conditions) may have a variable weighting factor that increases or decreases based on other perceived threats to the safe operation of the UAV 100. In some embodiments, an objective may be associated with multiple weighting factor values that change depending on how the objective is to be applied. For example, a collision avoidance objective may utilize a different weighting factor depending on the class of a detected object that is to be avoided. As an illustrative example, the system may be configured to more heavily favor avoiding a collision with a person or animal as opposed to avoiding a collision with a building or tree.

Configuring Automated Behavior by a UAV Using Image-Based Training Data

In some embodiments, image-based training data can be utilized to develop models for guiding automated behavior by a UAV 100, for example, to understand and perform certain tasks. For example, image data (e.g., video) can be utilized to develop and train machine learning models such as trained neural networks. Utilizing such an approach, the navigation system of an autonomous UAV 100 can be configured to more effectively perform certain tasks, for example, based on training data in the form of video of the tasks being performed. For example, in a UAV 100 configured to perform a specific automated task such as inspecting a bridge, the navigation system may implement to apply a trained neural network based on video of previously performed inspections (of bridges or otherwise).

Figure 6:
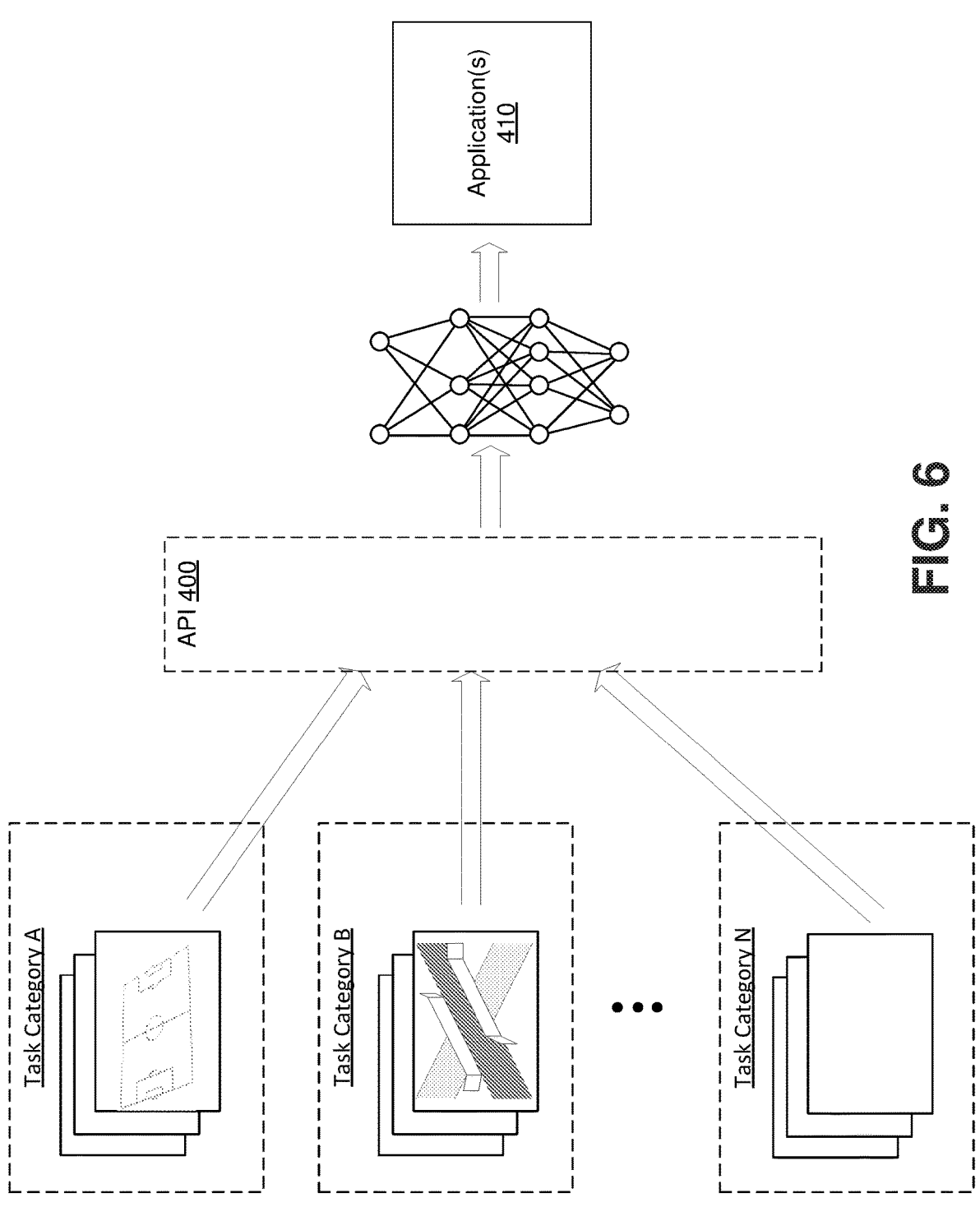
FIG. 6 shows a block diagram illustrating using image data to train machine learning models.

In some embodiments, neural networks can be exposed to third-party developers, for example, via an API to develop applications for guiding automated bachelor of a UAV. Consider again the developer created applications 410 described with respect to FIG. 4. In some embodiments, a developer can utilize image-based training data (e.g., multiple videos of bridge inspections being performed) to train machine learning model (e.g., an artificial neural network) and thereby develop an application 410 for guiding automated behavior of the UAV 100. The image-based training data can be input to the machine learning model via an API 400. For example, FIG. 6 shows a diagram that illustrates image-based training data for various tasks (e.g., capturing images at sporting events, bridge inspection, etc.) incorporated to train machine-learning models (e.g., including deep-learning artificial neural networks), for example, using an API 400. In this way, the developer can effectively plug into a neural network, for example, through the use of an API, without having to develop such models on their own.

In some embodiments, models developed based on image training data can be incorporated or otherwise implemented in conjunction with developer created applications 410 to configure the UAV 100 to perform certain tasks. For example, a developer may wish to create an application for causing a UAV 100 to perform an inventory management task in a warehouse, for example, by autonomously flying around the warehouse, scanning inventory identifiers (e.g., barcodes), and communicating the scanned identifiers to some management process. The developer may utilize an API to input image-based training data (e.g., in the form of images of barcodes, images of the warehouse, video from a directly controlled UAV flying around performing the scanning task, etc.) to train a model (e.g., that includes a neural network). The developer can then create an application (e.g., application 410) configured to cause the UAV to autonomously perform tasks related to inventory management that incorporates or otherwise relies on the trained model. Using the trained neural network, images captured by a UAV can be processed to gain understanding of the UAV's surroundings, for example, by identifying and classifying relevant objects (e.g., inventory items, inventory identifiers, features in the warehouse, people in the warehouse, etc.).

In some embodiments, models trained based on labeled image data input by a developer may be specific to applications created by the developer. Alternatively, or in addition, the incorporated training data may be utilized system-wide to train models for automated behavior that are shared across multiple UAVs operated by multiple different users. In this way, training data input by various different developers and user may continually train automated behavior of multiple different UAVs.

In some embodiments, tools may be provided to developers to assist in the development of applications based on image training data. For example, a simulation environment can be offered (e.g., via an API 400) that any developer can access online to simulate drone behavior based on trained models and/or developed applications.

Fitness and Training Applications for an Autonomous Aerial Vehicle

Figure 7:
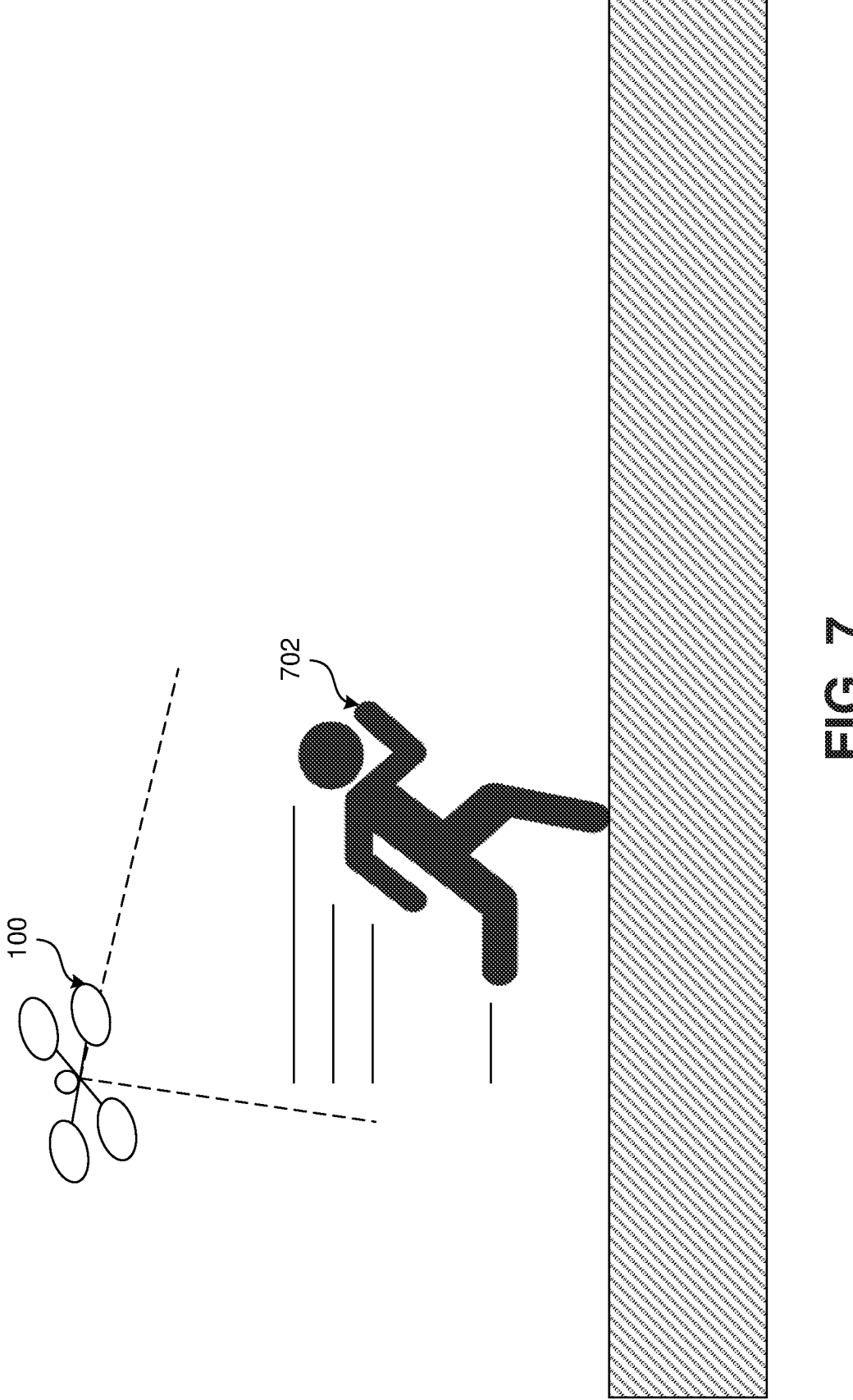
FIG. 7 shows a UAV tracking and following a human subject that is running.

An autonomous aerial vehicle such as UAV 100 can be particularly helpful to perform tasks in which manual control is difficult or otherwise impractical. For example, an autonomous aerial vehicle such as UAV 100 can be utilized for various types of fitness applications such as a personal fitness or training assistant. FIG. 7 depicts a UAV 100 tracking and following a human subject 702 that is running.

The introduced techniques can similarly be applied to assist in other fitness activities such as bicycling, skiing, climbing, swimming, etc.

Without the autonomous capabilities of the UAV 100, a separate operator would be required to remotely pilot the vehicle since manual control by the running human subject 702 would be impractical. Instead, using various onboard sensors such as image capture devices 114, the UAV 100 can detect the human subject 702 in the physical environment, track the motion of the human subject, autonomously maneuver to follow and keep the human subject 702 in view. Further, the tracking capabilities of the UAV 100 enable it to gather and record various data regarding the activity of the human subject 702 such as speed, total run time, lap time, gait, pace, elevation gain, running route, etc. For example, using object detection and tracking techniques described herein, the UAV 100 may detect and track a human subject 702 that is in motion (in this example, a person running). As part of the tracking, a tracking system 140 onboard the UAV 100 may continually update estimates of a position of the subject 702, an orientation of the subject 702, a velocity (including magnitude and direction) of the subject 802, etc. Further, in some embodiments, the UAV 100 may also generate predictions for any one or more of these parameters. For example, given current estimates and available sensor data, a motion planning process may generate a predicted path of the subject in the physical environment out to some time horizon (e.g., 10 seconds). Additional detail regarding the object detection, recognition, and tracking is described in greater detail in later sections.

Figure 8:
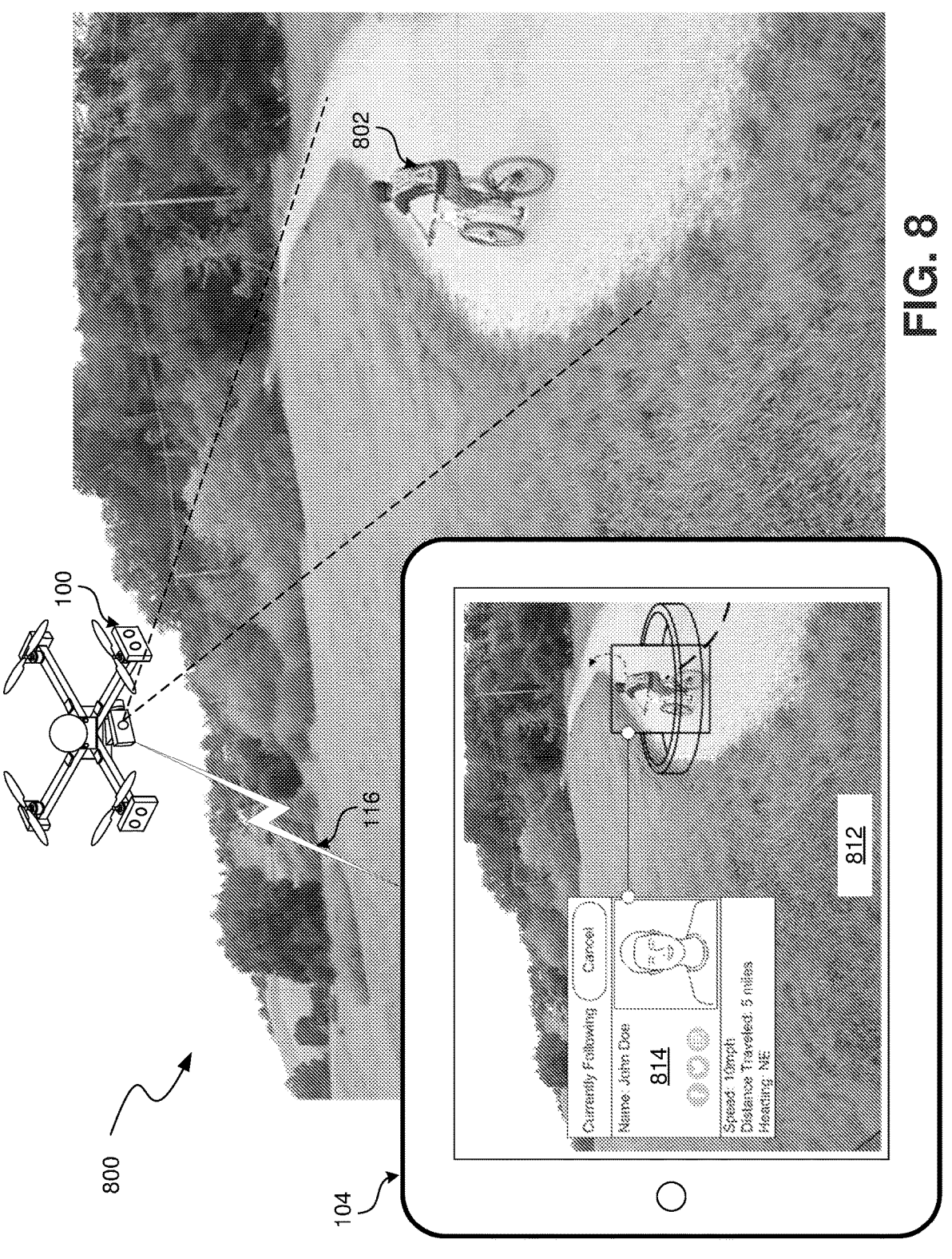
FIG. 8 shows an example technique for displaying a visual output based on data gathered by an autonomous UAV.

In some embodiments, data regarding a tracked subject 702 can be recorded while the UAV 100 is in flight and later presented to a user (e.g., human subject 702), for example, as overlays in video recording of the flight. FIG. 8 shows an example of a visual output 812 displayed via a device 104 in the form of a tablet display device. As indicated in FIG. 8, the mobile device 104 may be communicatively coupled with a UAV 100 in flight through a physical environment 800 via a wireless communication link 116. Alternatively, or in addition, the device 104 may be connected to the UAV 100 via a wired communication link (e.g., Universal Serial Bus (USB)) after the UAV 100 has landed to receive a recorded visual output 812.

The visual output 812 may include a live video feed from an image capture device 114/115 onboard the UAV 100, recorded video from an image capture device 114/115 onboard the UAV 100, a rendering of a computer-generated model of the physical environment 800 (e.g., based on data from the image capture device 114/115 and/or other sensors 112 onboard the UAV 100), and the like. This visual output 812 may be presented to a user via mobile device 104 in real-time or near-real-time as the UAV 100 is flying through the physical environment 800 capturing the images or may be displayed after the UAV 100 has landed. The user in this context may include, for example, a trainer working with the biker 940 to improve performance or the biker himself after completing his ride.

As the UAV 100 autonomously flies through the physical environment 800 it can collect data regarding one or more tracked objects. As previously mentioned, such data can include position data, orientation data, motion data (e.g., speed, pace, etc.). Such data can be presented in the visual output 812, for example, as a graphical overlay 814. In the example depicted in FIG. 8, the UAV 100 is tracking and following a human subject 802 (in this example a person on bicycle) that is moving through the physical environment. Certain data gathered or generated as part of the tracking process such as speed, heading, and distance traveled can be presented in one or more graphical overlays 814 that are part of the visual output 812. For example, visual output 812 depicts a composite of the graphical overlay 814 and the live or recorded video from image capture device 114/115.

In some embodiments, a visual output may include displayed "augmentations." Devices configured for augmented reality (AR devices) can deliver to a user a direct or indirect view of a physical environment which includes objects that are augmented (or supplemented) by computer-generated sensory outputs such as sound, video, graphics, or any other data that may augment (or supplement) a user's perception of the physical environment. For example, data gathered or generated by a tracking system 140 regarding a tracked object in the physical environment can be displayed to a user in the form of graphical overlays via an AR device. Such augmentations may be displayed via the AR device while the UAV 100 is in flight through the physical environment and actively tracking the object and/or as an augmentation to video recorded by the UAV 100 after the flight has completed. Examples of AR devices that may be utilized to implement such functionality include smartphones, tablet computers, laptops, head-mounted display devices (e.g., Microsoft HoloLens™, Google Glass™), virtual retinal display devices, heads up display (HUD) devices in vehicles, etc. For example, the previously mentioned mobile device 104 may be configured as an AR device. Note that for illustrative simplicity the term "AR device" is used herein to describe any type of device capable of presenting augmentations (visible, audible, tactile, etc.) to a user. The term "AR device" shall be understood to also include devices not commonly referred to as AR devices such as virtual reality (VR) headset devices (e.g., Oculus Rift™).

Figure 9:
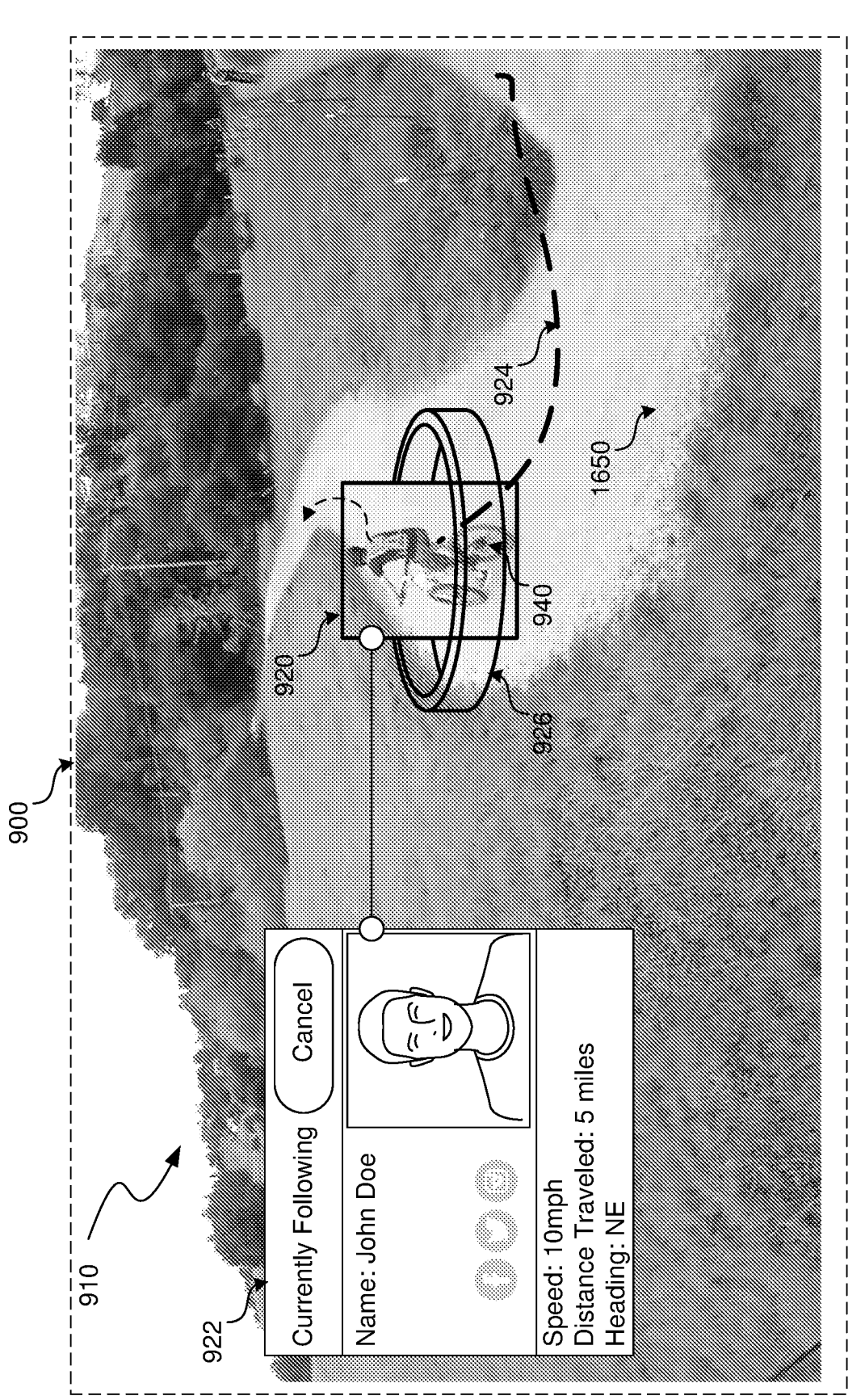
FIG. 9 shows an example view in a visual output based on data gathered by an autonomous UAV.

FIG. 9 shows an example view 900 of a physical environment 910 as presented at a display of an AR device. For example, the view 1900 may correspond with display 802 presented via a mobile tablet device 104 as shown in FIG. 8. The view 900 of the physical environment 910 shown in FIG. 9 may be generated based on images captured by one or more image capture devices 114/115 of a UAV 100 and be displayed to a user via the AR device in real-time or near-real-time as the UAV 100 is flying through the physical environment 1610 capturing the images or may be displayed after the UAV 100 has landed.

As shown in FIG. 9, one or more augmentations may be presented to the user in the form of augmenting graphical overlays 920, 922, 924, 926 associated with a tracked subject (e.g., biker 940) in the physical environment 910. For example, in an embodiment, the aforementioned augmenting graphical overlays may be generated and composited with video captured by UAV 100 as the UAV 100 tracks biker 940. The composite including the captured video and the augmenting graphical overlays may be displayed to the user via a display of the AR device (e.g., a smartphone). In other embodiments, the AR device may include a transparent display (e.g., a head-mounted display) through which the user can view the surrounding physical environment 910. The transparent display may comprise a waveguide element made of a light-transmissive material through which projected images of one or more of the aforementioned augmenting graphical overlays are propagated and directed at the eyes of the user such that the projected images appear to the user to overlay the user's view of the physical environment 1610 and correspond with particular objects or points in the physical environment.

In some embodiments, augmentations may include labels with information associated with objects detected in the physical environment 910. For example, FIG. 9 illustrates a scenario in which UAV 100 has detected and is tracking a biker 940. In response, one or more augmenting graphical overlays associated with the tracked object may be displayed via the AR device at points corresponding to the locations of the biker 940 as he appears in the captured image.

In some embodiments, augmentations may indicate specific object instances that are tracked by UAV 100. In the illustrative example provided in FIG. 9, such augmentations are presented as an augmenting graphical overlay 920 in the form of a box that surrounds specific object instances such as biker 940. This is just an example provided for illustrative purposes. Indications of object instances may be presented using other types of augmentations (visual or otherwise).

In some embodiments, augmentations may include identifying information associated with detected objects. For example, augmenting graphical overlay 922 include a name of the tracked biker 940. Further, augmenting graphical overlay 922 includes a picture of biker 940. In some embodiments, information such as the picture of the biker 940 may be automatically pulled from an external source such as a social media platform (e.g., Facebook™, Twitter™, Instagram™, etc.). Although not shown in FIG. 9, augmentations may also include avatars associated with identified people. Avatars may include 3D graphical reconstructions of the tracked person (e.g., based on captured images and other sensor data), generative "bitmoji" from instance segmentations, or any other type of generated graphics representative of tracked objects.

In some embodiments, augmentation may include information regarding an activity or state of the tracked object. For example, augmenting graphical overlay 922 includes information regarding the speed, distance traveled, and current heading of biker 940. Other information regarding the activity of a tracked object may similarly be displayed.

In some embodiments, augmentations may include visual effects that track or interact with tracked objects. For example, FIG. 9 shows an augmenting graphical overlay 924 in the form of a projection of a 3D trajectory (e.g., current, past, and/or future) associated with biker 940. In some embodiments, trajectories of multiple tracked objects may be presented as augmentations.

The size and geometry of detected objects may be taken into consideration when presenting augmentations. For example, in some embodiments, an interactive control element may be displayed as a ring about a detected object in an AR display. For example, FIG. 9 shows a control element 926 shown as a ring that appears to encircle the biker 940. The control element 926 may respond to user interactions to control an angle at which UAV 100 captures images of the biker 940. For example, in a touch screen display context, a user may swipe their finger over the control element 926 to cause the UAV 100 to revolve about the biker 940 (e.g., at a substantially constant range) even as the biker 940 is in motion. Other similar interactive elements may be implemented to allow the user to zoom image captured in or out, pan from side to side, etc.

Other types of visual augmentations specifically suited to fitness training applications can similarly be implemented. For example, in some embodiments, information gathered as part of the tracking process can be utilized to generate a 3D skeletal model of a tracked subject which is continually updated to match a changing pose of the tracked object while the tracked object is in motion. Consider for example, a scenario involving a runner training to improve performance. In such a scenario, a UAV 100 tracking the runner may, as part of the tracking process, generate a 3D skeletal model of the tracked runner, for example, based on images of the tracked runner as well as a developed semantic understanding of the type of behavior captured in the images. In other words, pixel data associated with portions of the runner captured in the images can be analyzed (e.g., using machine learning techniques) to infer a skeletal structure of the tracked runner in 3D space. This generated 3D skeletal model can then presented to a user, for example, in the form of an animation that demonstrates the motion of the runner's limbs. The 3D skeletal model animation can be presented apart from the captured images of the physical environment or may be composted, for example, as a graphical overlay to the captured images. The runner (or an associated fitness trainer) can review the 3D skeletal model animation to identify, for example, problems in running mechanics (e.g., inefficient stride), otherwise imperceptible injuries, and opportunities for improvement. This can be applied to analyze other types of activities as well such as biking, swimming, baseball, soccer, etc.

FIG. 10 shows a flow diagram of an example process 1000 for facilitating fitness training of a human subject by displaying a visual output that includes data regarding the activity of the human subject. One or more steps of the example process 1000 may be performed by any one or more of the components of the example systems described with respect to FIG. 30 or 31. For example, the process 1000 depicted in FIG. 10 may be represented in instructions stored in memory that are then executed by a processing unit. The process 1000 described with respect to FIG. 10 is an example provided for illustrative purposes and is not to be construed as limiting. Other processes may include more or fewer steps than depicted while remaining within the scope of the present disclosure. Further, the steps depicted in example process 1000 may be performed in a different order than is shown.

Example process 1000 begins at step 1002 with receiving images from one or more image capture devices 114/115 associated with a UAV 100. In some embodiments, where the processer performing step 1002 is onboard the UAV 100, step 1002 may include receiving images via an onboard communication bus or other signal line that communicatively couples the image capture devices 114/115 to the processor. In other embodiments, where the processer performing step 1002 is remote from the UAV 100, step 1002 may include receiving images via a wired or wireless communication link between the UAV 100 and the computing device that includes the processor (e.g., mobile device 104).

Example process 1000 continues at step 1004 with processing the received images to detect and track the motion of a human subject that is in proximity to the UAV 100. For example, by applying computer vision techniques a human subject can be detected in images captured of the human subject. Further, the images capturing the human subject can be processed to generate and continually update estimates of a position and/or orientation of the human subject over time. Additional details regarding the detection and tracking of objects, including a human subject, are described with respect to FIGS. 24-29.

Notably, the detection and tracking of a human subject may be performed by the UAV 100 autonomously maneuvering through the physical environment to follow the human subject. For example, using the previously discussed motion planning techniques, a motion planner 130 of a navigation system 120 may generate and continually update a planned trajectory for the UAV 100 through the physical environment that is configured to follow an estimated or predicted trajectory of the human subject.

Example process 1000 continues at step 1006 with analyzing the motion of the human subject based on the tracking and at step 1008 generating a value for a performance metric based on the analysis. A "performance metric" in this context refers to a measure or evaluation of the human subject's activity. Performance metrics may include, for example, the speed, total run time, lap time, pace, gait, elevation gain, running route, jump height, etc. For example, by analyzing the changes in position of the human subject over a particular time window, the system may generate a value for the speed or the pace of the human subject.

Example process 1000 concludes at step 1010 with displaying a visual output that includes at least some of the images received from the image capture device 114/115 as well as an indication of the value of the performance metric. For example, as discussed with respect to FIG. 8, a visual output may include a composite of the received images and one or more graphical elements that are indicative of the value of the performance metric. As an illustrative example, the visual output may include a continually updated value of the speed of the human subject that is overlaid on a live video feed captured by an image capture device 114/115 onboard the UAV 100.

In some embodiments, the visual output may also include one or more visual augmentations such as a graphical representation of a trajectory of the human subject or a graphical representation of a skeletal structure of the human subject. In such embodiments, process 1000 may further include generating the augmentation in the form of a graphical element and then compositing the graphical element with the captured images. For example, the graphical element may be overlaid in the captured images at a location corresponding to a representation of the human subject.

In some embodiments, data recorded by a UAV 100 can be shared with other users, for example, by uploading to a social media platform. Users of the social media platform can share and compare data. For example, running times for multiple users for a particular route can be uploaded to the platform to maintain a leader's board based on best times.

Figure 11:
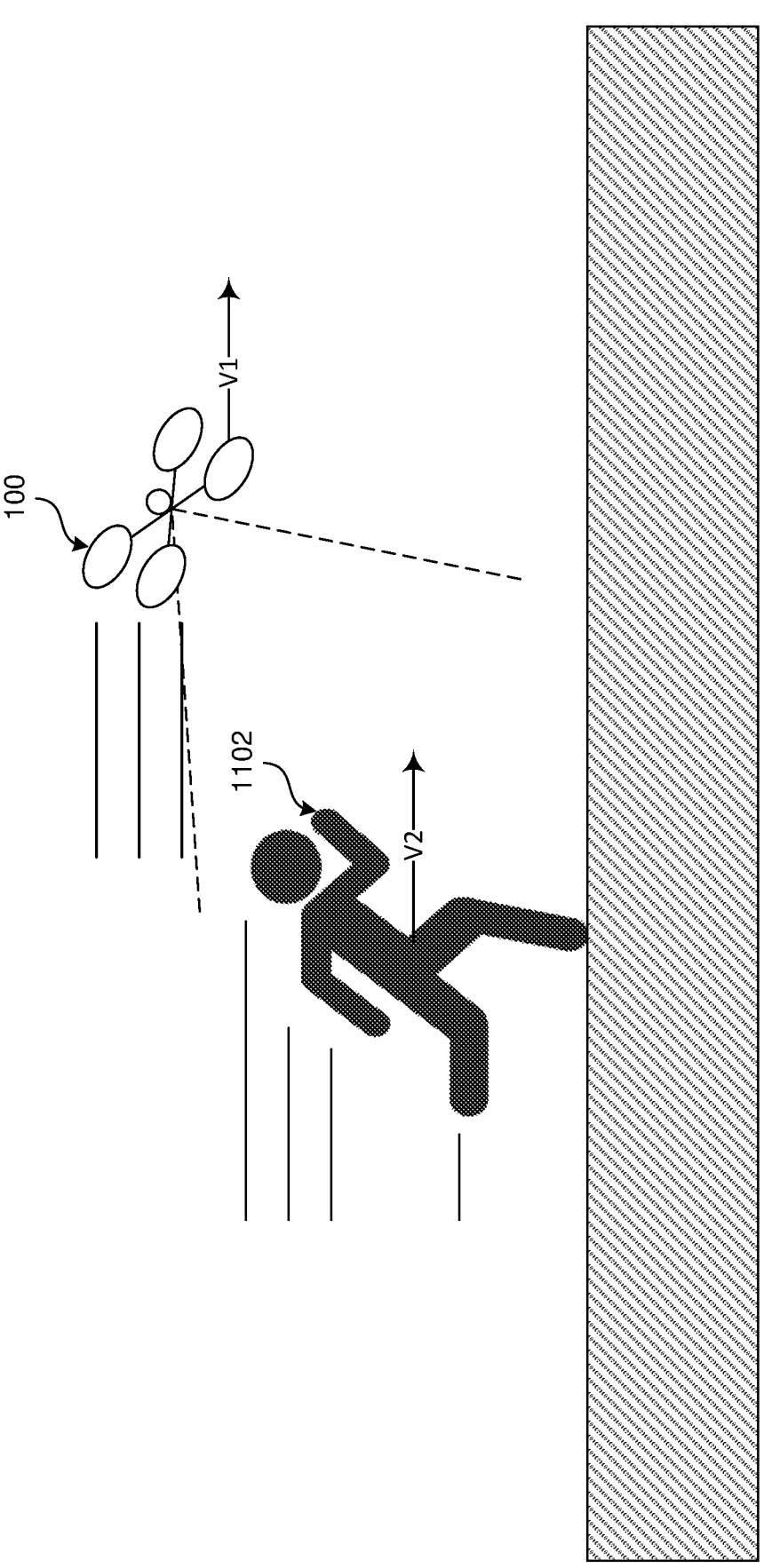
FIG. 11 shows an autonomous UAV maneuvering to set a performance goal for a human subject.

An autonomous aerial vehicle such as UAV 100 can also be configured to maneuver relative to a tracked subject to assist in fitness training. For example, in some embodiments, a UAV 100 can autonomously maneuver to set a particular pace for a tracked subject. FIG. 11 depicts a UAV 100 tracking and following a human subject 1102 that is running. In this scenario, the UAV 100 can be configured to autonomously fly at a particular aspirational pace that the runner 1102 is trying to achieve. For example, runner 1102 may wish to run a mile in 6 minutes. To assist the runner in achieving this goal the UAV 100 may autonomously fly in proximity to the runner 1102 at a pace of 6 minutes per mile. In other words, the UAV 100 may fly at a velocity V1 that is configured to set the particular pace. This flight of the UAV 100 at velocity V1 provides a performance goal to the human subject 1102 to run at a velocity V2 that matches the velocity V1 of the UAV 100.

While flying a path to set a pace for the runner 1102, the UAV 100 may fly close enough to the runner 1102 so that the runner 1102 can easily see the UAV 100 (e.g., within approximately 20 feet) while also avoiding other obstacles in the physical environment. To avoid obstacles the UAV 100 may autonomously change altitude, speed, and direction, while simultaneously making necessary adjustments to return to a desired pace. For example, the UAV 100 may momentarily slow down and gain altitude to avoid a tree near the runner 1102 and may speed up and descend after clearing the tree to return to a pace of 6 minutes per mile.

The UAV 100 can also be configured to maneuver according to other aspirational goals such as a desired speed (e.g., for sprint training), a desired height off the ground (e.g., for high jump training), a desired distance (e.g., for distance running training), etc. In any case, the UAV 100 can be configured to maneuver according to such an aspirational goal by generating a behavioral objective with one or more parameters that are then input into a motion planner 130, for example, as described with respect to FIGS. 2-5. For example, using a mobile device 104, a user may adjust one or more parameters of a predefined behavioral object such as a pace setting objective. This pace setting objective can then be input into the motion planner 130 of the UAV 100 to cause the UAV 100 to autonomously fly at a particular pace (e.g., 6 minutes per mile) while also satisfying or attempting to satisfy other behavioral objectives such as avoiding obstacles.

In some embodiments, recorded data regarding one user can be downloaded to a UAV of another user to set certain behavioral objectives. For example, in a running context, a first user can record a running time along a particular route using a first UAV. The first user can then upload that running time to a social media platform that is accessible to a second user or directly share the running time with the second user. The second user can then load that running time associated with the first user into a second UAV. More specifically, the first user's running time may be utilized to configure one or more parameters of a behavioral object that is then input into a motion planner of the second UAV. Alternatively, the user may download a behavioral objective (e.g., in the form of a software module or set of parameter values) that has been preconfigured based on the first user's running time. Using the running time (or the behavioral objective), the second UAV can then autonomously maneuver along the particular route at a pace based on the first user's running time. In this way, the second user can effectively race the first user by racing the second UAV. Again, this can be applied to other aspirational goals such as speed, jump height, distance, etc.

In some embodiments, recorded data from notable historic events such as record-breaking running times can be downloaded for use in guiding the autonomous behavior of a UAV. For example, a user may download a record-breaking running time for use with his UAV. More specifically, the record-breaking running time may be utilized to configure one or more parameters of a behavioral object that is then input into a motion planner of the user's UAV. Alternatively, the user may download a behavioral objective (e.g., in the form of a software module or a set of parameter values) that has been preconfigured based on the record-breaking running time. Using the running time (or the behavioral objective), the UAV can then autonomously maneuver along a particular route (e.g., along a track) at a pace based on the record-breaking running time. In this way, users can try racing against the fastest runners in the world to see how they compare.

In some embodiments, downloadable software modules based on historical events can be offered for payment (e.g., for a one-time fee or as part of a subscription) via an online marketplace. For example, users that wish to race against record-breaking running times can access the online marketplace and download behavioral objectives (e.g., in the form of software modules or sets of parameter values) that have been preconfigured based on the record-breaking running times and load those behavioral objectives into the UAV.

As previously discussed, certain behavioral objectives, such as setting a particular pace, can be configured based on user inputs. For example, a user may input values to set the parameters of the behavioral objective. In some embodiments, the system may calculate the values for certain parameters based on the user's input and other available information regarding the surrounding physical environment. For example, if a user inputs a desired destination and a desired pace, the system may automatically configure a behavioral objective that takes into consideration other factors such as route to the desired destination and/or an elevation gain on the route.

Figures 12A, 12B:
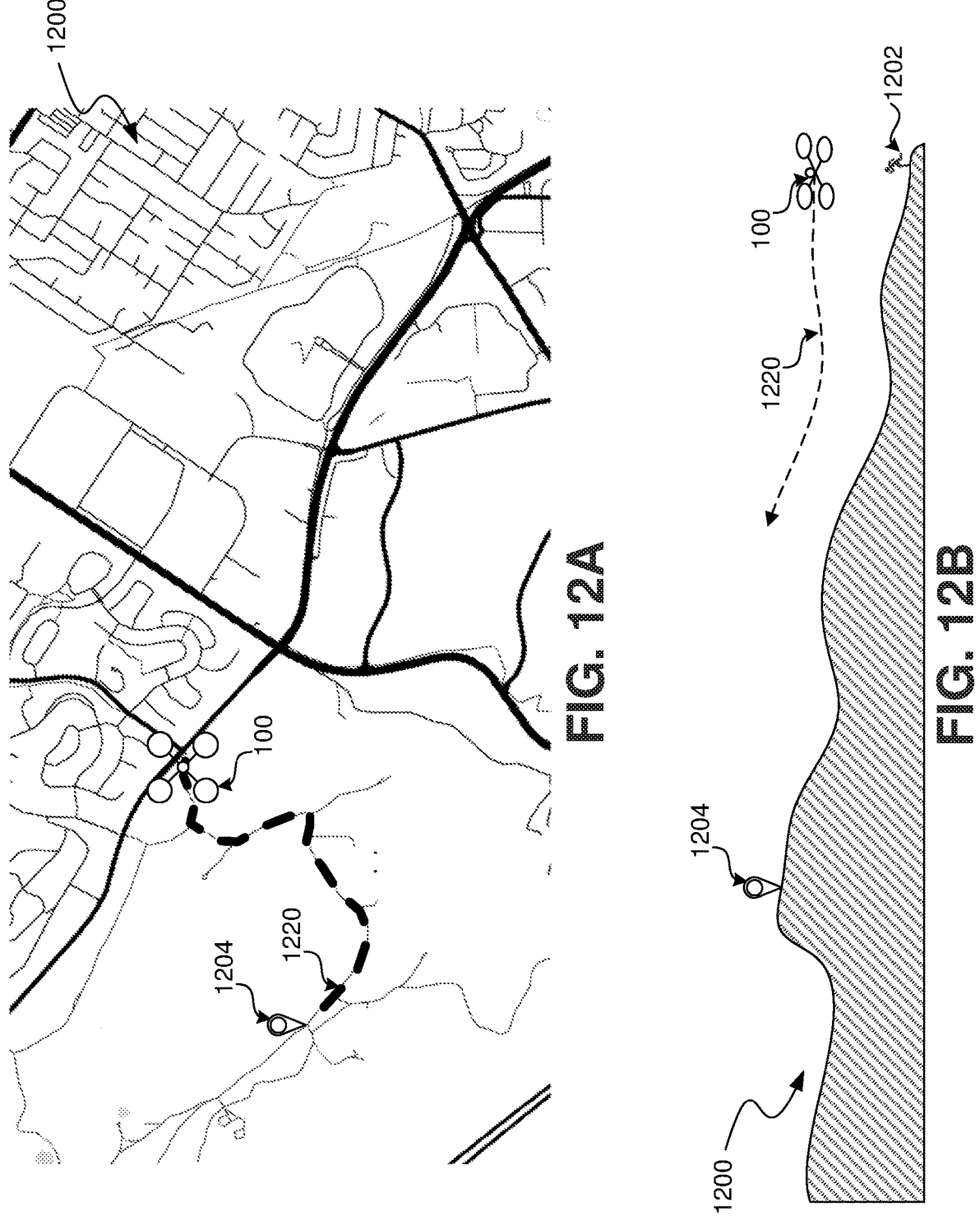
FIG. 12A shows an overhead view of a flight path of a UAV to set a performance goal for a human subject.
FIG. 12B shows an elevation view of the flight path of FIG. 12A.

FIGS. 12A and 12B depict a flight path of a UAV in overhead view and elevation view (respectively). In an illustrative scenario, a runner 1202 wishes to run to a desired location 1204 located in a physical environment 1200 and wishes to do so in a particular amount of time or at a particular pace. Using a computing device (e.g., mobile device 104), the runner 1202 can input information such as the desired location 1204. For example, using an interactive map, the runner 1202 can drop a pin that defines the desired location 1204. Using the desired location 1204, the system can automatically plan a route 1220 that takes into consideration, for example, existing roads or trails, as well as elevation gain. The system can further provide options that enable the runner 1202 to adjust certain parameters such as a run time or average speed or to adjust the planned route 1220. The system can also adjust parameters at various legs of the planned route 1220 to optimize the fitness training of the runner 1220. For example, for a given destination 1204, route 1220, and overall run time, the system can vary the speed at different points along the route based on elevation gain at those points. Steeper portions of the planned route 1220 can be flown at a lower speed while flatter portions are flown at a higher speed to achieve a specified run time.

Using the various set parameters, the UAV 100 can autonomously fly along the route 1220 as the runner 1202 runs to the desired location to guide the runner 1202 in achieving a performance goal such as a desired run time. Again, while flying autonomously, the UAV 100 may consider other behavioral objectives such as avoiding obstacles or staying within a particular distance to a tracked subject (in this case, runner 1202). For example, if the runner 1202 deviates from the planned route 1220, the UAV 100 can similarly deviate from the planned route 1220 to continue tracking and setting a pace for the runner 1202. Further, the UAV 100 may serve as a navigational aid to the runner 1202 to return to the planned route 1220 or to guide the runner along an alternative route to the desired location 1204. For example, the UAV 100 may autonomously maneuver to remain in the runner's 1202 line of sight so that the runner 1202 can follow the UAV 100 back to the planned route 1220 or along an alternative route to the desired location 1204.

In some embodiments, the autonomous behavior of the UAV 100 can dynamically respond in real-time to observed conditions. Consider again the scenario described with respect to FIGS. 12A-12B. As the UAV 100 is in flight, sensor data (e.g., captured images) are continually collected and processed. Based on the processing of this sensor data, the system may determine, for example, that the runner 1202 is tiring and adjust certain behavioral parameters such as speed accordingly. In this way, even if a desired performance goal (e.g., a specified run time) is not met, the UAV 100 will remain in proximity to the runner 1202, thereby continuing to encourage progress toward the performance goal. As another illustrative example, the processing of sensor data, the system may determine that the runner 1202 is injured and take measures to alert the runner 1202, or stop the run. For example, using onboard audio circuitry, the UAV 100 may output an alarm that is audible to the runner 1202, alerting the runner 1202 that an injury has been detected and the runner 1202 should stop to avoid further injury. In some embodiments, the UAV 100 may automatically slow down and then stop (i.e., hover) to encourage the injured runner 1202 to stop running.

Figure 13:
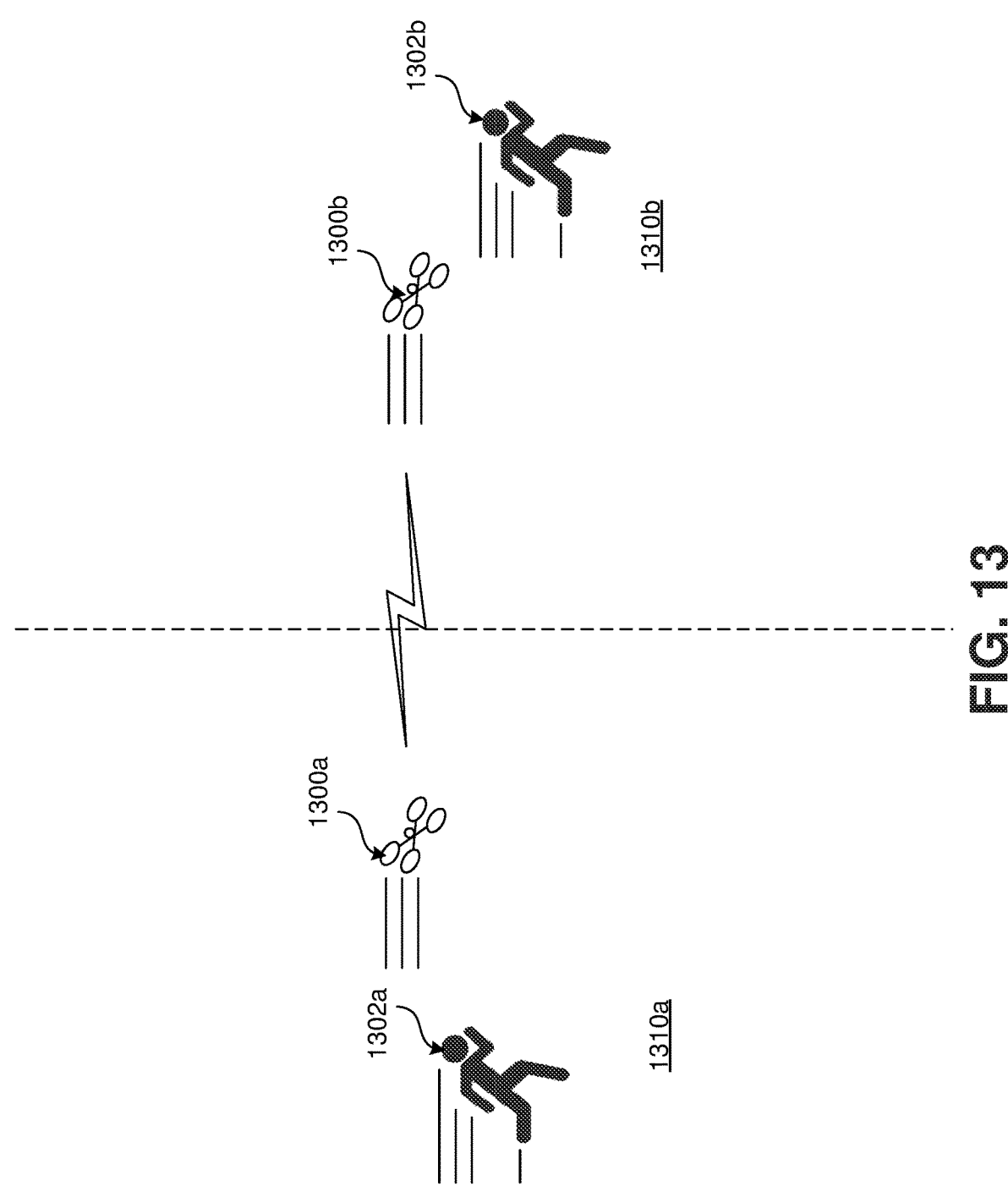
FIG. 13 shows an example technique for sharing data regarding fitness activities between multiple UAVs.

In some embodiments, data regarding fitness activities can be shared between UAVs in real-time or near-real-time as the activities are occurring. For example, FIG. 13 depicts two users 1302a and 1302b at two different physical locations 1310a and 1310b (respectively) using two UAVs 1300a and 1300b (respectively) to race each other. In the example scenario depicted in FIG. 13, a first UAV 1300a tracks a first user 1302a at a first physical location 1310a. Similarly, a second UAV 1300b tracks a second user 1302b at a second physical location 1310b. The two UAVs 1300a-b are in communication with each other, for example, via any one or more wired and/or wireless computer networks.

In an example, embodiment, the first UAV 1300a records data based on the tracking of the first user 1302a (e.g., speed, route, etc.) as the first user 1302a is running. While tracking, the first UAV 1300a communicates the recorded data to the second UAV 1300b which utilizes the data to fly a path that corresponds with the motion of the first user 1302a. In other words, from the perspective of the second user 1302b, the second UAV 1300b can be seen as an avatar running in place of the remotely located first user 1302a. The same process is performed in reverse. Specifically, the second UAV 1300b records data based on tracking the second user 1302b and communicates that data to the first UAV 1300a. The first UAV 1300a then utilizes that data to fly a path that corresponds with the motion of the second user 1302b. In this way, the first user 1302a and second user 1302b can race each other from remote locations in real-time or near-real-time.

Figure 14:
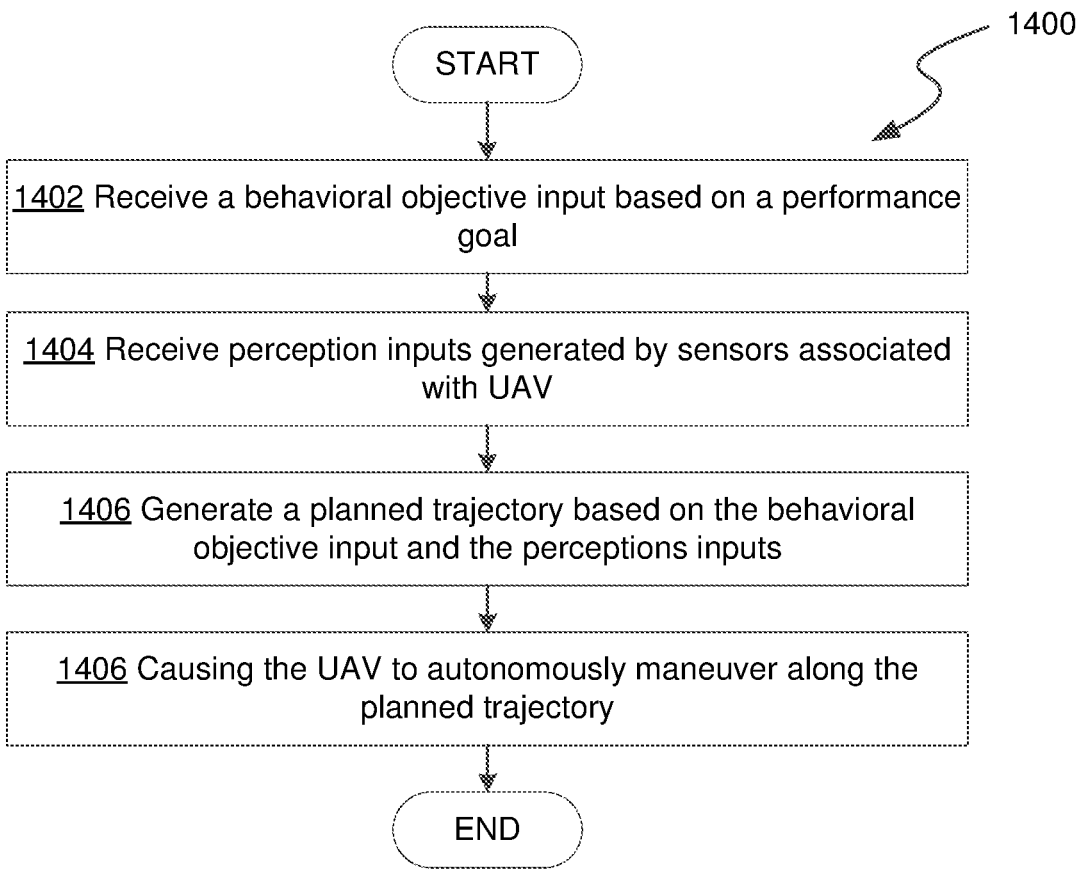
FIG. 14 shows a flow diagram of an example process for facilitating fitness training of a human subject by autonomously maneuvering to lead the human subject to satisfying a performance goal.

FIG. 14 shows a flow diagram of an example process 1400 for facilitating fitness training of a human subject by autonomously maneuvering to lead the human subject to satisfying a performance goal. One or more steps of the example process 1400 may be performed by any one or more of the components of the example systems described with respect to FIG. 30 or 31. For example, the process 1400 depicted in FIG. 14 may be represented in instructions stored in memory that are then executed by a processing unit. The process 1400 described with respect to FIG. 14 is an example provided for illustrative purposes and is not to be construed as limiting. Other processes may include more or fewer steps than depicted while remaining within the scope of the present disclosure. Further, the steps depicted in example process 1400 may be performed in a different order than is shown.

Example process 1400 begins at step 1402 with receiving a behavioral objective input based on a performance goal for a human subject. For example, the behavioral objective input may include one or more parameters that define a performance goal such as a particular speed, a particular total run time, a particular lap time, a particular gait, a particular pace, a particular or elevation gain. The type of performance goal will depend on the activity of the human subject. For example, a bicyclist will seek to achieve different performance goals than a runner. As previously described with respect to FIGS. 3-4, the behavioral objective may be input, for example using a call to an API 400, to a motion planner 130 associated with a navigation system 120 of the UAV 100.

Example process 1400 continues at step 1404 with receiving perception inputs from one or more sensors associated with the UAV 100. The perception inputs may include images received from one or more image capture devices 114/115, results of processing such images (e.g., disparity images, depth values, semantic data, etc.), sensor data from one or more other sensors 112 on board the UAV 100 or associated with other computing devices (e.g., mobile device 104) in communication with the UAV 100, and/or data generated by, or otherwise transmitted from, other systems on board the UAV 100.

Example process 1400 continues at step 1406 with generating a planned trajectory through a physical environment based on the behavioral objective input and the perception inputs. As previously described with respect to FIGS. 3-4, a motion planner 130 will process the perception inputs along with the behavioral objective to generate a planned trajectory configured to satisfy the behavioral objective. In some embodiments, the motion planner may consider one or more other behavioral objectives, such as collision avoidance, when generating the planned trajectory. Because the behavioral objective received at step 1402 includes parameters that define a performance goal of the human subject, the planned trajectory generated at step 1406 will be configured to cause the UAV to lead the human subject such to satisfy the performance goal. As an illustrative example, if the behavioral objective is configured to set a particular running pace as a performance goal, the resulting planned trajectory will be configured to cause the UAV 100 to autonomously fly at a velocity based on the particular running pace. For example, the UAV 100 will autonomously fly in proximity to the human subject such that the human subject satisfies the performance goal (i.e., particular running pace) by effectively following the motion of the UAV 100.

Example process 1400 concludes at step 1406 with causing the UAV 100 to autonomously maneuver along the planned trajectory. For example, the navigation system 120 may generate control commands that are configured to control one or more control actuators 110 to cause the UAV 100 to maneuver along the planned 3D trajectory. Alternatively, a planned trajectory generated by the motion planner 130 may be output to a separate flight controller 160 that is configured to process trajectory information and generate appropriate control commands configured to control the one or more control actuators 110 of the UAV 100.

Sport Applications for an Autonomous Aerial Vehicle

An autonomous aerial vehicle such as UAV 100 can be utilized for various types of sport applications. For example, a UAV 100 can be configured to autonomously capture video of a sporting event. In a specialized context, such as a sporting event, an autonomous UAV 100 faces several challenges from an image capture standpoint, such as how to constrain movement to remain as close to the event as possible while avoiding collisions or any other interference with the event participants (including players, support staff, and fans), and how to position correctly within such constraints so as to capture the relevant action during the sporting event. To address these challenges, an autonomous UAV 100 can process available perception inputs (e.g., captured images) in order to gain an understanding of the surrounding environment, the UAV's position and orientation within the surrounding environment, and relevant objectives (e.g., the activity to be captured).

Figure 15:
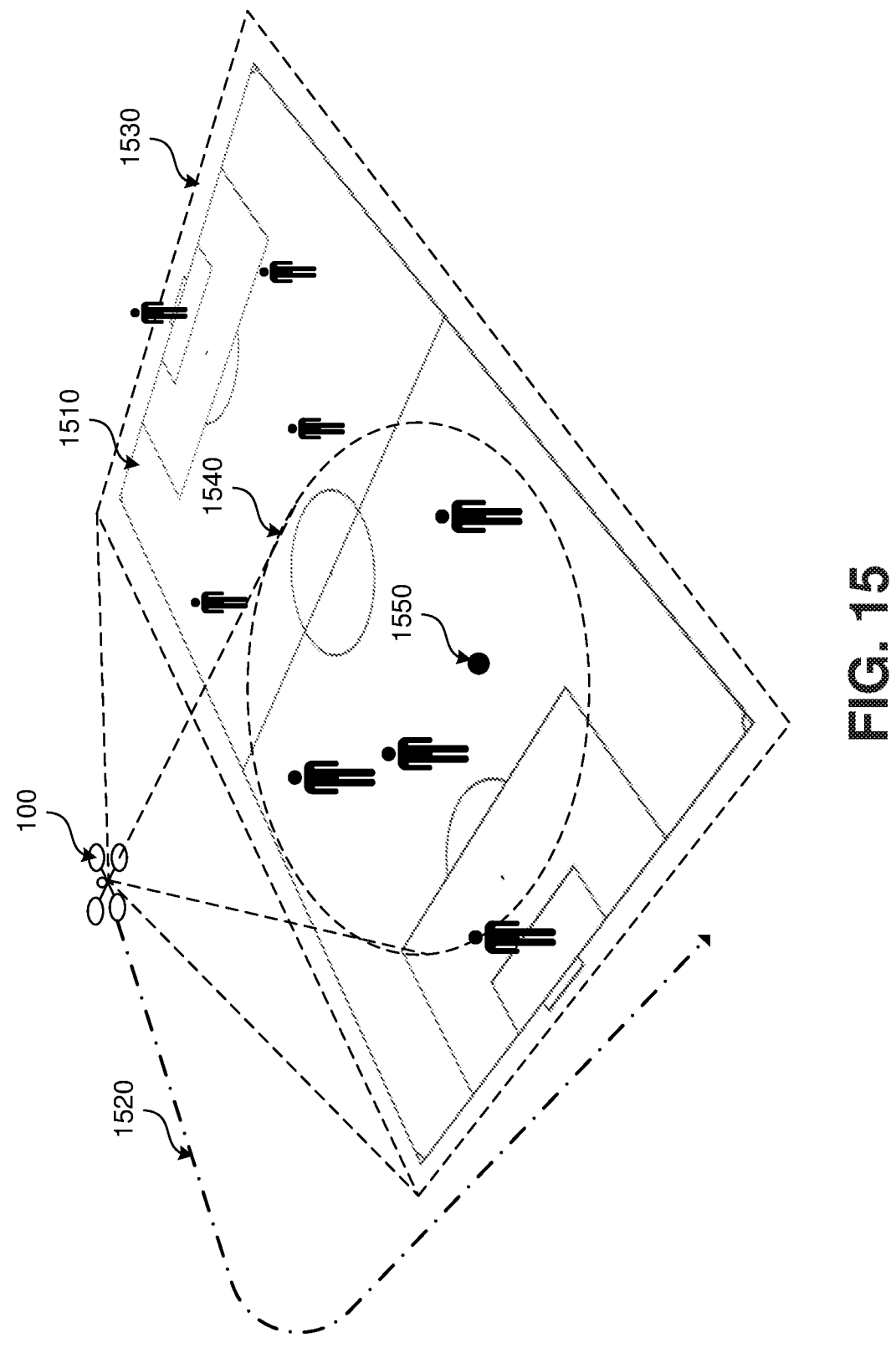
FIG. 15 shows an example scenario for capturing video of a sporting event using an autonomous UAV.

FIG. 15 shows a diagram illustrating an example scenario for capturing video of a sporting event using at least one autonomous UAV 100. In the example depicted in FIG. 15, the sporting event is a soccer match. As shown in FIG. 15, the sporting event may involve a general area of activity such a field 1510 in which most, if not all, of the activity occurs. Given an understanding of the surrounding scene, the UAV 100 may be configured to constrain motion based, for example, on a determined general area of activity. In an example scenario, this constraint may include maneuvering so as not to fly over the detected field of play 1510. For example, flight path 1520 illustrates an example constrained path of motion that prevents the UAV 100 from flying over the field and thereby reduces the risk of collision with a ball or a player on the field. Notably this constraint may be implemented automatically by the navigation itself in response to received perception inputs and a developed semantic understanding of the surrounding scene. For example, the constraint may be input as a behavioral objective to a trajectory generation process performed by a motion planner 130 associated with an autonomous navigation system 120. This is contrasted with traditional techniques that may involve a coordinate-based geofence constraint on motion that relies on an outside human operator defining the geofenced area. Note, while FIG. 15 depicts a single UAV 100 capturing the sporting event, the techniques described herein can similarly be applied to capture using multiple autonomous UAVs operating independently or in a coordinated manner.

The maneuvering constraint depicted in FIG. 15 (namely, sideline flight) is just an illustrative example. In practice, many other constraints on motion may similarly be implemented depending on the type of event being captured and the physical characteristics of the facility hosting the event. For example, as with flight over the field of play 1510, flight over the stands where fans are seated may also be avoided in some instances. Further, within the constrained motion, the navigation system will continually scan for potential obstacles and autonomously maneuver to avoid such obstacles, as necessary.

In some embodiments, the UAV 100 may maintain an overall awareness of the general area of activity, for example, based on images captured by onboard image capture devices 114/115. For example, the UAV 100, may continually track any objects on the ground within a particular area 1530 that substantially corresponds with the general area of activity 1510 (e.g., the field of play). While objects, such as positioned players, may be present in multiple different areas of the field of play, a sporting event such as a soccer match usually involves a moving area of interest 1540 where most of the activity is occurring. In sporting events that involve a ball 1550, such as soccer, this moving area of interest 1540 typically corresponds with the location of the ball 1550. As depicted in FIG. 15, the UAV 100 may track objects (e.g., players, the ball, etc.) within the field of play 1010 and based on that tracking determine and continually update a moving area of interest 1540 in which most activity is occurring. Based on the moving area of interest 1540, the UAV 100 may continually reposition itself relative to the field of play 1510 (within maneuvering constraints) and adjust image capture by a user camera 115, for example using a gimbal mechanism, to keep at least some of the moving area of interest 1540 within a field of view of the user camera 115. Again, this autonomous behavior can be implemented, for example, by generating or configuring a behavioral objective that is input into trajectory generation process performed by a motion planner 130 associated with an autonomous navigations system 120. For example, a behavioral objective may include a target parameter that defines a maximum distance from a moving area of interest 1540. By processing such a behavioral objective as part of a trajectory generation process, a motion planner 130 will attempt to keep the UAV 100 within the maximum distance set by the target while also attempting to satisfy other behavioral objectives, such as avoiding obstacles and avoiding flying over the field of play 1510.

Determining the moving area of interest 1540 relative to the field of play presents a challenge itself. Assuming the sporting event involves a ball 1550, one solution may include tracking the location of the ball 1550 relative to the field of play 1510 and designating an area (e.g., based on a set radial distance) that surrounds and moves with the tracked motion of the ball. Tracking the ball may be accomplished using computer vision techniques to detect the ball (specifically the live ball in play) as a particular instance of a class of object and distinguish that instance from other classes of objects (e.g., people) or other instances of the same class (e.g., a ball on the sideline that is not in play). Tracking a ball presents several challenges as well. In many sports, the ball is much smaller relative to other objects and travels (at times) at much higher speeds (e.g., when kicked, thrown, hit, etc.). Accordingly, in some embodiments, visual tracking may be aided, for example, by placing distinguishable markings (e.g., images, patterns, colors, etc.) on the ball to help computer vision systems onboard the UAV 100 distinguish the ball from other objects. In some embodiments, the ball may be fitted with a beacon device configured to transmit a signal (e.g., long-range sub 1 GHz radio signal) that can be picked up by a receiver onboard the UAV 100 to aid in tracking. Further, to maintain tracking of the ball, the system may predict (e.g., continually) the trajectory of the ball (e.g., out to several seconds) based on the current movement of the ball and contextual information about objects and activity surrounding the ball. For example, a tracking system onboard the UAV may detect that a player in close proximity to the ball is just about to kick the ball and adjust a predicted trajectory of the ball (e.g., based on the detected kicking motion) accordingly. Similarly, if the UAV's 100 view of the ball becomes obfuscated, for example due to a player in the way, the UAV 100 may estimate the current position of the ball based on previous predictions of the trajectory and/or tracked motion of the obfuscating player.

In many situations, the ball 1550 is central to any action occurring on the field 1510 during a sporting event. Accordingly, the tracked location of the ball 1550 will typically correspond to the area of interest 1540. However, this may not necessarily be true in all situations. For example, while the location of the ball 1550 may closely correspond with the area of interest 1040, merely keeping the ball 1550 centered in the field of view of the user camera 115 may produce a jarring visual experience for the viewer that does not allow them to see how the action is unfolding around the ball. For example, a UAV 100 tracking a baseball hit in the air may also need to track an outfielder positioning himself to field the ball in order to capture an appropriate view of the action that provides a viewer with visual context. Further, other events on the field that are not located near the ball may be of interest to a view such as injury on the field, or the position of the defense in anticipation of a play by the offensive. In other words, dynamic and interesting coverage of a sporting event may require more intelligence regarding the nature of the event than merely tracking the ball 1550.

In some embodiments, the UAV 100 may be programmed with general rules for capturing the action at a sporting event. These rules may be specific to different types of sports. For example, a UAV 100 may be programmed with a certain set of rules when capturing images at a soccer game and another set of rules when capturing images at a baseball game. In some embodiments, programmed rules-based behavior may be supplemented with or replaced with machine-learning based behavioral techniques that dynamically respond to changing activity on the field. As previously discussed with respect to FIG. 6, in some embodiments, image-based training data can be utilized to train machine-learning models (e.g., neural networks) to guide autonomous behavior by a UAV 100 to perform a specific task such as capturing images at a sporting event. For example, video of a specific type of sporting event (e.g., soccer) can be utilized to train machine learning models (e.g., neural networks) that are utilized by a navigation system 120 to guide an autonomous UAV 100 in capturing 'interesting' footage of similar sporting events.

Image-based training data can also be utilized to learn how best to track certain objects involved in the event. For example, videos of various soccer matches can be utilized to train the UAV 100 about the rules of the game. Based on this deep understanding of the activity being captured, the UAV can better track objects on the field such as the ball. For example, by learning the rules and flow of a soccer match, the UAV 100 may learn where the ball should be at any given instant based on other factors besides direct visual contact such as positioning and activity of the players on the field.

Figure 16:
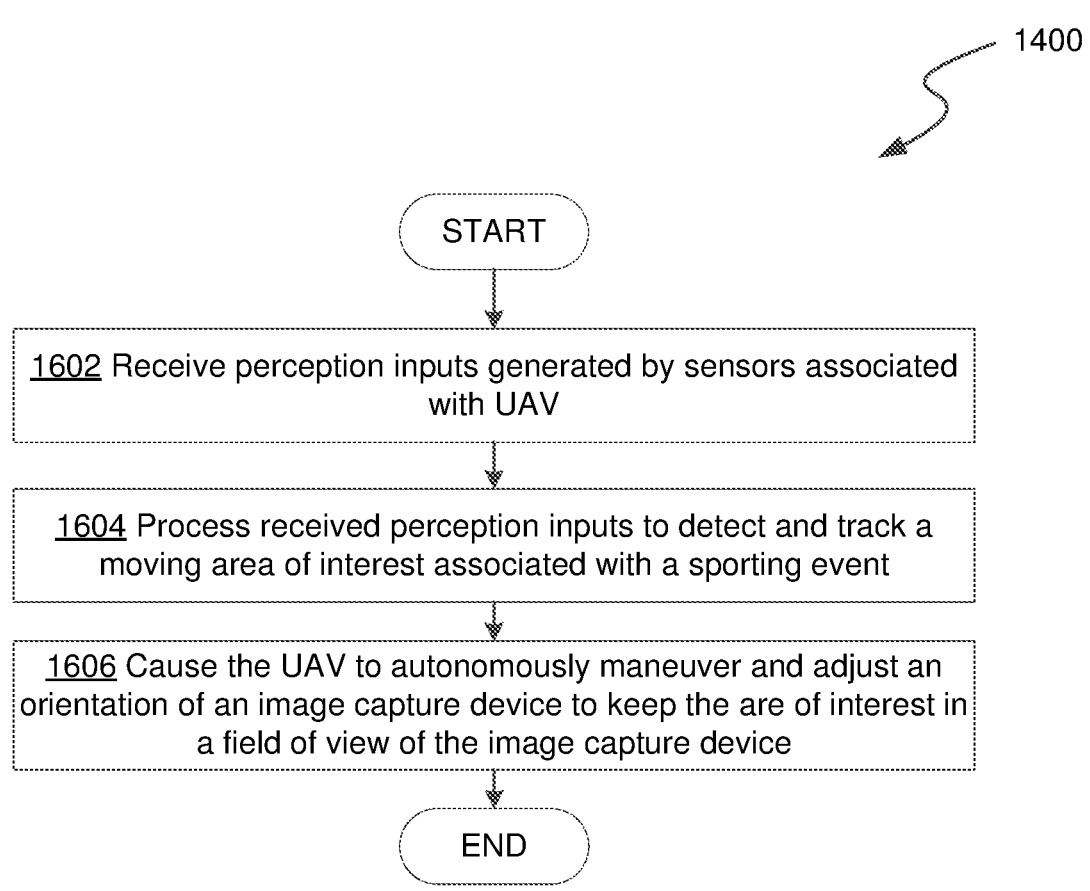
FIG. 16 shows a flow diagram of an example process for capturing images of a sporting event using an autonomous UAV.

FIG. 16 shows a flow diagram of an example process 1600 for capturing images of a sporting event using an autonomous UAV. One or more steps of the example process 1600 may be performed by any one or more of the components of the example systems described with respect to FIG. 30 or 31. For example, the process 1600 depicted in FIG. 16 may be represented in instructions stored in memory that are then executed by a processing unit. The process 1600 described with respect to FIG. 16 is an example provided for illustrative purposes and is not to be construed as limiting. Other processes may include more or fewer steps than depicted while remaining within the scope of the present disclosure. Further, the steps depicted in example process 1400 may be performed in a different order than is shown.

Example process 1600 begins at step 1602 with receiving perception inputs from one or more sensors associated with the UAV 100. The perception inputs may include images received from one or more image capture devices 114/115, results of processing such images (e.g., disparity images, depth values, semantic data, etc.), sensor data from one or more other sensors 112 on board the UAV 100 or associated with other computing devices (e.g., mobile device 104) in communication with the UAV 100, and/or data generated by, or otherwise transmitted from, other systems on board the UAV 100.

Example process 1600 continues at step 1604 with processing the received perception inputs to detect and track a moving area of interest associated with a sporting event. For example, by applying computer vision techniques, one or more objects such as the field of play, the human players, and a ball, can be detected by processing images of the surrounding physical environment. In some embodiments, perception inputs are processed using one or more machine-learning models (e.g., artificial neural networks with deep learning) to detect, classify, and track multiple instances of various objects. Additional details regarding the detection and tracking of objects are described with respect to FIGS. 24-29.

In some embodiments, the tracked area of interest is within a particular area associated with the sporting event such as a field of play of a court. In this context, a moving area of interest may correspond with the motion of any of the ball, a particular player, or a formation of players. The area of interest in any given implementation may vary depending on system preferences, but can be defined relative to the various objects associated with a sporting event such as the field, the players, a ball, etc.

Example process 1600 continues at step 1606 with causing the UAV 100 to autonomously maneuver and adjust an orientation of an image capture device to keep the tracked area of interest in a field of view of the image capture device. As previously discussed, causing the UAV 100 to autonomously maneuver may include generating and continually updating a planned trajectory based on perception inputs and one or more behavioral objectives, for example, as described with respect to FIGS. 3-4. In this example, a behavioral objective can be configured with one or more parameters to facilitate filming a sporting event. In other words, a motion planner 130 will process the behavioral objective and generate a planned trajectory that attempts to satisfy a target of the behavioral objective (e.g., keep detected area of interest in a field of view of an image capture device). In some embodiments, this behavioral objective is processed with other behavioral objectives such as collision avoidance to generate and continually update the planned trajectory.

The navigation system 120 then causes the UAV 100 to autonomously maneuver along the planned trajectory. For example, the navigation system 120 may generate control commands that are configured to control one or more control actuators 110 to cause the UAV 100 to maneuver along the planned 3D trajectory. Alternatively, a planned trajectory generated by the motion planner 130 may be output to a separate flight controller 160 that is configured to process trajectory information and generate appropriate control commands configured to control the one or more control actuators 110 of the UAV 100. Further, the navigation system 102 may generate control commands that are configured to cause a gimbal mechanism to adjust an orientation of an attached image capture device 115 to keep the tracked area of interest in a field of view of the image capture device 115.

A UAV 100 can also be configured for other sport applications such as officiating a sporting event. As discussed previously, an autonomous UAV 100 can process available perception inputs (e.g., captured images) in order to gain an understanding of the surrounding environment, the UAV's position and orientation within the surrounding environment, and relevant objectives (e.g., the activity to be captured). The UAV 100 can apply this understanding of the events occurring in a sporting event to rules associated with the sporting event to make rules determinations associated with the sporting event that would otherwise require a human referee.

Figure 17:
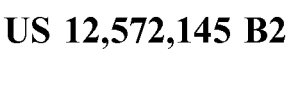
FIG. 17 shows a first example scenario for officiating a sporting event using an autonomous UAV.

FIG. 17 shows a diagram illustrating an example scenario for officiating a sporting event using at least one autonomous UAV 100. As with the example sporting event described with respect to FIG. 15, the example depicted in FIG. 17 is a soccer match. As shown in FIG. 17, the sporting event may involve a general area of activity such as a field 1710 in which most, if not all, of the activity occurs. The UAV 100 may maintain an overall awareness of the general area of activity, for example, based on images captured by onboard image capture devices 114/115. For example, the UAV 100, may continually track any objects on the ground within a particular area 1730 that substantially corresponds with the general area of activity 1710 (e.g., the field of play).

Given an understanding of the surrounding scene, the UAV 100 may be configured to apply rules associated with the sporting event to make rule determinations in real-time (or near-real-time) as the activity on the field 1710 occurs. A "rule determination" in this context refers to determination whether certain conditions of a given rule are true or not, given the activity observed through the perception inputs. For example, as depicted in FIG. 17, by determining the relative locations of the one or more players 1702 on the field, a UAV (or multiple UAVs) 100 may identify and continually update a location of an offside line 1740 relative to the field of play 1710. The UAV 100 can then determine automatically when an offside rule violation occurs by monitoring the positions of players 1702 relative to the continually updated offside line as the ball 1750 is passed. This rules application process can similarly be applied to other rules to, for example, detect illegal contact between players 1702 during a play. Further, while the officiating techniques are described in FIG. 17 in the context of a soccer match, they can similarly be applied to other types of sports that typically involve human officiators such as baseball, basketball, football, hockey, tennis, etc.

Note, although not expressly indicated in FIG. 17, an autonomous UAV 100 implemented to officiate a sporting event may also be configured according to constraints described with respect to FIG. 15. For example, while capturing images of the field area 1730, the one or more UAVs 100 may be constrained from flying directly over the field 1710. As such, their paths of motion while capturing images may mimic the example constrained path of motion 1520 depicted in FIG. 15.

In some embodiments, the officiating techniques described with respect to FIG. 17 can be applied as a review tool to assist human officiators. For example, in response to a challenged call on the field, a human officiator may review video captured by the one or more UAVs 100 to review the play. In such an embodiment, the video presented to the human officiator may include an indication of the correct call (e.g., offside vs. not offside) and/or one or more graphical elements such as a virtual offside line that are overlaid in the video to assist the human officiator.

Alternatively, or in addition, one or more autonomous UAV 100 can be utilized to replace human officiators. In such embodiment, the UAV 100 may be equipped with systems for presenting the rules determinations to the players 1702 as well as others associated with the sporting event. For example, in some embodiment, the one or more UAVs 100 may include on-board audio circuitry (e.g., including speakers) for audibly presenting a determination to players. The example scenario depicted in FIG. 17 shows a UAV 100 presenting an audible output 1760 that indicates a rule determination.

In some embodiments, UAV 100 may instead communicate rule determinations to an external computing device, for example, associated with an officiating platform 1780. The remote officiating platform 1780 may include computing systems that are communicatively coupled (e.g., via one or more wired or wireless communication networks) to the one or more UAVs 100. The computing systems associated with the officiating platform 1780 may be implemented locally at a venue (e.g., a stadium) associated with the sporting event and/or remotely as a cloud-based computing system. For example, the officiating platform 1780 may be implemented as a cloud-based service that can be accessed by multiple sporting event venues.

In some embodiments, the remote officiating platform 1780 may include computing systems (e.g., servers) for processing communications received from the one or more UAVs 100 and generating an output indicative of the rule determination to other systems located at a venue of the sporting event. For example, the officiating platform may transmit, via one or more communication networks, an indication of a rule decision by a UAV 100 to a public address (PA) system 1790 associated with the venue (e.g., a stadium) of the sporting event.

In some embodiments, one or more autonomous UAV 100 can be implemented, for example as a swarm, to improve overall officiating accuracy. FIG. 17 shows an example scenario involving multiple autonomous UAV 100 that are in wireless communication with each other. This may include direct wireless communication (e.g., via Wi-Fi or some near field communications protocol such as a Bluetooth™) between the multiple UAVs 100 as well as indirect communication via an intermediary computing system, for example, at an officiating platform 1780.

In an example embodiment, each of the multiple UAV 100 may independently capture images of the area 1730 from different positions. The views of the area 1730 from multiple positions can be used to generate more accurate estimates of the positions and/or orientations of the one or more detected objects on the field 1710 such as players 1702 and the ball 1750. These more accurate estimates can then be applied to the rules of the sporting event to make rule determinations. The position/orientation estimates and rule determinations can be performed based on captured images at a computing system associated with any one or more of the multiple UAVs 100 or at an external computing system, for example, associated with officiating platform 1780.

In some embodiments, each of the multiple UAVs 100 may generate rule determinations independently based on images captured by their respective onboard image capture devices. The rule determinations from the multiple UAVs 100 can then be compared to determine a final rule determination. In some embodiments, the final rule determination may represent a majority opinion of the multiple UAVs 100. In other embodiments, the system may be configured to only accept a final rule determination if all of the individual rule determinations of the multiple UAVs 100 agree with each other (i.e., if there is a consensus). In other embodiments, the system may be configured to only accept a final rule determination if at least a threshold percentage of the individual rule determinations of the multiple UAVs 100 agree with each other (e.g., 80% or 4 out of 5). The process of comparing the individual rule determinations of the multiple UAVs 100 can be performed at a computing system associated with any one or more of the multiple UAVs 100 or at an external computing system, for example, associated with officiating platform 1780.

The rules of the sporting event applied by the one or more autonomous UAVs 100 can be obtained from various different sources. In some embodiments, each of the one or more UAVs 100 may store, in onboard memory, data associated with rules of one or more different types of sports. For example, an autonomous UAV 100 used to officiate a soccer match may be preconfigured according to the rules of soccer prior to the match. This may include loading and executing an application (e.g., similar to application 410) that includes the necessary rules. In some embodiments, the data associated with the rules can be accessed from one or more external sources, such as officiating platform 1780. For example, a UAV 100 that is communicatively coupled to officiating platform 1780 may download an application (or other type of software module) that includes the necessary rules.

Figure 18:
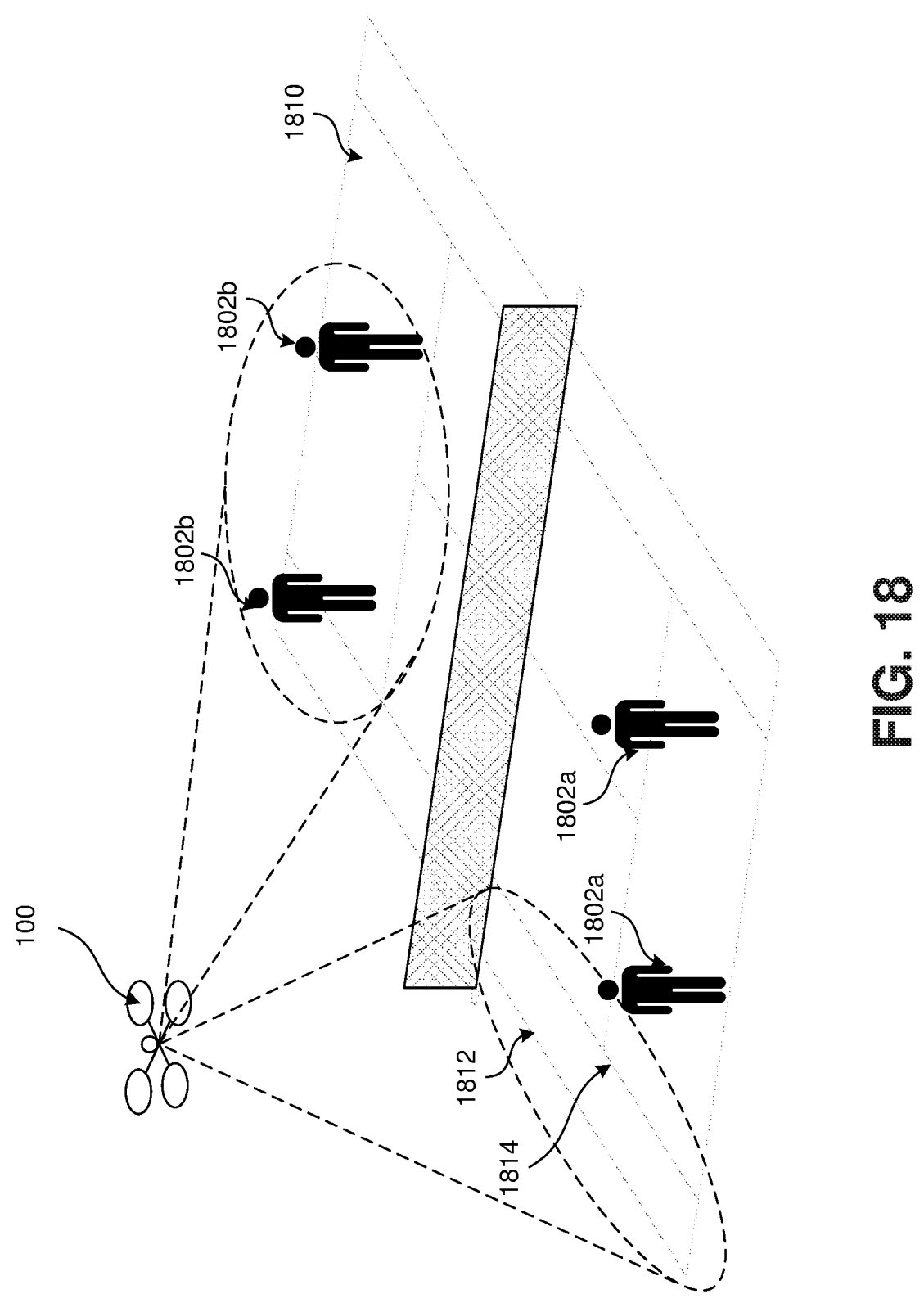
FIG. 18 shows a second example scenario for officiating a sporting event using an autonomous UAV.

In some embodiments, the UAV 100 may automatically select from a library of defined rules associated with multiple sports (and variations thereof) based on the observed characteristics of the sporting event occurring in the physical environment. FIG. 18 shows an example scenario of a doubles tennis match. Specifically, FIG. 18 shows an autonomous UAV 100 in flight over a tennis court 1810 that includes a first team of two players 1802a competing against a second team of two players 1802b. The rules for doubles tennis are the same as singles tennis except that a wider court is used. For example, a doubles tennis match uses an outer boundary line 1812 while a singles match uses an inner boundary line 1814.

As previously discussed, an autonomous UAV 100 can process available perception inputs (e.g., captured images) in order to gain an understanding of the surrounding environment. In the example scenario depicted in FIG. 18, the UAV 100 can determine, for example, that the sport is tennis by analyzing various observed characteristics such as the relative size, shape, and arrangement of objects such as the players, the net, the lines on the court, etc. The UAV 100 can also determine, more specifically, that the match is a doubles match as opposed to a singles match, for example, by observing that two players are on either side of the net. As previously discussed, such scene recognition can be implemented, for example, through the use of machine-learning models (e.g., implementing artificial neural networks). Such machine learning models can be trained using labeled video from various sporting events.

Utilizing this understanding of the conditions of the environment, the UAV 100 can then access the appropriate rules from a library containing multiple rules to apply while officiating the sporting event. For example, in response to determining that the sporting event is a doubles tennis match, the UAV 100 can access the rules for doubles tennis and apply the rules to determine, for example, when the ball is out of bounds (i.e., hits outside boundary line 1812). The library containing the multiple rules may be stored locally (e.g., as part of a software module such as an application) or may be stored at a remote source such as an officiating platform 1780.

Figure 19:
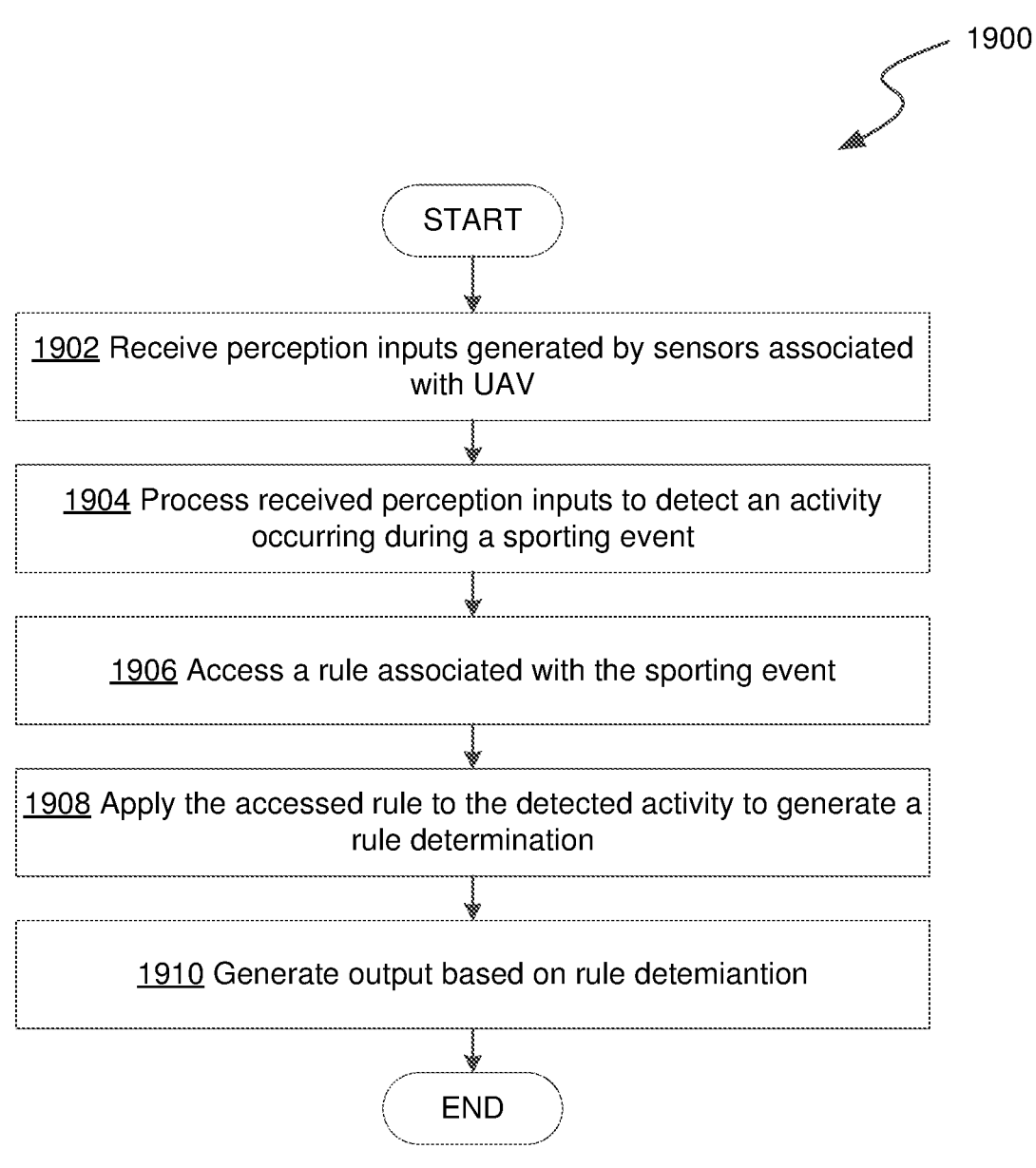
FIG. 19 shows a flow diagram of an example process for officiating a sporting event using an autonomous UAV.

FIG. 19 shows a flow diagram of an example process 1900 for officiating a sporting event using an autonomous UAV. One or more steps of the example process 1900 may be performed by any one or more of the components of the example systems described with respect to FIG. 30 or 31. For example, the process 1900 depicted in FIG. 19 may be represented in instructions stored in memory that are then executed by a processing unit. The process 1900 described with respect to FIG. 19 is an example provided for illustrative purposes and is not to be construed as limiting. Other processes may include more or fewer steps than depicted while remaining within the scope of the present disclosure. Further, the steps depicted in example process 1900 may be performed in a different order than is shown.

Example process 1900 begins at step 1902 with receiving perception inputs from one or more sensors associated with the UAV 100. The perception inputs may include images received from one or more image capture devices 114/115, results of processing such images (e.g., disparity images, depth values, semantic data, etc.), sensor data from one or more other sensors 112 on board the UAV 100 or associated with other computing devices (e.g., mobile device 104) in communication with the UAV 100, and/or data generated by, or otherwise transmitted from, other systems on board the UAV 100.

Example process 1900 continues at step 1904 with processing the received perception inputs to detect an activity occurring during the sporting event. For example, by applying computer vision techniques, one or more objects such as the field of play, the human players, and a ball, can be detected by processing images of the surrounding physical environment. In some embodiments, perception inputs are processed using one or more machine-learning models (e.g., artificial neural networks with deep learning) to detect, classify, and track multiple instances of various objects. Further, the motion of the detected objects can be tracked and analyzed to determine a state associated with the object and to extract semantic information regarding an activity according with respect to the detected objects. For example, the state of a human subject may include an activity by the human subject such as sitting, standing, walking, running, or jumping. This specific state information can be determined by analyzing the motion of the human subject. The determined states of multiple detected objects can be analyzed together to extract semantic understanding of an activity occurring such as "a first human subject kicked a ball to a second human subject." Additional details regarding the detection and tracking of objects are described with respect to FIGS. 24-29.

Example process 1900 continues at step 1906 with accessing a rule associated with the sporting event. For example, step 1906 may include accessing data associated with the rule from a storage device. In some embodiments, the rule may be accessed from a library including a plurality of rules for a plurality of different types of sporting events. In such an embodiment, the computer system may select the rule based on perception inputs. For example, in some embodiments, a computer system may process the perception inputs received at step 1902 to determine a characteristic of the sporting event occurring in the physical environment. Such characteristics may include, for example, the size/shape of the ball, the size/shape of the field or court, the number and arrangement of players on the field or court, etc. For example, as previously discussed with respect to FIG. 18, a processing system associated with a UAV 100 can process perception inputs to determine, for example, that two players are on either side of a net that bisects a rectangular region that corresponds with the size and shape of a tennis court. Using these determined characteristics, the computer system can infer that the activity observed through the perception inputs corresponds with a doubles tennis match. The computer system can then select, based on the determined characteristics, a particular rule (e.g., from a library) that is associated with a sporting event type that corresponds with the determined characteristics.

Example process 1900 continues at step 1908 with applying the accessed rule to the detected activity to generate a rule determination. Consider again the example scenario of a doubles tennis match described with respect to FIG. 18. In that scenario, perception inputs can be processed to detect an activity occurring during the tennis match such as a ball bouncing on the court 1810. Accessed rules that sets certain conditions for when the ball is in-play or out-of-bounds can be applied to the detected activity to determine whether the ball bouncing on the court is in-play or out-of-bounds.

Example process 1900 continues at step 1910 with generating an output based on the rule determination. For example, as previously discussed, an audible output can be generated that is indicative of the rule determination. The audible output can be generated by audio circuitry onboard the UAV 100 that is in autonomous flight over the sporting event or can also be generated by a PA system that is in wireless communication with the UAV 100. In some embodiments, the output can instead be visual. For example, a visual output including live or recorded video of the activity and an overlay indicative of the rule determination can be generated and displayed at a display device such as a mobile device 104.

Audio Input User-Interaction Paradigms

Figure 20:
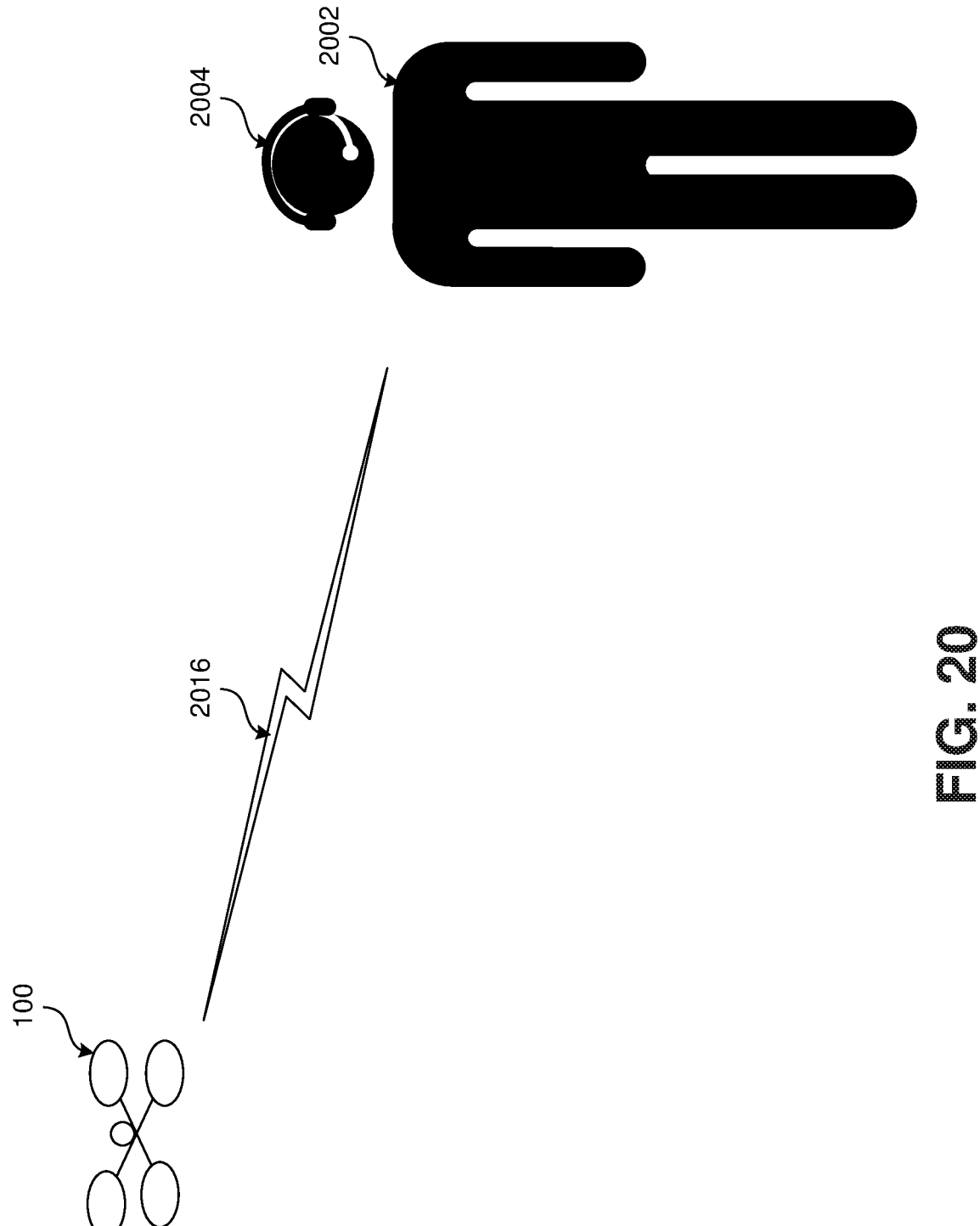
FIG. 20 shows a diagram that illustrates voice commands to an autonomous UAV using an audio device.

In some embodiments, a user can interact with an autonomous UAV 100 via an audio device, for example, including an earpiece (i.e., speaker) and/or microphone. FIG. 20 depicts a user 2002 interacting with an autonomous UAV 100 using an audio device 2004. In the example depicted in FIG. 20, the audio device 2904 is in the form of a head-mounted combination microphone and earpiece. The audio device 2004 may communicate with the UAV 100 via a wireless communication link 2016.

Using the audio device 2004, the user 2002 can issue verbal commands that are then interpreted by a navigation system of the UAV as objective inputs and utilized for autonomous motion planning purposes. For example, the user 2002 can issue a verbal "follow me" command that then causes the UAV 100 to detect and identify the user 2002 (e.g., using captured images of the surrounding physical environment) initiate tracking of the user 2002, and maneuver to follow the tracked user (e.g., at a predetermined or specified distance). Other verbal commands can similarly be input by a user using the audio device.

Notably, the sophisticated autonomous navigation capabilities of the UAV 100 allow the user to guide complex behavior even when inputting loose commands such as "follow me," or "film the quarterback on the next play." In other words, the user 2002 is not limited to simple direct commands such as forward, backward, up, down, etc. In some embodiments, natural language processing techniques are utilized to interpret the verbal inputs by the user 2002 via the audio device 2004. These interpreted commands can be fused with semantic understanding of the surrounding physical environment to further refine the commands. For example, if the user 2002 says "film the quarterback on the next play," the UAV 100 may scan the surrounding environment (e.g., using captured images) to locate a human subject that can be classified as a the quarterback (e.g., based on jersey number/name, position on the field, possession of the ball, etc.) and then autonomously maneuver and adjust an orientation of an image capture device 115 to keep the quarterback in a field of view of the image capture device 115.

In some embodiments, an audio device 2004 can be utilized to record audio of the surrounding environment that can be fused with video and/or audio captured by the UAV 100. The user 2002 may input a voice command to the audio device 2004 to initiate recording audio and stop recording audio.

Localization

Figure 21:
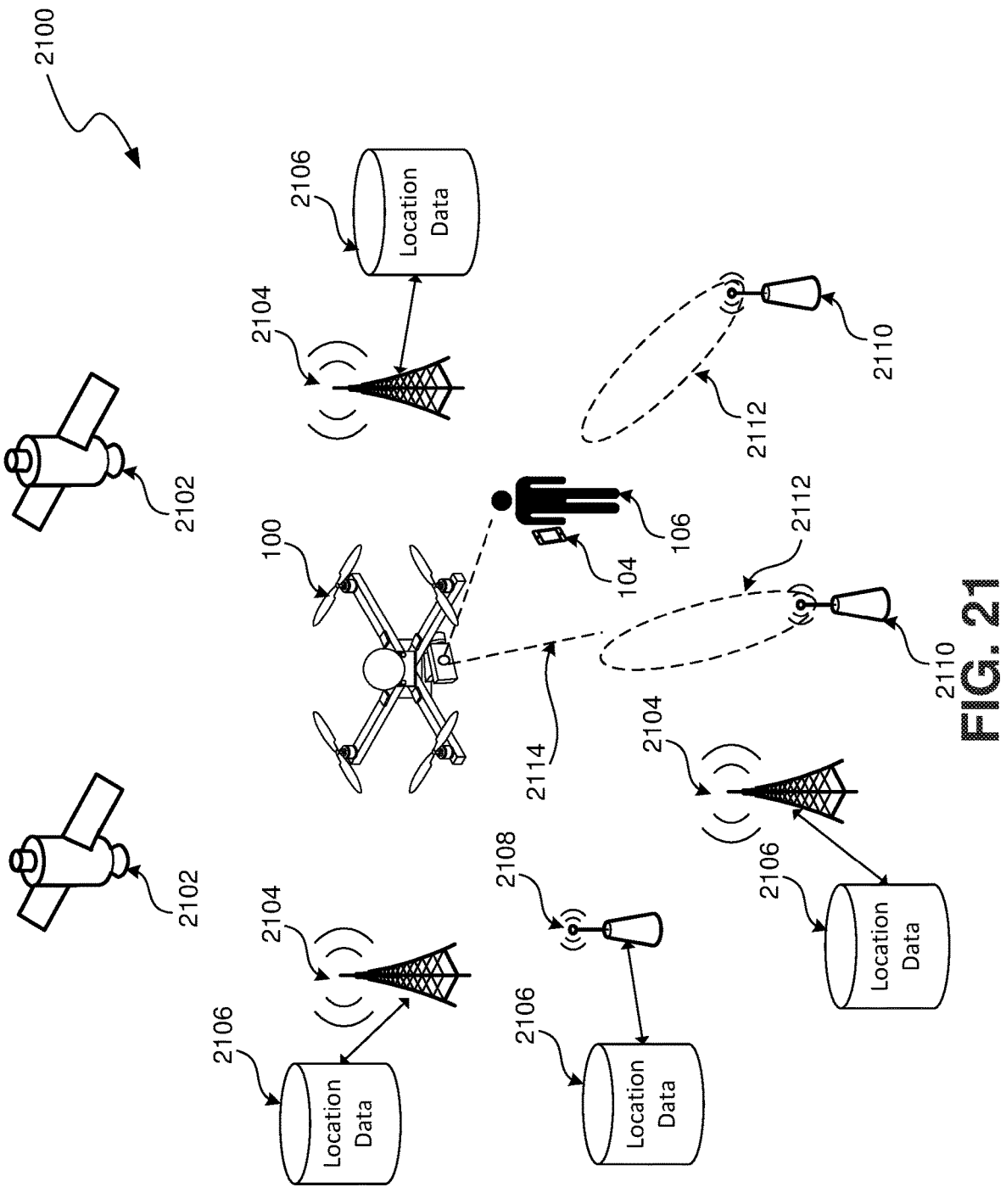
FIG. 21 shows a diagram of an example localization system with which at least some operations described in this disclosure can be implemented.

A navigation system 120 of a UAV 100 may employ any number of other systems and techniques for localization. FIG. 21 shows an illustration of an example localization system 2100 that may be utilized to guide autonomous navigation of a vehicle such as a UAV 100. In some embodiments, the positions and/or orientations of the UAV 100 and various other physical objects in the physical environment can be estimated using any one or more of the subsystems illustrated in FIG. 21. By tracking changes in the positions and/or orientations over time (continuously or at regular or irregular time intervals (i.e., continually)), the motions (e.g., velocity, acceleration, etc.) of UAV 100 and other objects may also be estimated. Accordingly, any systems described herein for determining position and/or orientation may similarly be employed for estimating motion.

As shown in FIG. 21, the example localization system 2100 may include the UAV 100, a global positioning system (GPS) comprising multiple GPS satellites 2102, a cellular system comprising multiple cellular antennae 3004 (with access to sources of localization data 2106), a Wi-Fi system comprising multiple Wi-Fi access points 2108 (with access to sources of localization data 2106), and/or a mobile device 104 operated by a user 106.

Satellite-based positioning systems such as GPS can provide effective global position estimates (within a few meters) of any device equipped with a receiver. For example, as shown in FIG. 21, signals received at a UAV 100 from satellites of a GPS system 2102 can be utilized to estimate a global position of the UAV 100. Similarly, positions relative to other devices (e.g., a mobile device 104) can be determined by communicating (e.g., over a wireless communication link 116) and comparing the global positions of the other devices.

Localization techniques can also be applied in the context of various communications systems that are configured to transmit communication signals wirelessly. For example, various localization techniques can be applied to estimate a position of UAV 100 based on signals transmitted between the UAV 100 and any of cellular antennae 2104 of a cellular system or Wi-Fi access points 2108, 2110 of a Wi-Fi system. Known positioning techniques that can be implemented include, for example, time of arrival (ToA), time difference of arrival (TDoA), round trip time (RTT), angle of Arrival (AoA), and received signal strength (RSS). Moreover, hybrid positioning systems implementing multiple techniques such as TDoA and AoA, ToA and RSS, or TDoA and RSS can be used to improve the accuracy.

Some Wi-Fi standards, such as 802.11ac, allow for RF signal beamforming (i.e., directional signal transmission using phased-shifted antenna arrays) from transmitting Wi-Fi routers. Beamforming may be accomplished through the transmission of RF signals at different phases from spatially distributed antennas (a "phased antenna array") such that constructive interference may occur at certain angles while destructive interference may occur at others, thereby resulting in a targeted directional RF signal field. Such a targeted field is illustrated conceptually in FIG. 21 by dotted lines 2112 emanating from Wi-Fi routers 2110.

An IMU may be used to estimate position and/or orientation of a device. An IMU is a device that measures a vehicle's angular velocity and linear acceleration. These measurements can be fused with other sources of information (e.g., those discussed above) to accurately infer velocity, orientation, and sensor calibrations. As described herein, a UAV 100 may include one or more IMUs. Using a method commonly referred to as "dead reckoning," an IMU (or associated systems) may estimate a current position based on previously measured positions using measured accelerations and the time elapsed from the previously measured positions. While effective to an extent, the accuracy achieved through dead reckoning based on measurements from an IMU quickly degrades due to the cumulative effect of errors in each predicted current position. Errors are further compounded by the fact that each predicted position is based on a calculated integral of the measured velocity. To counter such effects, an embodiment utilizing localization using an IMU may include localization data from other sources (e.g., the GPS, Wi-Fi, and cellular systems described above) to continually update the last known position and/or orientation of the object. Further, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Kalman filters are commonly applied in the area of aircraft navigation, guidance, and controls.

Computer vision may be used to estimate the position and/or orientation of a capturing camera (and by extension a device to which the camera is coupled), as well as other objects in the physical environment. The term, "computer vision" in this context may generally refer to any method of acquiring, processing, analyzing and "understanding" captured images. Computer vision may be used to estimate position and/or orientation using a number of different methods. For example, in some embodiments, raw image data received from one or more image capture devices (onboard or remote from the UAV 100) may be received and processed to correct for certain variables (e.g., differences in camera orientation and/or intrinsic parameters (e.g., lens variations)). As previously discussed with respect to FIG. 1A, the UAV 100 may include two or more image capture devices 114/115. By comparing the captured image from two or more vantage points (e.g., at different time steps from an image capture device in motion), a system employing computer vision may calculate estimates for the position and/or orientation of a vehicle on which the image capture device is mounted (e.g., UAV 100) and/or of captured objects in the physical environment (e.g., a tree, building, etc.).

Figure 22:
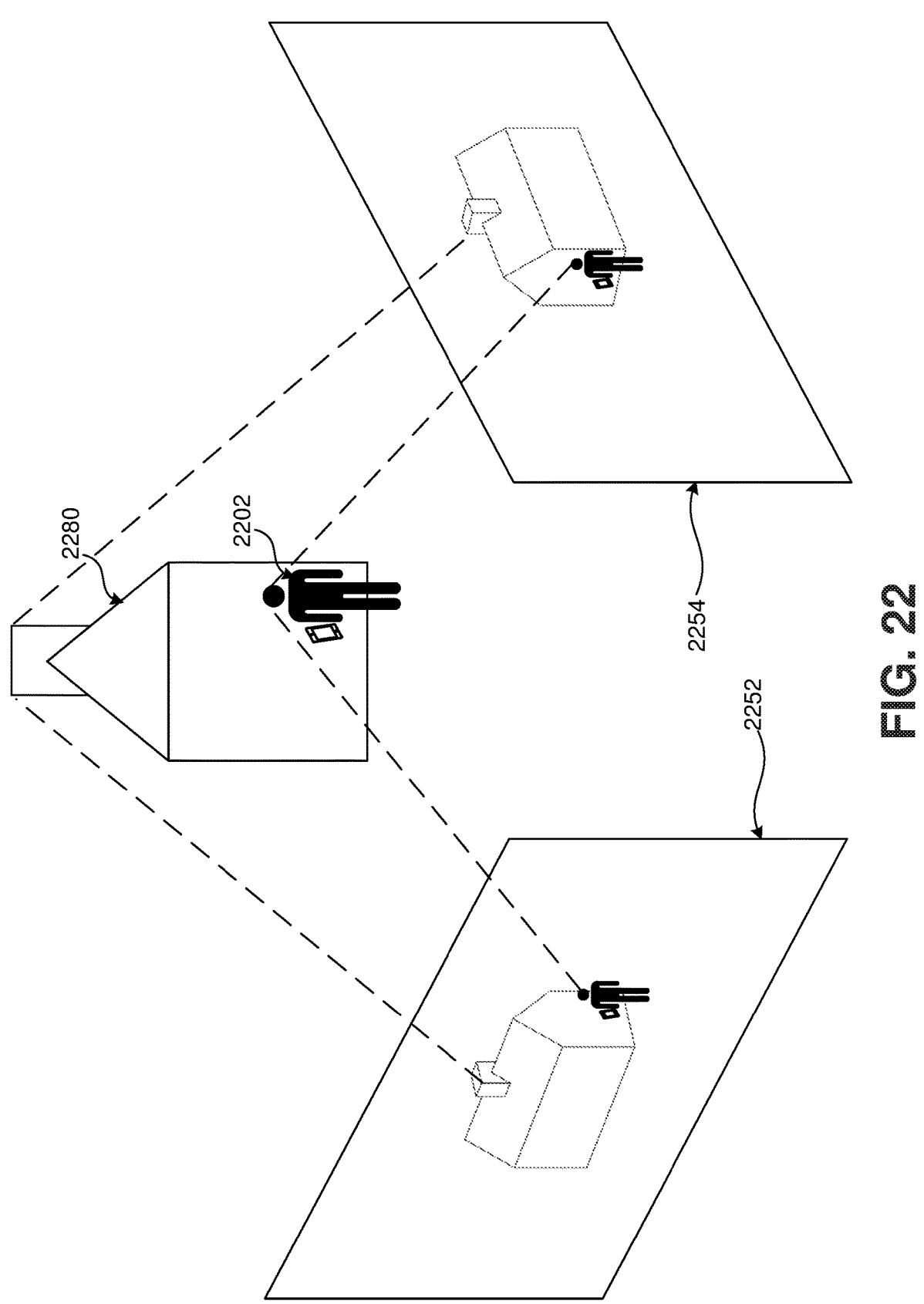
FIG. 22 shows a diagram illustrating the concept of visual odometry based on captured images.

Computer vision can be applied to estimate position and/or orientation using a process referred to as "visual odometry." FIG. 22 illustrates the working concept behind visual odometry at a high level. A plurality of images are captured in sequence as an image capture device moves through space. Due to the movement of the image capture device, the images captured of the surrounding physical environment change from frame to frame. In FIG. 22, this is illustrated by initial image capture FOV 2252 and a subsequent image capture FOV 2254 captured as the image capture device has moved from a first position to a second position over a period of time. In both images, the image capture device may capture real world physical objects, for example, the house 2280 and/or the person 2202. Computer vision techniques are applied to the sequence of images to detect and match features of physical objects captured in the FOV of the image capture device. For example, a system employing computer vision may search for correspondences in the pixels of digital images that have overlapping FOV. The correspondences may be identified using a number of different methods such as correlation-based and feature-based methods. As shown in FIG. 22, features such as the head of a human subject 2202 or the corner of the chimney on the house 2280 can be identified, matched, and thereby tracked. By incorporating sensor data from an IMU (or accelerometer(s) or gyroscope(s)) associated with the image capture device to the tracked features of the image capture, estimations may be made for the position and/or orientation of the image capture relative to the objects 2280, 2202 captured in the images. Further, these estimates can be used to calibrate various other systems, for example, through estimating differences in camera orientation and/or intrinsic parameters (e.g., lens variations) or IMU biases and/or orientation. Visual odometry may be applied at both the UAV 100 and any other computing device, such as a mobile device 104, to estimate the position and/or orientation of the UAV 100 and/or other objects. Further, by communicating the estimates between the systems (e.g., via a wireless communication link 116) estimates may be calculated for the respective positions and/or orientations relative to each other. Position and/or orientation estimates based in part on sensor data from an on board IMU may introduce error propagation issues. As previously stated, optimization techniques may be applied to such estimates to counter uncertainties. In some embodiments, a nonlinear estimation algorithm (one embodiment being an "extended Kalman filter") may be applied to a series of measured positions and/or orientations to produce a real-time optimized prediction of the current position and/or orientation based on assumed uncertainties in the observed data. Such estimation algorithms can be similarly applied to produce smooth motion estimations.

In some embodiments, data received from sensors onboard UAV 100 can be processed to generate a 3D map of the surrounding physical environment while estimating the relative positions and/or orientations of the UAV 100 and/or other objects within the physical environment. This process is sometimes referred to as simultaneous localization and mapping (SLAM). In such embodiments, using computer vision processing, a system in accordance with the present teaching, can search for dense correspondence between images with overlapping FOV (e.g., images taken during sequential time steps and/or stereoscopic images taken at the same time step). The system can then use the dense correspondences to estimate a depth or distance to each pixel represented in each image. These depth estimates can then be used to continually update a generated 3D model of the physical environment taking into account motion estimates for the image capture device (i.e., UAV 100) through the physical environment.

Figure 23:
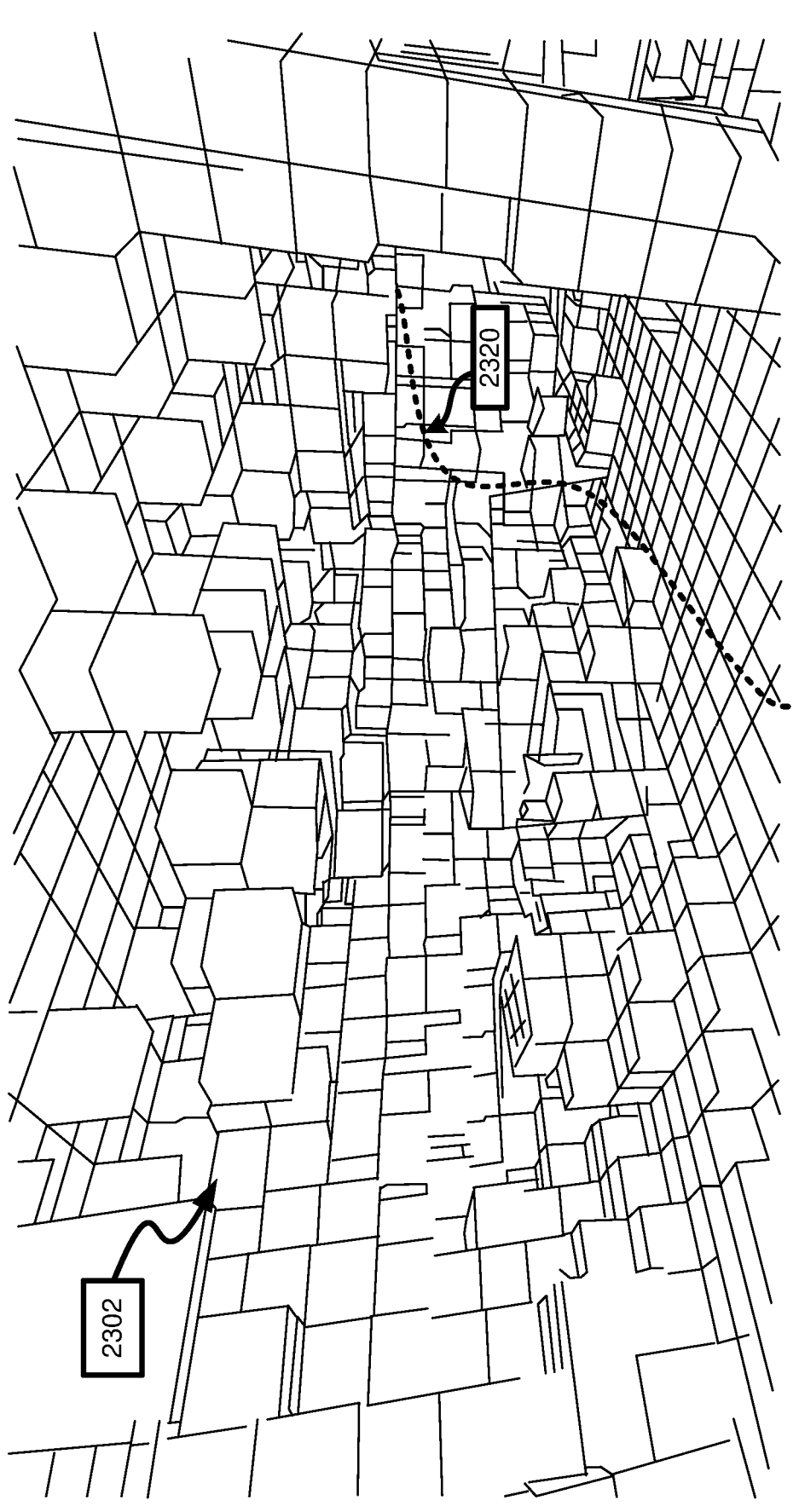
FIG. 23 shows an example view of a three-dimensional (3D) occupancy map of a physical environment.

In some embodiments, a 3D model of the surrounding physical environment may be generated as a 3D occupancy map that includes multiple voxels with each voxel corresponding to a 3D volume of space in the physical environment that is at least partially occupied by a physical object. For example, FIG. 23 shows an example view of a 3D occupancy map 2302 of a physical environment including multiple cubical voxels. Each of the voxels in the 3D occupancy map 2302 correspond to a space in the physical environment that is at least partially occupied by a physical object. A navigation system 120 of a UAV 100 can be configured to navigate the physical environment by planning a 3D trajectory 2320 through the 3D occupancy map 2302 that avoids the voxels. In some embodiments, this 3D trajectory 2320 plan using the 3D occupancy map 2302 can be optimized by applying an image space motion planning process. In such an embodiment, the planned 3D trajectory 2320 of the UAV 100 is projected into an image space of captured images for analysis relative to certain identified high cost regions (e.g., regions having invalid depth estimates).

Computer vision may also be applied using sensing technologies other than cameras, such as light detection and ranging (LIDAR) technology. For example, a UAV 100 equipped with LIDAR may emit one or more laser beams in a scan up to 360 degrees around the UAV 100. Light received by the UAV 100 as the laser beams reflect off physical objects in the surrounding physical world may be analyzed to construct a real-time 3D computer model of the surrounding physical world. Depth sensing through the use of LIDAR may in some embodiments augment depth sensing through pixel correspondence as described earlier. Further, images captured by cameras (e.g., as described earlier) may be combined with the laser constructed 3D models to form textured 3D models that may be further analyzed in real-time or near-real-time for physical object recognition (e.g., by using computer vision algorithms).

The computer vision-aided localization techniques described above may calculate the position and/or orientation of objects in the physical world in addition to the position and/or orientation of the UAV 100. The estimated positions and/or orientations of these objects may then be fed into a motion planning system 130 of the navigation system 120 to plan paths that avoid obstacles while satisfying certain objectives (e.g., as previously described). In addition, in some embodiments, a navigation system 120 may incorporate data from proximity sensors (e.g., electromagnetic, acoustic, and/or optics based) to estimate obstacle positions with more accuracy. Further refinement may be possible with the use of stereoscopic computer vision with multiple cameras, as described earlier.

The localization system 2100 of FIG. 21 (including all of the associated subsystems as previously described) is only one example of a system configured to estimate positions and/or orientations of a UAV 100 and other objects in the physical environment. A localization system 2100 may include more or fewer components than shown, may combine two or more components, or may have a different configuration or arrangement of the components. Some of the various components shown in FIG. 21 may be implemented in hardware, software or a combination of both hardware and software, including one or more signal processing and/or application specific integrated circuits.

Object Tracking

A UAV 100 can be configured to track one or more objects, for example, to enable intelligent autonomous flight. The term "objects" in this context can include any type of physical object occurring in the physical world. Objects can include dynamic objects such as a people, animals, and other vehicles. Objects can also include static objects such as landscape features, buildings, and furniture. Further, certain descriptions herein may refer to a "subject" (e.g., human subject 102). The terms "subject" as used in this disclosure may simply refer to an object being tracked using any of the disclosed techniques. The terms "object" and "subject" may, therefore, be used interchangeably.

With reference to FIG. 2, A tracking system 140 associated with a UAV 100 can be configured to track one or more physical objects based on images of the objects captured by image capture devices (e.g., image capture devices 114 and/or 115) onboard the UAV 100. While a tracking system 140 can be configured to operate based only on input from image capture devices, the tracking system 140 can also be configured to incorporate other types of information to aid in the tracking. For example, various other techniques for measuring, estimating, and/or predicting the relative positions and/or orientations of the UAV 100 and/or other objects are described with respect to FIGS. 21-23.

Figure 24:
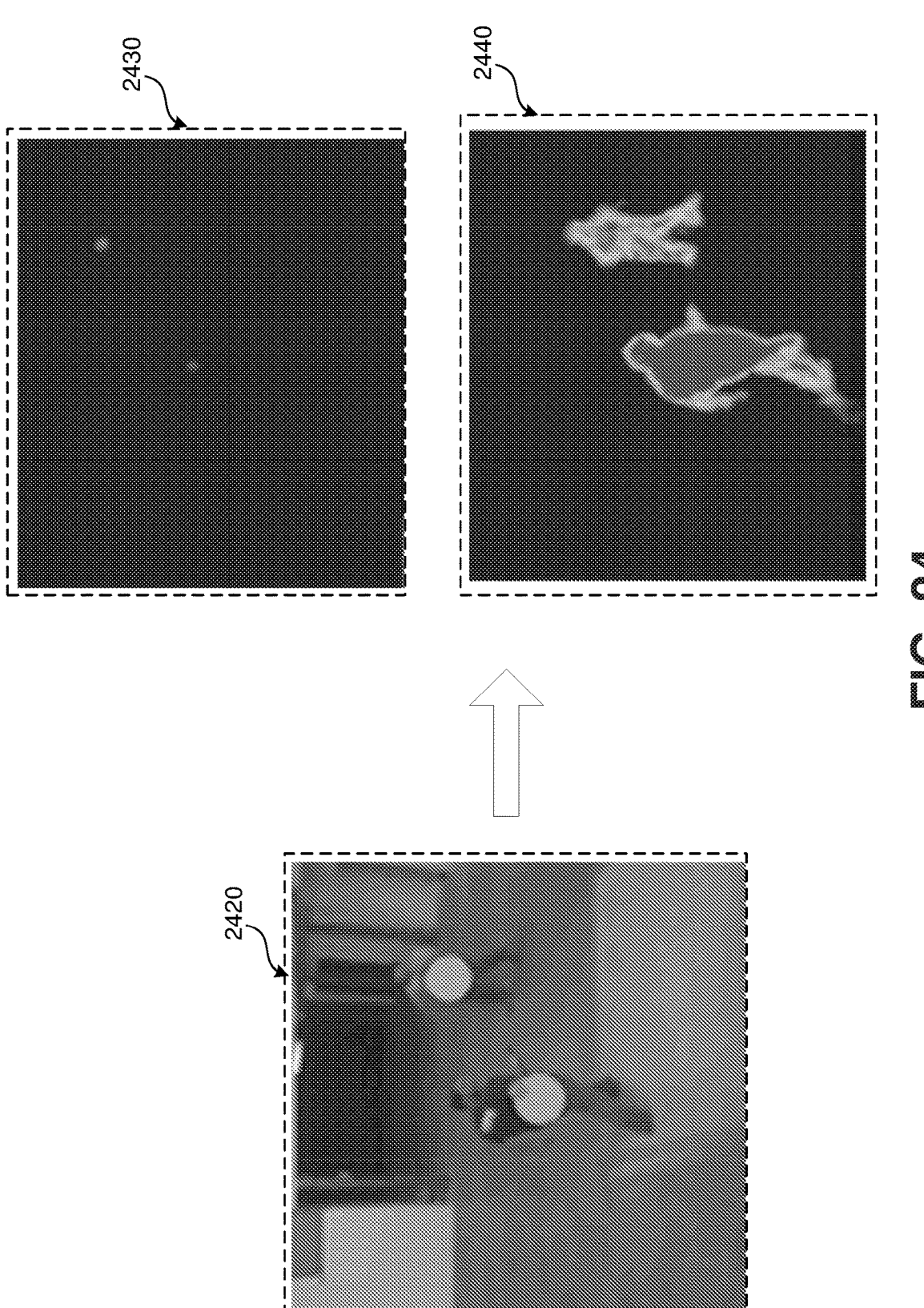
FIG. 24 shows an example image captured by a UAV in flight through a physical environment with associated visualizations of data regarding tracked objects based on processing of the captured image.

In some embodiments, a tracking system 140 can be configured to fuse information pertaining to two primary categories: semantics and 3D geometry. As images are received, the tracking system 140 may extract semantic information regarding certain objects captured in the images based on an analysis of the pixels in the images. Semantic information regarding a captured object can include information such as an object's category (i.e., class), location, shape, size, scale, pixel segmentation, orientation, inter-class appearance, activity, and pose. In an example embodiment, the tracking system 140 may identify general locations and categories of objects based on captured images and then determine or infer additional more detailed information about individual instances of objects based on further processing. Such a process may be performed as a sequence of discrete operations, a series of parallel operations, or as a single operation. For example, FIG. 24 shows an example image 2420 captured by a UAV in flight through a physical environment. As shown in FIG. 24, the example image 2420 includes captures of two physical objects, specifically, two people present in the physical environment. The example image 2420 may represent a single frame in a series of frames of video captured by the UAV. A tracking system 140 may first identify general locations of the captured objects in the image 2420. For example, pixel map 2430 shows two dots corresponding to the general locations of the captured objects in the image. These general locations may be represented as image coordinates. The tracking system 140 may further process the captured image 2420 to determine information about the individual instances of the captured objects. For example, pixel map 2440 shows a result of additional processing of image 2420 identifying pixels corresponding to the individual object instances (i.e., people in this case). Semantic cues can be used to locate and identify objects in captured images as well as associate identified objects occurring in multiple images. For example, as previously mentioned, the captured image 2420 depicted in FIG. 24 may represent a single frame in a sequence of frames of a captured video. Using semantic cues, a tracking system 140 may associate regions of pixels captured in multiple images as corresponding to the same physical object occurring in the physical environment.

In some embodiments, a tracking system 140 can be configured to utilize 3D geometry of identified objects to associate semantic information regarding the objects based on images captured from multiple views in the physical environment. Images captured from multiple views may include images captured by multiple image capture devices having different positions and/or orientations at a single time instant. For example, each of the image capture devices 114 shown mounted to a UAV 100 in FIG. 1A may include cameras at slightly offset positions (to achieve stereoscopic capture). Further, even if not individually configured for stereoscopic image capture, the multiple image capture devices 114 may be arranged at different positions relative to the UAV 100, for example, as shown in FIG. 1A. Images captured from multiple views may also include images captured by an image capture device at multiple time instants as the image capture device moves through the physical environment. For example, any of the image capture devices 114 and/or 115 mounted to UAV 100 will individually capture images from multiple views as the UAV 100 moves through the physical environment.

Figure 25:
FIG. 25 shows a diagram illustrating an example process for estimating a trajectory of an object based on multiple images captured by a UAV.

Using an online visual-inertial state estimation system, a tracking system 140 can determine or estimate a trajectory of the UAV 100 as it moves through the physical environment. Thus, the tracking system 140 can associate semantic information in captured images, such as locations of detected objects, with information about the 3D trajectory of the objects, using the known or estimated 3D trajectory of the UAV 100. For example, FIG. 25 shows a trajectory 2510 of a UAV 100 moving through a physical environment. As the UAV 100 moves along trajectory 2510, the one or more image capture devices (e.g., devices 114 and/or 115) capture images of the physical environment at multiple views 2512a-c. Included in the images at multiple views 2512a-c are captures of an object such as a human subject 102. By processing the captured images at multiple views 2512a-c, a trajectory 2520 of the object can also be resolved.

Object detections in captured images create rays from a center position of a capturing camera to the object along which the object lies, with some uncertainty. The tracking system 140 can compute depth measurements for these detections, creating a plane parallel to a focal plane of a camera along which the object lies, with some uncertainty. These depth measurements can be computed by a stereo vision algorithm operating on pixels corresponding with the object between two or more camera images at different views. The depth computation can look specifically at pixels that are labeled to be part of an object of interest (e.g., a subject 102). The combination of these rays and planes over time can be fused into an accurate prediction of the 3D position and velocity trajectory of the object over time.

While a tracking system 140 can be configured to rely exclusively on visual data from image capture devices onboard a UAV 100, data from other sensors (e.g., sensors on the object, on the UAV 100, or in the environment) can be incorporated into this framework when available. Additional sensors may include GPS, IMU, barometer, magnetometer, and cameras or other devices such as a mobile device 104. For example, a GPS signal from a mobile device 104 held by a person can provide rough position measurements of the person that are fused with the visual information from image capture devices onboard the UAV 100. An IMU sensor at the UAV 100 and/or a mobile device 104 can provide acceleration and angular velocity information, a barometer can provide relative altitude, and a magnetometer can provide heading information. Images captured by cameras on a mobile device 104 held by a person can be fused with images from cameras onboard the UAV 100 to estimate relative pose between the UAV 100 and the person by identifying common features captured in the images. Various other techniques for measuring, estimating, and/or predicting the relative positions and/or orientations of the UAV 100 and/or other objects are described with respect to FIGS. 21-23.

Figure 26:
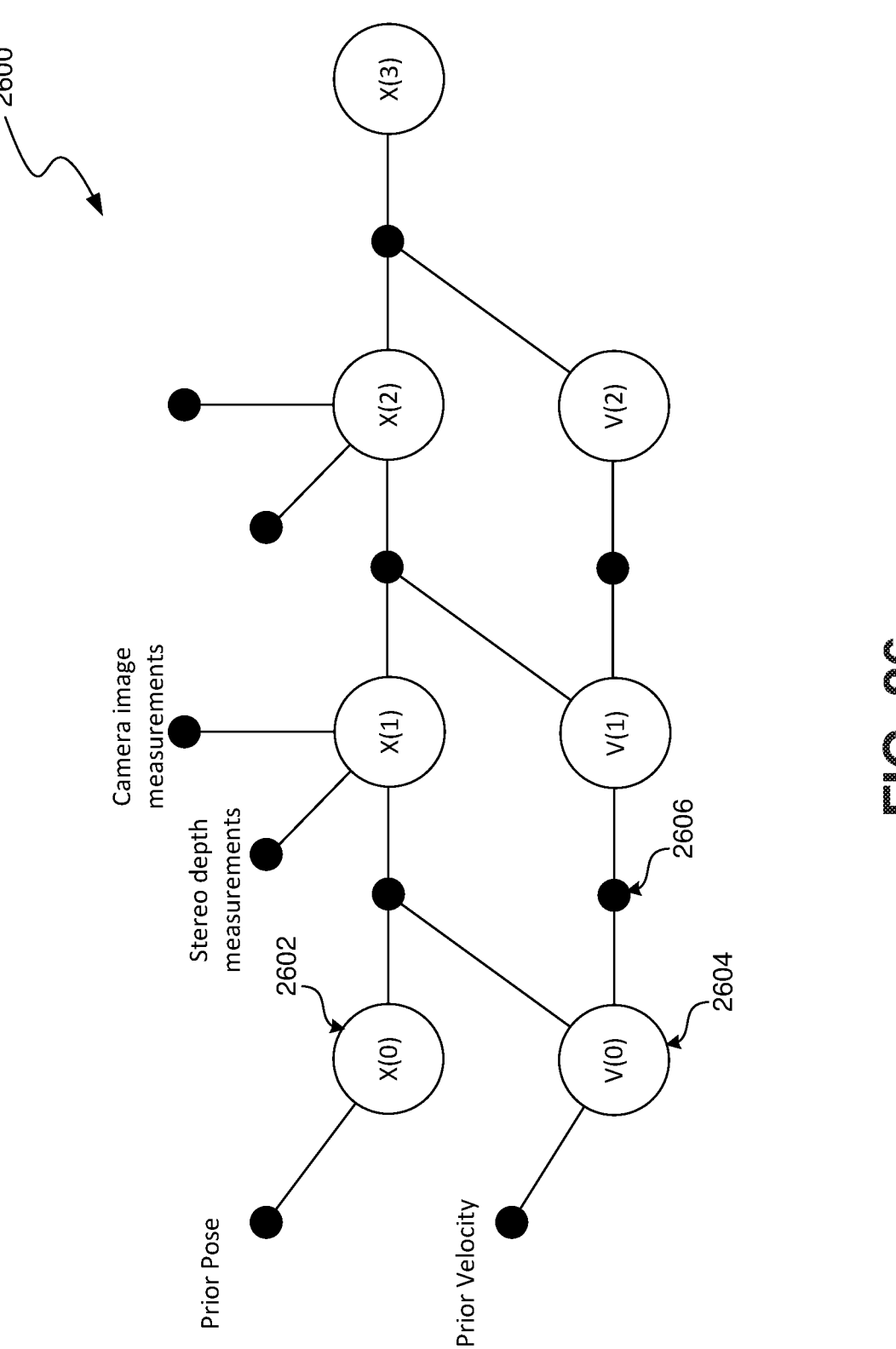
FIG. 26 shows a diagrammatic representation of an example spatiotemporal factor graph.

In some embodiments, data from various sensors are input into a spatiotemporal factor graph to probabilistically minimize total measurement error using non-linear optimization. FIG. 26 shows a diagrammatic representation of an example spatiotemporal factor graph 2600 that can be used to estimate a 3D trajectory of an object (e.g., including pose and velocity over time). In the example, spatiotemporal factor graph 2600 depicted in FIG. 26, variable values such as the pose and velocity (represented as nodes (2602 and 2604 respectively)) connected by one or more motion model processes (represented as nodes 2606 along connecting edges). For example, an estimate or prediction for the pose of the UAV 100 and/or other object at time step 1 (i.e., variable X(1)) may be calculated by inputting estimated pose and velocity at a prior time step (i.e., variables X(0) and V(0)) as well as various perception inputs such as stereo depth measurements and camera image measurements via one or more motion models. A spatiotemporal factor model can be combined with an outlier rejection mechanism wherein measurements deviating too far from an estimated distribution are thrown out. In order to estimate a 3D trajectory from measurements at multiple time instants, one or more motion models (or process models) are used to connect the estimated variables between each time step in the factor graph. Such motion models can include any one of constant velocity, zero velocity, decaying velocity, and decaying acceleration. Applied motion models may be based on a classification of a type of object being tracked and/or learned using machine learning techniques. For example, a cyclist is likely to make wide turns at speed, but is not expected to move sideways. Conversely, a small animal such as a dog may exhibit a more unpredictable motion pattern.

Figure 27:
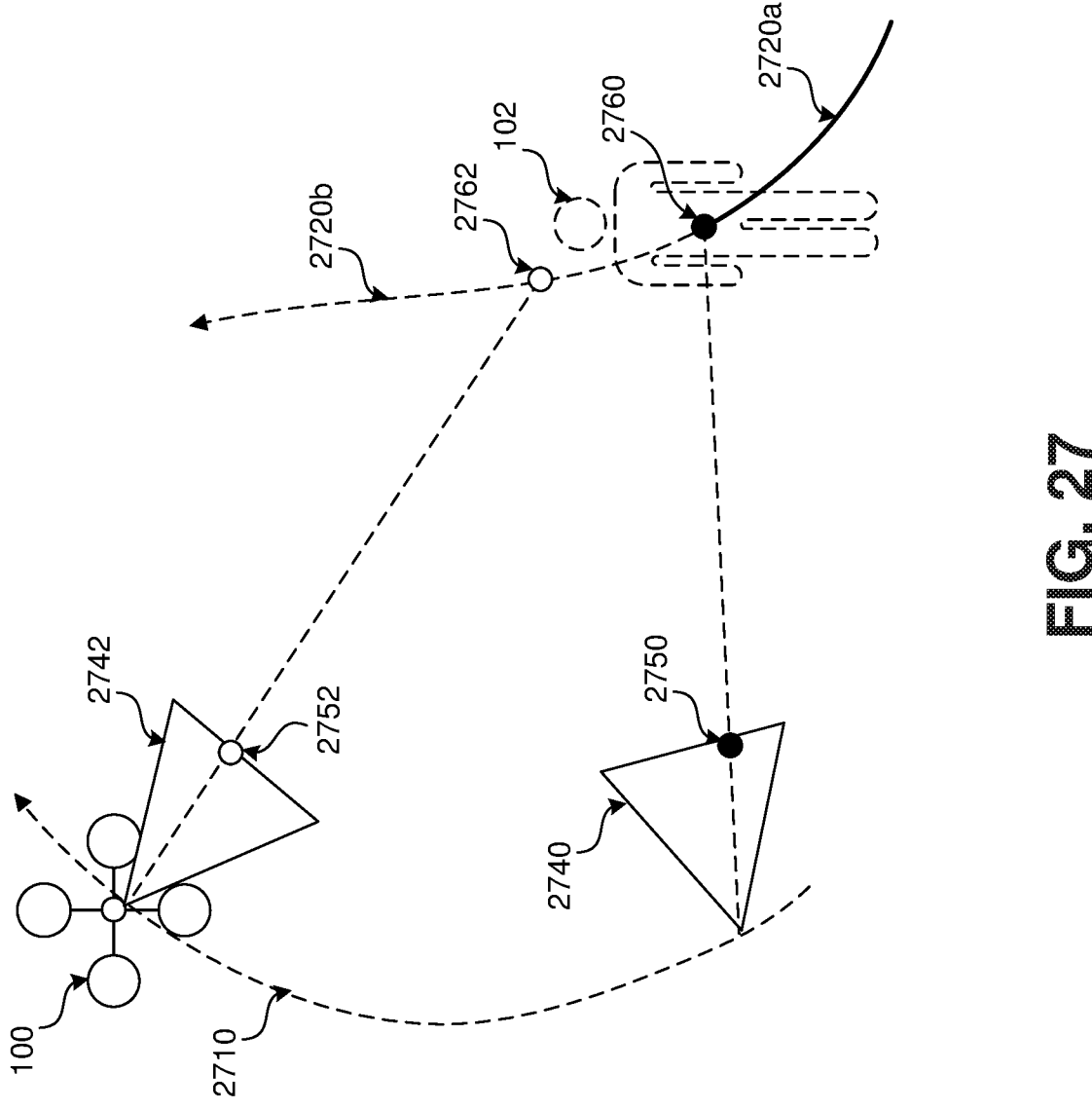
FIG. 27 shows a diagram that illustrates an example process of generating an intelligent initial estimate for where a tracked object will appear in a subsequently captured image.

In some embodiments, a tracking system 140 can generate an intelligent initial estimate for where a tracked object will appear in a subsequently captured image based on a predicted 3D trajectory of the object. FIG. 27 shows a diagram that illustrates this concept. As shown in FIG. 27, a UAV 100 is moving along a trajectory 2710 while capturing images of the surrounding physical environment, including of a human subject 102. As the UAV 100 moves along the trajectory 2710, multiple images (e.g., frames of video) are captured from one or more mounted image capture devices 114/115. FIG. 27 shows a first FOV of an image capture device at a first pose 2740 and a second FOV of the image capture device at a second pose 2742. In this example, the first pose 2740 may represent a previous pose of the image capture device at a time instant t(0) while the second pose 2742 may represent a current pose of the image capture device at a time instant t(1). At time instant t(0), the image capture device captures an image of the human subject 102 at a first 3D position 2760 in the physical environment. This first position 2760 may be the last known position of the human subject 102. Given the first pose 2740 of the image capture device, the human subject 102 while at the first 3D position 2760 appears at a first image position 2750 in the captured image. An initial estimate for a second (or current) image position 2752 can therefore be made based on projecting a last known 3D trajectory 2720*a* of the human subject 102 forward in time using one or more motion models associated with the object. For example, predicted trajectory 2720*b* shown in FIG. 27 represents this projection of the 3D trajectory 2720*a* forward in time. A second 3D position 2762 (at time t(1)) of the human subject 102 along this predicted trajectory 2720*b* can then be calculated based on an amount of time elapsed from t(0) to t(1). This second 3D position 2762 can then be projected into the image plane of the image capture device at the second pose 2742 to estimate the second image position 2752 that will correspond to the human subject 102. Generating such an initial estimate for the position of a tracked object in a newly captured image narrows down the search space for tracking and enables a more robust tracking system, particularly in the case of a UAV 100 and/or tracked object that exhibits rapid changes in position and/or orientation.

In some embodiments, the tracking system 140 can take advantage of two or more types of image capture devices onboard the UAV 100. For example, as previously described with respect to FIG. 1A, the UAV 100 may include image capture device 114 configured for visual navigation, as well as an image capture device 115 for capturing images that are to be viewed. The image capture devices 114 may be configured for low-latency, low-resolution, and high FOV, while the image capture device 115 may be configured for high resolution. An array of image capture devices 114 about a perimeter of the UAV 100 can provide low-latency information about objects up to 360 degrees around the UAV 100 and can be used to compute depth using stereo vision algorithms. Conversely, the other image capture device 115 can provide more detailed images (e.g., high resolution, color, etc.) in a limited FOV.

Combining information from both types of image capture devices 114 and 115 can be beneficial for object tracking purposes in a number of ways. First, the high-resolution color information from an image capture device 115 can be fused with depth information from the image capture devices 114 to create a 3D representation of a tracked object. Second, the low-latency of the image capture devices 114 can enable more accurate detection of objects and estimation of object trajectories. Such estimates can be further improved and/or corrected based on images received from a high-latency, high resolution image capture device 115. The image data from the image capture devices 114 can either be fused with the image data from the image capture device 115, or can be used purely as an initial estimate.

By using the image capture devices 114, a tracking system 140 can achieve tracking of objects up to 360 degrees around the UAV 100. The tracking system 140 can fuse measurements from any of the image capture devices 114 or 115 when estimating a relative position and/or orientation of a tracked object as the positions and orientations of the image capture devices 114 and 115 change over time. The tracking system 140 can also orient the image capture device 115 to get more accurate tracking of specific objects of interest, fluidly incorporating information from both image capture modalities. Using knowledge of where all objects in the scene are, the UAV 100 can exhibit more intelligent autonomous flight.

As previously discussed, the high-resolution image capture device 115 may be mounted to an adjustable mechanism such as a gimbal that allows for one or more degrees of freedom of motion relative to the body of the UAV 100. Such a configuration is useful in stabilizing image capture as well as tracking objects of particular interest. An active gimbal mechanism configured to adjust an orientation of a higher-resolution image capture device 115 relative to the UAV 100 so as to track a position of an object in the physical environment may allow for visual tracking at greater distances than may be possible through use of the lower-resolution image capture devices 114 alone. Implementation of an active gimbal mechanism may involve estimating the orientation of one or more components of the gimbal mechanism at any given time. Such estimations may be based on any of hardware sensors coupled to the gimbal mechanism (e.g., accelerometers, rotary encoders, etc.), visual information from the image capture devices 114/115, or a fusion based on any combination thereof.

Figure 28:
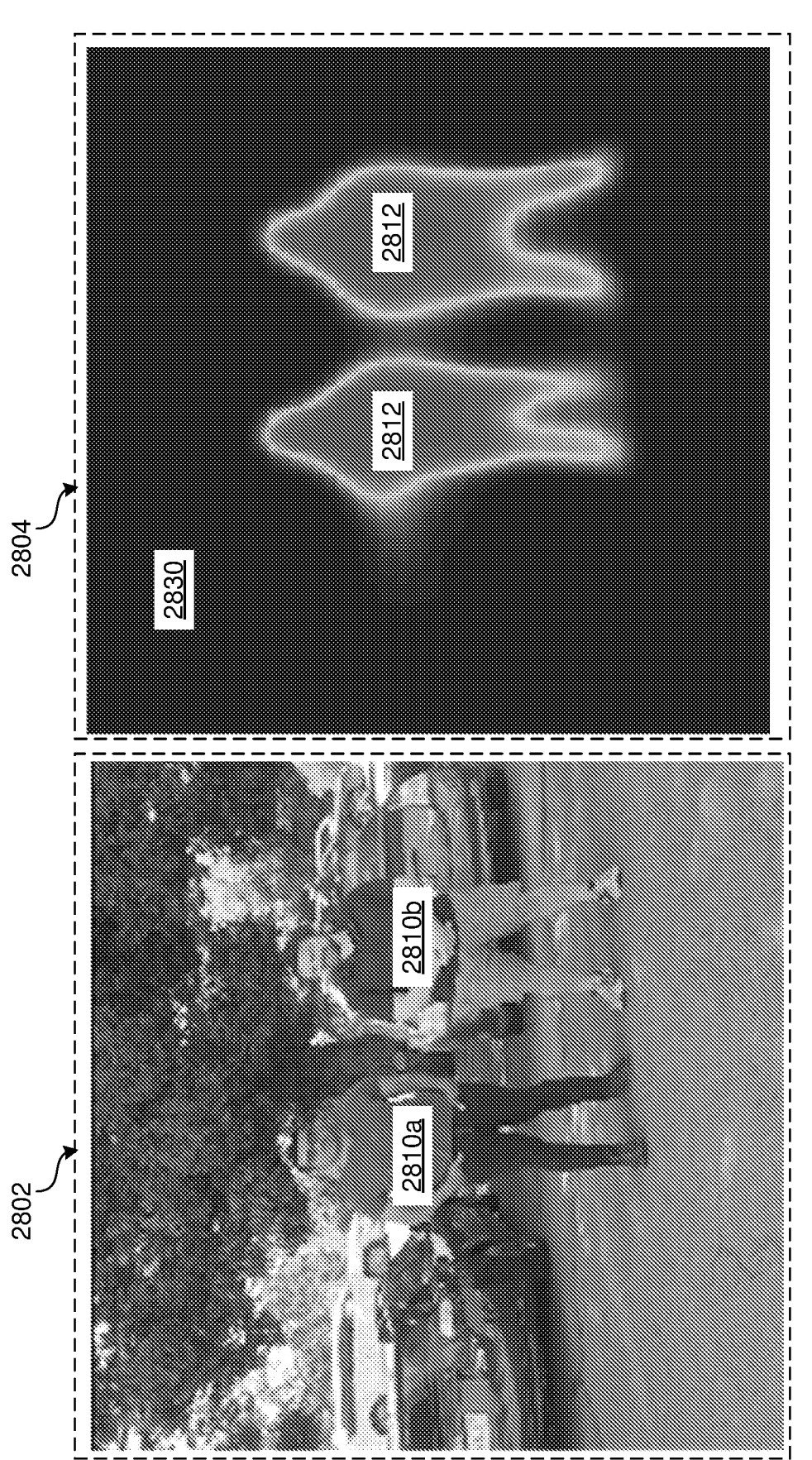
FIG. 28 shows a visualization representative of a dense per-pixel segmentation of a captured image.

A tracking system 140 may include an object detection system for detecting and tracking various objects. Given one or more classes of objects (e.g., humans, buildings, cars, animals, etc.), the object detection system may identify instances of the various classes of objects occurring in captured images of the physical environment. Outputs by the object detection system can be parameterized in a few different ways. In some embodiments, the object detection system processes received images and outputs a dense per-pixel segmentation, where each pixel is associated with a value corresponding to either an object class label (e.g., human, building, car, animal, etc.) and/or a likelihood of belonging to that object class. For example, FIG. 28 shows a visualization 2804 of a dense per-pixel segmentation of a captured image 2802 where pixels corresponding to detected objects 2810*a-b* classified as humans are set apart from all other pixels in the image 2802. Another parameterization may include resolving the image location of a detected object to a particular image coordinate, for example, based on centroid of the representation of the object in a received image.

In some embodiments, the object detection system can utilize a deep convolutional neural network for object detection. For example, the input may be a digital image (e.g., image 2802), and the output may be a tensor with the same spatial dimension. Each slice of the output tensor may represent a dense segmentation prediction, where each pixel's value is proportional to the likelihood of that pixel belonging to the class of object corresponding to the slice. For example, the visualization 2804 shown in FIG. 28 may represent a particular slice of the aforementioned tensor where each pixel's value is proportional to the likelihood that the pixel corresponds with a human. In addition, the same deep convolutional neural network can also predict the centroid locations for each detected instance, as described in the following section.

A tracking system 140 may also include an instance segmentation system for distinguishing between individual instances of objects detected by the object detection system. In some embodiments, the process of distinguishing individual instances of detected objects may include processing digital images captured by the UAV 100 to identify pixels belonging to one of a plurality of instances of a class of physical objects present in the physical environment and captured in the digital images. As previously described with respect to FIG. 28, a dense per-pixel segmentation algorithm can classify certain pixels in an image as corresponding to one or more classes of objects. This segmentation process output may allow a tracking system 140 to distinguish the objects represented in an image and the rest of the image (i.e., a background). For example, the visualization 2804 distinguishes pixels that correspond to humans (e.g., included in region 2812) from pixels that do not correspond to humans (e.g., included in region 2830). However, this segmentation process does not necessarily distinguish between individual instances of the detected objects. A human viewing the visualization 2804 may conclude that the pixels corresponding to humans in the detected image actually correspond to two separate humans; however, without further analysis, a tracking system 140 may be unable to make this distinction.

Figure 29:
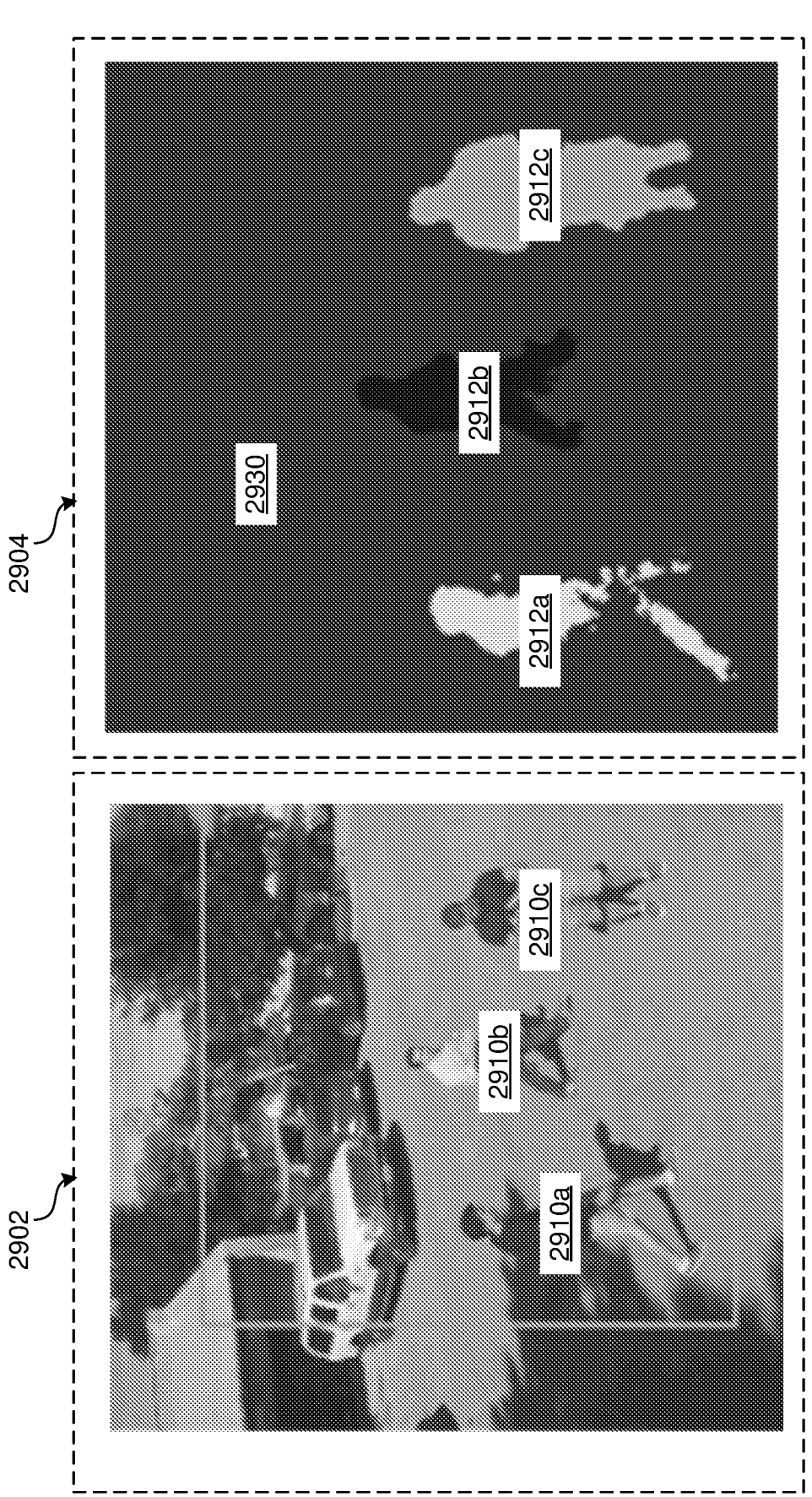
FIG. 29 shows a visualization representative of an instance segmentation of a captured image.

Effective object tracking may involve distinguishing pixels that correspond to distinct instances of detected objects. This process is known as "instance segmentation." FIG. 29 shows an example visualization 2904 of an instance segmentation output based on a captured image 2902. Similar to the dense per-pixel segmentation process described with respect to FIG. 28, the output represented by visualization 2904 distinguishes pixels (e.g., included in regions 2912*a-c*) that correspond to detected objects 2910*a-c* of a particular class of objects (in this case humans) from pixels that do not correspond to such objects (e.g., included in region 2930). Notably, the instance segmentation process goes a step further to distinguish pixels corresponding to individual instances of the detected objects from each other. For example, pixels in region 2912*a* correspond to a detected instance of a human 2910*a*, pixels in region 2912*b* correspond to a detected instance of a human 2910*b*, and pixels in region 2912*c* correspond to a detected instance of a human 2910*c*.

Distinguishing between instances of detected objects may be based on an analysis of pixels corresponding to detected objects. For example, a grouping method may be applied by the tracking system 140 to associate pixels corresponding to a particular class of object to a particular instance of that class by selecting pixels that are substantially similar to certain other pixels corresponding to that instance, pixels that are spatially clustered, pixel clusters that fit an appearance-based model for the object class, etc. Again, this process may involve applying a deep convolutional neural network to distinguish individual instances of detected objects.

Instance segmentation may associate pixels corresponding to particular instances of objects; however, such associations may not be temporally consistent. Consider again, the example described with respect to FIG. 29. As illustrated in FIG. 29, a tracking system 140 has identified three instances of a certain class of objects (i.e., humans) by applying an instance segmentation process to a captured image 2902 of the physical environment. This example captured image 2902 may represent only one frame in a sequence of frames of captured video. When a second frame is received, the tracking system 140 may not be able to recognize newly identified object instances as corresponding to the same three people 2910*a-c* as captured in image 2902.

To address this issue, the tracking system 140 can include an identity recognition system. An identity recognition system may process received inputs (e.g., captured images) to learn the appearances of instances of certain objects (e.g., of particular people). Specifically, the identity recognition system may apply a machine-learning appearance-based model to digital images captured by one or more image capture devices 114/115 associated with a UAV 100. Instance segmentations identified based on processing of captured images can then be compared against such appearance-based models to resolve unique identities for one or more of the detected objects.

Identity recognition can be useful for various different tasks related to object tracking. As previously alluded to, recognizing the unique identities of detected objects allows for temporal consistency. Further, identity recognition can enable the tracking of multiple different objects (as will be described in more detail). Identity recognition may also facilitate object persistence that enables re-acquisition of previously tracked objects that fell out of view due to limited FOV of the image capture devices, motion of the object, and/or occlusion by another object. Identity recognition can also be applied to perform certain identity-specific behaviors or actions, such as recording video when a particular person is in view.

In some embodiments, an identity recognition process may employ a deep convolutional neural network to learn one or more effective appearance-based models for certain objects. In some embodiments, the neural network can be trained to learn a distance metric that returns a low distance value for image crops belonging to the same instance of an object (e.g., a person), and a high distance value otherwise.

In some embodiments, an identity recognition process may also include learning appearances of individual instances of objects such as people. When tracking humans, a tracking system 140 may be configured to associate identities of the humans, either through user-input data or external data sources such as images associated with individuals available on social media. Such data can be combined with detailed facial recognition processes based on images received from any of the one or more image capture devices 114/115 onboard the UAV 100. In some embodiments, an identity recognition process may focus on one or more key individuals. For example, a tracking system 140 associated with a UAV 100 may specifically focus on learning the identity of a designated owner of the UAV 100 and retain and/or improve its knowledge between flights for tracking, navigation, and/or other purposes such as access control.

In some embodiments, a tracking system 140 may be configured to focus tracking on a specific object detected in captured images. In such a single-object tracking approach, an identified object (e.g., a person) is designated for tracking while all other objects (e.g., other people, trees, buildings, landscape features, etc.) are treated as distractors and ignored. While useful in some contexts, a single-object tracking approach may have some disadvantages. For example, an overlap in trajectory, from the point of view of an image capture device, of a tracked object and a distractor object may lead to an inadvertent switch in the object being tracked such that the tracking system 140 begins tracking the distractor instead. Similarly, spatially close false positives by an object detector can also lead to inadvertent switches in tracking.

A multi-object tracking approach addresses these short-comings, and introduces a few additional benefits. In some embodiments, a unique track is associated with each object detected in the images captured by the one or more image capture devices 114/115. In some cases, it may not be practical, from a computing standpoint, to associate a unique track with every single object that is captured in the images. For example, a given image may include hundreds of objects, including minor features such as rocks or leaves or trees. Instead, unique tracks may be associate with certain classes of objects that may be of interest from a tracking standpoint. For example, the tracking system 140 may be configured to associate a unique track with every object detected that belongs to a class that is generally mobile (e.g., people, animals, vehicles, etc.).

Each unique track may include an estimate for the spatial location and movement of the object being tracked (e.g., using the spatiotemporal factor graph described earlier) as well as its appearance (e.g., using the identity recognition feature). Instead of pooling together all other distractors (i.e., as may be performed in a single object tracking approach), the tracking system 140 can learn to distinguish between the multiple individual tracked objects. By doing so, the tracking system 140 may render inadvertent identity switches less likely. Similarly, false positives by the object detector can be more robustly rejected as they will tend to not be consistent with any of the unique tracks.

An aspect to consider when performing multi-object tracking includes the association problem. In other words, given a set of object detections based on captured images (including parameterization by 3D location and regions in the image corresponding to segmentation), an issue arises regarding how to associate each of the set of object detections with corresponding tracks. To address the association problem, the tracking system 140 can be configured to associate one of a plurality of detected objects with one of a plurality of estimated object tracks based on a relationship between a detected object and an estimate object track. Specifically, this process may involve computing a "cost" value for one or more pairs of object detections and estimate object tracks. The computed cost values can take into account, for example, the spatial distance between a current location (e.g., in 3D space and/or image space) of a given object detection and a current estimate of a given track (e.g., in 3D space and/or in image space), an uncertainty of the current estimate of the given track, a difference between a given detected object's appearance and a given track's appearance estimate, and/or any other factors that may tend to suggest an association between a given detected object and given track. In some embodiments, multiple cost values are computed based on various different factors and fused into a single scalar value that can then be treated as a measure of how well a given detected object matches a given track. The aforementioned cost formulation can then be used to determine an optimal association between a detected object and a corresponding track by treating the cost formulation as an instance of a minimum cost perfect bipartite matching problem, which can be solved using, for example, the Hungarian algorithm.

In some embodiments, effective object tracking by a tracking system 140 may be improved by incorporating information regarding a state of an object. For example, a detected object such as a human may be associated with any one or more defined states. A state in this context may include an activity by the object such as sitting, standing, walking, running, or jumping. In some embodiments, one or more perception inputs (e.g., visual inputs from image capture devices 114/115) may be used to estimate one or more parameters associated with detected objects. The estimated parameters may include an activity type, motion capabilities, trajectory heading, contextual location (e.g., indoors vs. outdoors), interaction with other detected objects (e.g., two people walking together, a dog on a leash held by a person, a trailer pulled by a car, etc.), and any other semantic attributes.

Generally, object state estimation may be applied to estimate one or more parameters associated with a state of a detected object based on perception inputs (e.g., images of the detected object captured by one or more image capture devices 114/115 onboard a UAV 100 or sensor data from any other sensors onboard the UAV 100). The estimated parameters may then be applied to assist in predicting the motion of the detected object and thereby assist in tracking the detected object. For example, future trajectory estimates may differ for a detected human depending on whether the detected human is walking, running, jumping, riding a bicycle, riding in a car, etc. In some embodiments, deep convolutional neural networks may be applied to generate the parameter estimates based on multiple data sources (e.g., the perception inputs) to assist in generating future trajectory estimates and thereby assist in tracking.

As previously alluded to, a tracking system 140 may be configured to estimate (i.e., predict) a future trajectory of a detected object based on past trajectory measurements and/ or estimates, current perception inputs, motion models, and any other information (e.g., object state estimates). Predicting a future trajectory of a detected object is particularly useful for autonomous navigation by the UAV 100. Effective autonomous navigation by the UAV 100 may depend on anticipation of future conditions just as much as current conditions in the physical environment. Through a motion planning process, a navigation system of the UAV 100 may generate control commands configured to cause the UAV 100 to maneuver, for example, to avoid a collision, maintain separation with a tracked object in motion, and/or satisfy any other navigation objectives.

Predicting a future trajectory of a detected object is generally a relatively difficult problem to solve. The problem can be simplified for objects that are in motion according to a known and predictable motion model. For example, an object in free fall is expected to continue along a previous trajectory while accelerating at rate based on a known gravitational constant and other known factors (e.g., wind resistance). In such cases, the problem of generating a prediction of a future trajectory can be simplified to merely propagating past and current motion according to a known or predictable motion model associated with the object. Objects may of course deviate from a predicted trajectory generated based on such assumptions for a number of reasons (e.g., due to collision with another object). However, the predicted trajectories may still be useful for motion planning and/or tracking purposes.

Dynamic objects such as people and animals, present a more difficult challenge when predicting future trajectories because the motion of such objects is generally based on the environment and their own free will. To address such challenges, a tracking system 140 may be configured to take accurate measurements of the current position and motion of an object and use differentiated velocities and/or accelerations to predict a trajectory a short time (e.g., seconds) into the future and continually update such prediction as new measurements are taken. Further, the tracking system 140 may also use semantic information gathered from an analysis of captured images as cues to aid in generating predicted trajectories. For example, a tracking system 140 may determine that a detected object is a person on a bicycle traveling along a road. With this semantic information, the tracking system 140 may form an assumption that the tracked object is likely to continue along a trajectory that roughly coincides with a path of the road. As another related example, the tracking system 140 may determine that the person has begun turning the handlebars of the bicycle to the left. With this semantic information, the tracking system 140 may form an assumption that the tracked object will likely turn to the left before receiving any positional measurements that expose this motion. Another example, particularly relevant to autonomous objects such as people or animals is to assume that that the object will tend to avoid collisions with other objects. For example, the tracking system 140 may determine a tracked object is a person heading on a trajectory that will lead to a collision with another object such as a light pole. With this semantic information, the tracking system 140 may form an assumption that the tracked object is likely to alter its current trajectory at some point before the collision occurs. A person having ordinary skill will recognize that these are only examples of how semantic information may be utilized as a cue to guide prediction of future trajectories for certain objects.

In addition to performing an object detection process in one or more captured images per time frame, the tracking system 140 may also be configured to perform a frame-to-frame tracking process, for example, to detect motion of a particular set or region of pixels in images at subsequent time frames (e.g., video frames). Such a process may involve applying a mean-shift algorithm, a correlation filter, and/or a deep network. In some embodiments, frame-to-frame tracking may be applied by a system that is separate from an object detection system wherein results from the frame-to-frame tracking are fused into a spatiotemporal factor graph. Alternatively, or in addition, an object detection system may perform frame-to-frame tracking if, for example, the system has sufficient available computing resources (e.g., memory). For example, an object detection system may apply frame-to-frame tracking through recurrence in a deep network and/or by passing in multiple images at a time. A frame-to-frame tracking process and object detection process can also be configured to complement each other, with one resetting the other when a failure occurs.

As previously discussed, the tracking system 140 may be configured to process images (e.g., the raw pixel data) received from one or more image capture devices 114/115 onboard a UAV 100. Alternatively, or in addition, the tracking system 140 may also be configured to operate by processing disparity images. A "disparity image" may generally be understood as an image representative of a disparity between two or more corresponding images. For example, a stereo pair of images (e.g., left image and right image) captured by a stereoscopic image capture device will exhibit an inherent offset due to the slight difference in position of the two or more cameras associated with the stereoscopic image capture device. Despite the offset, at least some of the objects appearing in one image should also appear in the other image; however, the image locations of pixels corresponding to such objects will differ. By matching pixels in one image with corresponding pixels in the other and calculating the distance between these corresponding pixels, a disparity image can be generated with pixel values that are based on the distance calculations. Such a disparity image will tend to highlight regions of an image that correspond to objects in the physical environment since the pixels corresponding to the object will have similar disparities due to the object's 3D location in space. Accordingly, a disparity image, that may have been generated by processing two or more images according to a separate stereo algorithm, may provide useful cues to guide the tracking system 140 in detecting objects in the physical environment. In many situations, particularly where harsh lighting is present, a disparity image may actually provide stronger cues about the location of objects than an image captured from the image capture devices 114/115. As mentioned, disparity images may be computed with a separate stereo algorithm. Alternatively, or in addition, disparity images may be output as part of the same deep network applied by the tracking system 140. Disparity images may be used for object detection separately from the images received from the image capture devices 114/115, or they may be combined into a single network for joint inference.

In general, a tracking system 140 (e.g., including an object detection system and/or an associated instance segmentation system) may be primarily concerned with determining which pixels in a given image correspond to each object instance. However, these systems may not consider portions of a given object that are not actually captured in a given image. For example, pixels that would otherwise correspond with an occluded portion of an object (e.g., a person partially occluded by a tree) may not be labeled as corresponding to the object. This can be disadvantageous for object detection, instance segmentation, and/or identity recognition because the size and shape of the object may appear in the captured image to be distorted due to the occlusion. To address this issue, the tracking system 140 may be configured to imply a segmentation of an object instance in a captured image even if that object instance is occluded by other object instances. The object tracking system 140 may additionally be configured to determine which of the pixels associated with an object instance correspond with an occluded portion of that object instance. This process is generally referred to as "amodal segmentation" in that the segmentation process takes into consideration the whole of a physical object even if parts of the physical object are not necessarily perceived, for example, received images captured by the image capture devices 114/115. Amodal segmentation may be particularly advantageous when performing identity recognition and in a tracking system 140 configured for multi-object tracking.

Loss of visual contact is to be expected when tracking an object in motion through a physical environment. A tracking system 140 based primarily on visual inputs (e.g., images captured by image capture devices 114/115) may lose a track on an object when visual contact is lost (e.g., due to occlusion by another object or by the object leaving a FOV of an image capture device 114/115). In such cases, the tracking system 140 may become uncertain of the object's location and thereby declare the object lost. Human pilots generally do not have this issue, particularly in the case of momentary occlusions, due to the notion of object permanence. Object permanence assumes that, given certain physical constraints of matter, an object cannot suddenly disappear or instantly teleport to another location. Based on this assumption, if it is clear that all escape paths would have been clearly visible, then an object is likely to remain in an occluded volume. This situation is most clear when there is single occluding object (e.g., boulder) on flat ground with free space all around. If a tracked object in motion suddenly disappears in the captured image at a location of another object (e.g., the bolder), then it can be assumed that the object remains at a position occluded by the other object and that the tracked object will emerge along one of one or more possible escape paths. In some embodiments, the tracking system 140 may be configured to implement an algorithm that bounds the growth of uncertainty in the tracked objects location given this concept. In other words, when visual contact with a tracked object is lost at a particular position, the tracking system 140 can bound the uncertainty in the object's position to the last observed position and one or more possible escape paths given a last observed trajectory. A possible implementation of this concept may include generating, by the tracking system 140, an occupancy map that is carved out by stereo and the segmentations with a particle filter on possible escape paths.

Unmanned Aerial Vehicle—Example System

A UAV 100, according to the present teachings, may be implemented as any type of UAV. A UAV, sometimes referred to as a drone, is generally defined as any aircraft capable of controlled flight without a human pilot onboard. UAVs may be controlled autonomously by onboard computer processors or via remote control by a remotely located human pilot. Similar to an airplane, UAVs may utilize fixed aerodynamic surfaces along with a propulsion system (e.g., propeller, jet, etc.) to achieve lift. Alternatively, similar to helicopters, UAVs may directly use a propulsion system (e.g., propeller, jet, etc.) to counter gravitational forces and achieve lift. Propulsion-driven lift (as in the case of helicopters) offers significant advantages in certain implementations, for example, as a mobile filming platform, because it allows for controlled motion along all axes.

Multi-rotor helicopters, in particular quadcopters, have emerged as a popular UAV configuration. A quadcopter (also known as a quadrotor helicopter or quadrotor) is a multi-rotor helicopter that is lifted and propelled by four rotors. Unlike most helicopters, quadcopters use two sets of two fixed-pitch propellers. A first set of rotors turns clockwise, while a second set of rotors turns counter-clockwise. In turning opposite directions, a first set of rotors may counter the angular torque caused by the rotation of the other set, thereby stabilizing flight. Flight control is achieved through variation in the angular velocity of each of the four fixed-pitch rotors. By varying the angular velocity of each of the rotors, a quadcopter may perform precise adjustments in its position (e.g., adjustments in altitude and level flight left, right, forward and backward) and orientation, including pitch (rotation about a first lateral axis), roll (rotation about a second lateral axis), and yaw (rotation about a vertical axis). For example, if all four rotors are spinning (two clockwise, and two counter-clockwise) at the same angular velocity, the net aerodynamic torque about the vertical yaw axis is zero. Provided the four rotors spin at sufficient angular velocity to provide a vertical thrust equal to the force of gravity, the quadcopter can maintain a hover. An adjustment in yaw may be induced by varying the angular velocity of a subset of the four rotors thereby mismatching the cumulative aerodynamic torque of the four rotors. Similarly, an adjustment in pitch and/or roll may be induced by varying the angular velocity of a subset of the four rotors, but in a balanced fashion such that lift is increased on one side of the craft and decreased on the other side of the craft. An adjustment in altitude from hover may be induced by applying a balanced variation in all four rotors, thereby increasing or decreasing the vertical thrust. Positional adjustments left, right, forward, and backward may be induced through combined pitch/roll maneuvers with balanced applied vertical thrust. For example, to move forward on a horizontal plane, the quadcopter would vary the angular velocity of a subset of its four rotors in order to perform a pitch forward maneuver. While pitching forward, the total vertical thrust may be increased by increasing the angular velocity of all the rotors. Due to the forward pitched orientation, the acceleration caused by the vertical thrust maneuver will have a horizontal component and will, therefore, accelerate the craft forward on a horizontal plane.

Figure 30:
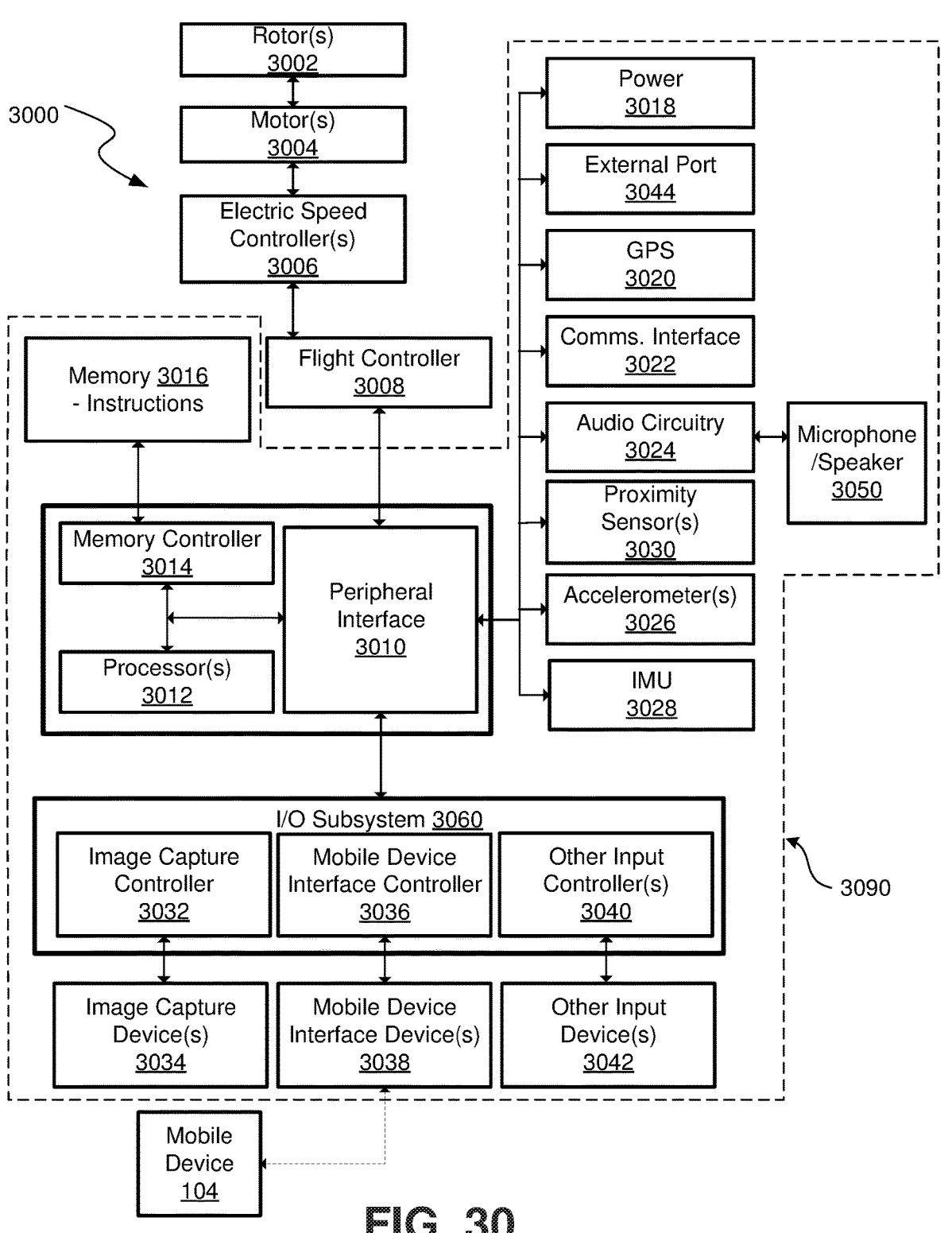
FIG. 30 shows a block diagram of an example UAV system including various functional system components with which at least some operations described in this disclosure can be implemented.

FIG. 30 shows a diagram of an example UAV system 3000 including various functional system components that may be part of a UAV 100, according to some embodiments. UAV system 3000 may include one or more propulsion systems (e.g., rotors 3002 and motor(s) 3004), one or more electronic speed controllers 3006, a flight controller 3008, a peripheral interface 3010, processor(s) 3012, a memory controller 3014, a memory 3016 (which may include one or more computer readable storage media), a power module 3018, a GPS module 3020, a communications interface 3022, audio circuitry 3024, an accelerometer 3026 (including subcomponents, such as gyroscopes), an IMU 3028, a proximity sensor 3030, an optical sensor controller 3032 and associated optical sensor(s) 3034, a mobile device interface controller 3036 with associated interface device(s) 3038, and any other input controllers 3040 and input device(s) 3042, for example, display controllers with associated display device(s). These components may communicate over one or more communication buses or signal lines as represented by the arrows in FIG. 30.

UAV system 3000 is only one example of a system that may be part of a UAV 100. A UAV 100 may include more or fewer components than shown in system 3000, may combine two or more components as functional units, or may have a different configuration or arrangement of the components. Some of the various components of system 3000 shown in FIG. 30 may be implemented in hardware, software or a combination of both hardware and software, including one or more signal processing and/or application specific integrated circuits. Also, UAV 100 may include an off-the-shelf UAV (e.g., a currently available remote-controlled quadcopter) coupled with a modular add-on device (for example, one including components within outline 3090) to perform the innovative functions described in this disclosure.

As described earlier, the means for propulsion 3002-3004 may comprise fixed-pitch rotors. The means for propulsion may also include variable-pitch rotors (for example, using a gimbal mechanism), a variable-pitch jet engine, or any other mode of propulsion having the effect of providing force. The means for propulsion 3002-3004 may include a means for varying the applied thrust, for example, via an electronic speed controller 3006 varying the speed of each fixed-pitch rotor.

Flight controller 3008 may include a combination of hardware and/or software configured to receive input data (e.g., sensor data from image capture devices 3034, and or generated trajectories from an autonomous navigation system 120), interpret the data and output control commands to the propulsion systems 3002-3006 and/or aerodynamic surfaces (e.g., fixed wing control surfaces) of the UAV 100. Alternatively, or in addition, a flight controller 3008 may be configured to receive control commands generated by another component or device (e.g., processors 3012 and/or a separate computing device), interpret those control commands and generate control signals to the propulsion systems 3002-3006 and/or aerodynamic surfaces (e.g., fixed wing control surfaces) of the UAV 100. In some embodiments, the previously mentioned navigation system 120 of the UAV 100 may comprise the flight controller 3008 and/or any one or more of the other components of system 3000. Alternatively, the flight controller 3008 shown in FIG. 30 may exist as a component separate from the navigation system 120, for example, similar to the flight controller 160 shown in FIG. 2.

Memory 3016 may include high-speed random-access memory and may also include non-volatile memory, such as one or more magnetic disk storage devices, flash memory devices, or other non-volatile solid-state memory devices. Access to memory 3016 by other components of system 3000, such as the processors 3012 and the peripherals interface 3010, may be controlled by the memory controller 3014.

The peripherals interface 3010 may couple the input and output peripherals of system 3000 to the processor(s) 3012 and memory 3016. The one or more processors 3012 run or execute various software programs and/or sets of instructions stored in memory 3016 to perform various functions for the UAV 100 and to process data. In some embodiments, processors 3012 may include general central processing units (CPUs), specialized processing units such as graphical processing units (GPUs) particularly suited to parallel processing applications, or any combination thereof. In some embodiments, the peripherals interface 3010, the processor(s) 3012, and the memory controller 3014 may be implemented on a single integrated chip. In some other embodiments, they may be implemented on separate chips.

The network communications interface 3022 may facilitate transmission and reception of communications signals often in the form of electromagnetic signals. The transmission and reception of electromagnetic communications signals may be carried out over physical media such as copper wire cabling or fiber optic cabling, or may be carried out wirelessly, for example, via a radiofrequency (RF) transceiver. In some embodiments, the network communications interface may include RF circuitry. In such embodiments, RF circuitry may convert electrical signals to/from electromagnetic signals and communicate with communications networks and other communications devices via the electromagnetic signals. The RF circuitry may include well-known circuitry for performing these functions, including, but not limited to, an antenna system, an RF transceiver, one or more amplifiers, a tuner, one or more oscillators, a digital signal processor, a CODEC chipset, a subscriber identity module (SIM) card, memory, and so forth. The RF circuitry may facilitate transmission and receipt of data over communications networks (including public, private, local, and wide area). For example, communication may be over a wide area network (WAN), a local area network (LAN), or a network of networks such as the Internet. Communication may be facilitated over wired transmission media (e.g., via Ethernet) or wirelessly. Wireless communication may be over a wireless cellular telephone network, a wireless local area network (LAN) and/or a metropolitan area network (MAN), and other modes of wireless communication. The wireless communication may use any of a plurality of communications standards, protocols and technologies, including, but not limited to, Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth™, Wireless Fidelity (Wi-Fi) (e.g., IEEE 802.11n and/or IEEE 802.11ac), voice over Internet Protocol (VoIP), Wi-MAX, or any other suitable communication protocols.

The audio circuitry 3024, including the speaker and microphone 3050, may provide an audio interface between the surrounding environment and the UAV 100. The audio circuitry 3024 may receive audio data from the peripherals interface 3010, convert the audio data to an electrical signal, and transmit the electrical signal to the speaker 3050. The speaker 3050 may convert the electrical signal to human-audible sound waves. The audio circuitry 3024 may also receive electrical signals converted by the microphone 3050 from sound waves. The audio circuitry 3024 may convert the electrical signal to audio data and transmit the audio data to the peripherals interface 3010 for processing. Audio data may be retrieved from and/or transmitted to memory 3016 and/or the network communications interface 3022 by the peripherals interface 3010.

The I/O subsystem 3060 may couple input/output peripherals of UAV 100, such as an optical sensor system 3034, the mobile device interface 3038, and other input/control devices 3042, to the peripherals interface 3010. The I/O subsystem 3060 may include an optical sensor controller 3032, a mobile device interface controller 3036, and other input controller(s) 3040 for other input or control devices. The one or more input controllers 3040 receive/send electrical signals from/to other input or control devices 3042.

The other input/control devices 3042 may include physical buttons (e.g., push buttons, rocker buttons, etc.), dials, touch screen displays, slider switches, joysticks, click wheels, and so forth. A touch screen display may be used to implement virtual or soft buttons and one or more soft keyboards. A touch-sensitive touch screen display may provide an input interface and an output interface between the UAV 100 and a user. A display controller may receive and/or send electrical signals from/to the touch screen. The touch screen may display visual output to a user. The visual output may include graphics, text, icons, video, and any combination thereof (collectively termed "graphics"). In some embodiments, some or all of the visual output may correspond to user-interface objects, further details of which are described below.

A touch sensitive display system may have a touch-sensitive surface, sensor or set of sensors that accepts input from the user based on haptic and/or tactile contact. The touch sensitive display system and the display controller (along with any associated modules and/or sets of instructions in memory 3016) may detect contact (and any movement or breaking of the contact) on the touch screen and convert the detected contact into interaction with user-interface objects (e.g., one or more soft keys or images) that are displayed on the touch screen. In an exemplary embodiment, a point of contact between a touch screen and the user corresponds to a finger of the user.

The touch screen may use liquid crystal display (LCD) technology, or light emitting polymer display (LPD) technology, although other display technologies may be used in other embodiments. The touch screen and the display controller may detect contact and any movement or breaking thereof using any of a plurality of touch sensing technologies now known or later developed, including, but not limited to, capacitive, resistive, infrared, and surface acoustic wave technologies, as well as other proximity sensor arrays or other elements for determining one or more points of contact with a touch screen.

The mobile device interface device 3038 along with mobile device interface controller 3036 may facilitate the transmission of data between a UAV 100 and other computing devices such as a mobile device 104. According to some embodiments, communications interface 3022 may facilitate the transmission of data between UAV 100 and a mobile device 104 (for example, where data is transferred over a Wi-Fi network).

UAV system 3000 also includes a power system 3018 for powering the various components. The power system 3018 may include a power management system, one or more power sources (e.g., battery, alternating current (AC), etc.), a recharging system, a power failure detection circuit, a power converter or inverter, a power status indicator (e.g., a light-emitting diode (LED)) and any other components associated with the generation, management and distribution of power in computerized device.

UAV system 3000 may also include one or more image capture devices 3034. Image capture devices 3034 may be the same as the image capture devices 114/115 of UAV 100 described with respect to FIG. 1A. FIG. 30 shows an image capture device 3034 coupled to an image capture controller 3032 in I/O subsystem 3060. The image capture device 3034 may include one or more optical sensors. For example, image capture device 3034 may include a charge-coupled device (CCD) or complementary metal-oxide semiconductor (CMOS) phototransistors. The optical sensors of image capture devices 3034 receive light from the environment, projected through one or more lens (the combination of an optical sensor and lens can be referred to as a "camera") and converts the light to data representing an image. In conjunction with an imaging module located in memory 3016, the image capture device 3034 may capture images (including still images and/or video). In some embodiments, an image capture device 3034 may include a single fixed camera. In other embodiments, an image capture device 3040 may include a single adjustable camera (adjustable using a gimbal mechanism with one or more axes of motion). In some embodiments, an image capture device 3034 may include a camera with a wide-angle lens providing a wider FOV. In some embodiments, an image capture device 3034 may include an array of multiple cameras providing up to a full 360-degree view in all directions. In some embodiments, an image capture device 3034 may include two or more cameras (of any type as described herein) placed next to each other in order to provide stereoscopic vision. In some embodiments, an image capture device 3034 may include multiple cameras of any combination as described above. In some embodiments, the cameras of an image capture device 3034 may be arranged such that at least two cameras are provided with overlapping FOV at multiple angles around the UAV 100, thereby allowing for stereoscopic (i.e., 3D) image/video capture and depth recovery (e.g., through computer vision algorithms) at multiple angles around UAV 100. For example, UAV 100 may include four sets of two cameras each positioned so as to provide a stereoscopic view at multiple angles around the UAV 100. In some embodiments, a UAV 100 may include some cameras dedicated for image capture of a subject and other cameras dedicated for image capture for visual navigation (e.g., through visual inertial odometry).

UAV system 3000 may also include one or more proximity sensors 3030. FIG. 30 shows a proximity sensor 3030 coupled to the peripherals interface 3010. Alternately, the proximity sensor 3030 may be coupled to an input controller 3040 in the I/O subsystem 3060. Proximity sensors 3030 may generally include remote sensing technology for proximity detection, range measurement, target identification, etc. For example, proximity sensors 3030 may include radar, sonar, and LIDAR.

UAV system 3000 may also include one or more accelerometers 3026. FIG. 30 shows an accelerometer 3026 coupled to the peripherals interface 3010. Alternately, the accelerometer 3026 may be coupled to an input controller 3040 in the I/O subsystem 3060.

UAV system 3000 may include one or more IMU 3028. An IMU 3028 may measure and report the UAV's velocity, acceleration, orientation, and gravitational forces using a combination of gyroscopes and accelerometers (e.g., accelerometer 3026).

UAV system 3000 may include a global positioning system (GPS) receiver 3020. FIG. 30 shows an GPS receiver 3020 coupled to the peripherals interface 3010. Alternately, the GPS receiver 3020 may be coupled to an input controller 3040 in the I/O subsystem 3060. The GPS receiver 3020 may receive signals from GPS satellites in orbit around the earth, calculate a distance to each of the GPS satellites (through the use of GPS software), and thereby pinpoint a current global position of UAV 100.

In some embodiments, the software components stored in memory 3016 may include an operating system, a communication module (or set of instructions), a flight control module (or set of instructions), a localization module (or set of instructions), a computer vision module, a graphics module (or set of instructions), and other applications (or sets of instructions). For clarity, one or more modules and/or applications may not be shown in FIG. 30.

An operating system (e.g., Darwin™, RTXC, UNIX™, Linux™, Apple Mac OS™ Microsoft Windows™, or an embedded operating system such as VxWorks™) includes various software components and/or drivers for controlling and managing general system tasks (e.g., memory management, storage device control, power management, etc.) and facilitates communication between various hardware and software components.

A communications module may facilitate communication with other devices over one or more external ports 3044 and may also include various software components for handling data transmission via the network communications interface 3022. The external port 3044 (e.g., USB, Firewire™, etc.) may be adapted for coupling directly to other devices or indirectly over a network (e.g., the Internet, wireless LAN, etc.).

A graphics module may include various software components for processing, rendering and displaying graphics data. As used herein, the term "graphics" may include any object that can be displayed to a user, including, without limitation, text, still images, videos, animations, icons (such as user-interface objects including soft keys), and the like. The graphics module in conjunction with a processor 3012 may process in real-time or near-real-time, graphics data captured by optical sensor(s) 3034 and/or proximity sensors 3030.

A computer vision module, which may be a component of a graphics module, provides analysis and recognition of graphics data. For example, while UAV 100 is in flight, the computer vision module along with a graphics module (if separate), processor 3012, and image capture devices(s) 3034 and/or proximity sensors 3030 may recognize and track the captured image of an object located on the ground. The computer vision module may further communicate with a localization/navigation module and flight control module to update a position and/or orientation of the UAV 100 and to provide course corrections to fly along a planned trajectory through a physical environment.

A localization/navigation module may determine the location and/or orientation of UAV 100 and provide this information for use in various modules and applications (e.g., to a flight control module in order to generate commands for use by the flight controller 3008).

Image capture devices(s) 3034, in conjunction with an image capture device controller 3032 and a graphics module, may be used to capture images (including still images and video) and store them into memory 3016.

Each of the above identified modules and applications correspond to a set of instructions for performing one or more functions described above. These modules (i.e., sets of instructions) need not be implemented as separate software programs, procedures or modules, and, thus, various subsets of these modules may be combined or otherwise re-arranged in various embodiments. In some embodiments, memory 3016 may store a subset of the modules and data structures identified above. Furthermore, memory 3016 may store additional modules and data structures not described above.

Example Computer Processing System

Figure 31:
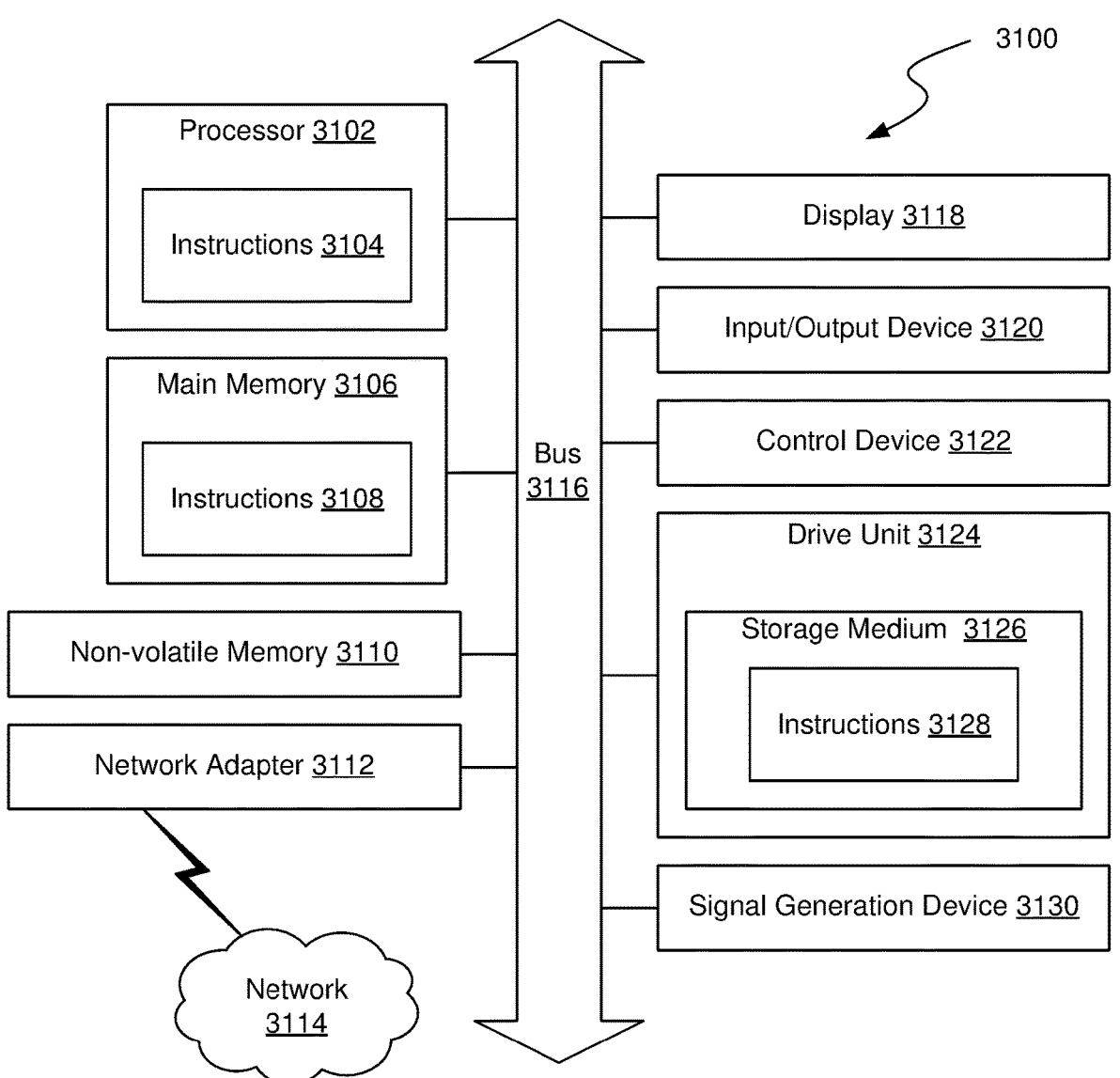
FIG. 31 shows a block diagram of an example of a processing system in which at least some operations described in this disclosure can be implemented.

FIG. 31 is a block diagram illustrating an example of a processing system 3100 in which at least some operations described in this disclosure can be implemented. The example processing system 3100 may be part of any of the aforementioned devices including, but not limited to, UAV 100 and mobile device 104. The processing system 3100 may include one or more central processing units ("processors") 3102, main memory 3106, non-volatile memory 3110, network adapter 3112 (e.g., network interfaces), display 3118, input/output devices 3120, control device 3122 (e.g., keyboard and pointing devices), drive unit 3124 including a storage medium 3126, and signal generation device 3130 that are communicatively connected to a bus 3116. The bus 3116 is illustrated as an abstraction that represents any one or more separate physical buses, point to point connections, or both connected by appropriate bridges, adapters, or controllers. The bus 3116, therefore, can include, for example, a system bus, a Peripheral Component Interconnect (PCI) bus or PCI-Express bus, a HyperTransport or industry standard architecture (ISA) bus, a small computer system interface (SCSI) bus, USB, IIC (I2C) bus, or an Institute of Electrical and Electronics Engineers (IEEE) standard 1394 bus (also called "Firewire"). A bus may also be responsible for relaying data packets (e.g., via full or half duplex wires) between components of the network appliance, such as the switching fabric, network port(s), tool port(s), etc.

While the main memory 3106, non-volatile memory 3110, and storage medium 3126 (also called a "machine-readable medium") are shown to be a single medium, the term "machine-readable medium" and "storage medium" should be taken to include a single medium or multiple media (e.g., a centralized or distributed database, and/or associated caches and servers) that store one or more sets of instructions 3128. The term "machine-readable medium" and "storage medium" shall also be taken to include any medium that is capable of storing, encoding, or carrying a set of instructions for execution by the computing system and that cause the computing system to perform any one or more of the methodologies of the presently disclosed embodiments.

In general, the routines executed to implement the embodiments of the disclosure, may be implemented as part of an operating system or a specific application, component, program, object, module, or sequence of instructions referred to as "computer programs." The computer programs typically comprise one or more instructions (e.g., instructions 3104, 3108, 3128) set at various times in various memory and storage devices in a computer, and that, when read and executed by one or more processing units or processors 3102, cause the processing system 3100 to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include recordable type media such as volatile and non-volatile memory devices 3110, floppy and other removable disks, hard disk drives, optical disks (e.g., Compact Disc Read-Only Memory (CD ROMS), Digital Versatile Discs (DVDs)), and transmission type media such as digital and analog communication links.

The network adapter 3112 enables the processing system 3100 to mediate data in a network 3114 with an entity that is external to the processing system 3100, such as a network appliance, through any known and/or convenient communications protocol supported by the processing system 3100 and the external entity. The network adapter 3112 can include one or more of a network adaptor card, a wireless network interface card, a router, an access point, a wireless router, a switch, a multilayer switch, a protocol converter, a gateway, a bridge, bridge router, a hub, a digital media receiver, and/or a repeater.

The network adapter 3112 can include a firewall which can, in some embodiments, govern and/or manage permission to access/proxy data in a computer network, and track varying levels of trust between different machines and/or applications. The firewall can be any number of modules having any combination of hardware and/or software components able to enforce a predetermined set of access rights between a particular set of machines and applications, machines and machines, and/or applications and applications, for example, to regulate the flow of traffic and resource sharing between these varying entities. The firewall may additionally manage and/or have access to an access control list which details permissions including, for example, the access and operation rights of an object by an individual, a machine, and/or an application, and the circumstances under which the permission rights stand.

As indicated above, the techniques introduced here may be implemented by, for example, programmable circuitry (e.g., one or more microprocessors), programmed with software and/or firmware, entirely in special-purpose hardwired (i.e., non-programmable) circuitry, or in a combination or such forms. Special-purpose circuitry can be in the form of, for example, one or more application-specific integrated circuits (ASICs), programmable logic devices (PLDs), field-programmable gate arrays (FPGAs), etc.

Note that any of the embodiments described above can be combined with another embodiment, except to the extent that it may be stated otherwise above, or to the extent that any such embodiments might be mutually exclusive in function and/or structure.

What is claimed is:

1. An unmanned aerial vehicle (UAV) comprising:
a propulsion system;
a sensor device configured to generate sensor data; and
a computer system communicatively coupled to the propulsion system and sensor device, the computer system configured to:
identify a behavioral objective configured based on a goal for one or more human subjects;
generate a planned trajectory through a physical environment, the planned trajectory configured to cause the UAV to guide the one or more human subjects so as to satisfy the goal,
wherein generating the planned trajectory includes jointly optimizing the behavioral objective with one or more other behavioral objectives in real-time during autonomous flight based, at least in part, on the sensor data; and
control the propulsion system to autonomously maneuver the UAV along the planned trajectory.

2. The UAV of claim 1, wherein the computer system is further configured to:
detect motion of the one or more human subjects through the physical environment; and
track the detected motion of the one or more human subjects through the physical environment.

3. The UAV of claim 2, wherein the computer system is configured to:
analyze the tracked motion of the one or more human subjects; and
generate, based on the analysis of the tracked motion, a value for a performance metric associated with the motion of at least one of the one or more human subjects.

4. The UAV of claim 3, wherein the computer system is configured to:
cause display of a visual output that includes the value for the performance metric.

5. The UAV of claim 1, wherein the goal comprises a performance goal defining a pace and wherein to maneuver the UAV along the planned trajectory, the computer system is configured to direct the propulsion system to fly at a speed that sets the pace.

6. The UAV of claim 1, wherein to generate the planned trajectory, the computer system is configured to:
process the behavioral objective with the one or more other behavioral objectives using any of gradient-based optimization, gradient-free optimization, sampling, or end-to-end.

7. The UAV of claim 1, wherein the computer system is configured to:
determine, based on the sensor data, that at least one of the one or more human subjects is injured.

8. The UAV of claim 7, wherein the computer system is configured to:
automatically adjust the planned trajectory in response to determining that the at least one of the one or more human subjects is injured.

9. The UAV of claim 1, wherein the computer system is further configured to:
automatically determine, based on the sensor data, a terrain characteristic of the physical environment and responsively adjust the planned trajectory.

10. The UAV of claim 1, wherein the sensor data comprises perception inputs including images captured by a camera coupled to the UAV.

11. The UAV of claim 1, wherein the goal comprises a performance goal indicating one or more of: a particular pace, a particular speed, a particular time, or a particular distance.

12. A method of operating an unmanned aerial vehicle (UAV), the method comprising:
identifying, by a computer system of the UAV, a behavioral objective configured based on a goal for one or more human subjects;
generating, by the computer system, a planned trajectory through a physical environment, the planned trajectory configured to cause the UAV to guide the one or more human subjects so as to satisfy the goal,
wherein generating the planned trajectory includes jointly optimizing the behavioral objective with one or more other behavioral objectives in real-time during autonomous flight based, at least in part, on the sensor data; and
controlling a propulsion system of the UAV to autonomously maneuver the UAV along the planned trajectory.

13. The method of claim 12, the method comprising:
detecting motion of the one or more human subjects through the physical environment; and
tracking the detected motion of the one or more human subjects through the physical environment.

14. The method of claim 13, the method comprising:
analyzing the tracked motion of the one or more human subjects; and
generating, based on the analysis of the tracked motion, a value for a performance metric associated with the motion of at least one of the one or more human subjects.

15. The method of claim 14, the method comprising:
causing display of a visual output that includes the value for the performance metric.

16. The method of claim 12, wherein the goal comprises a performance goal defining a pace and wherein the method comprises directing the propulsion system to fly at a speed that sets the pace.

17. The method of claim 12, wherein jointly optimizing the behavioral objective comprises:
processing the behavioral objective with the one or more other behavioral objectives using any of gradient-based optimization, gradient-free optimization, sampling, or end-to-end.

18. The method of claim 12, the method comprising:
determining, based on the sensor data, that at least one of the one or more human subjects is injured.

19. The method of claim 18, the method comprising:
automatically adjusting the planned trajectory in response to determining that the at least one of the one or more human subjects is injured.

20. The method of claim 12, the method comprising:
automatically determining, based on the sensor data, a terrain characteristic of the physical environment and responsively adjusting the planned trajectory.

21. The method of claim 12, wherein the sensor data comprises perception inputs including images captured by a camera coupled to the UAV.

22. An apparatus comprising:

one or more computer-readable media; and program instructions stored on the one or more computer-readable storage media that, when executed by one or more processors of an aerial vehicle, direct the one or more processors to at least:

identify a behavioral objective configured based on a goal for one or more human subjects;

generate a planned trajectory through a physical environment, the planned trajectory configured to cause the aerial vehicle to guide the one or more human subjects so as to satisfy the goal, wherein generating the planned trajectory includes jointly optimizing the behavioral objective with one or more other behavioral objectives in real-time during autonomous flight based, at least in part, on the sensor data; and control the propulsion system to autonomously maneuver the aerial vehicle along the planned trajectory.

\* \* \* \* \*